US010621837B2

(12) United States Patent
Tachi et al.

(10) Patent No.: US 10,621,837 B2
(45) Date of Patent: Apr. 14, 2020

(54) TACTILE INFORMATION CONVERSION DEVICE, TACTILE INFORMATION CONVERSION METHOD, TACTILE INFORMATION CONVERSION PROGRAM, AND ELEMENT ARRANGEMENT STRUCTURE

(71) Applicant: JAPAN SCIENCE AND TECHNOLOGY AGENCY, Saitama (JP)

(72) Inventors: Susumu Tachi, Tokyo (JP); Masashi Nakatani, Kanagawa (JP); Katsunari Sato, Nara (JP); Kouta Minamizawa, Kanagawa (JP); Hiroyuki Kajimoto, Tokyo (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 0 days.

(21) Appl. No.: 16/153,008

(22) Filed: Oct. 5, 2018

(65) Prior Publication Data
US 2019/0043322 A1 Feb. 7, 2019

Related U.S. Application Data

(63) Continuation of application No. PCT/JP2017/014571, filed on Apr. 7, 2017.

(30) Foreign Application Priority Data

Apr. 7, 2016 (JP) ................................. 2016-077693
Jul. 18, 2016 (JP) ................................. 2016-140982

(51) Int. Cl.
*G09G 5/00* (2006.01)
*G08B 6/00* (2006.01)
(Continued)

(52) U.S. Cl.
CPC ................ *G08B 6/00* (2013.01); *B25J 13/02* (2013.01); *G06F 3/014* (2013.01); *G06F 3/016* (2013.01)

(58) Field of Classification Search
None
See application file for complete search history.

(56) References Cited

U.S. PATENT DOCUMENTS

RE33,559 E * 3/1991 Fallacaro .............. A63F 13/005
386/201
10,082,872 B2 * 9/2018 Cruz-Hernandez ..... G06F 3/016
(Continued)

FOREIGN PATENT DOCUMENTS

JP 3543097 B2 7/2004
JP 2010287221 A 12/2010
(Continued)

OTHER PUBLICATIONS

Ando et al. A study of the Nail Mounted Tactile Display for Augmented Reality System. Augmented Reality.Nov. 2004. pp. 2025-2033. 87-11.
(Continued)

*Primary Examiner* — Brent Swarthout
(74) *Attorney, Agent, or Firm* — Muncy, Geissler, Olds & Lowe, PC

(57) ABSTRACT

The purpose is to provide a device, method and program for tactile information conversion, and an element arrangement structure for presenting a plurality of types of stimuli that are capable of presenting a plurality of types of stimuli at one point in a concentrated manner from different points. One of the features is to determine a first stimulation point at which a first type of tactile stimulus is generated or generate the first type of tactile stimulus at the first stimulation point via the output unit and output tactile information for generating a second type of tactile stimulus via the output unit to the
(Continued)

output unit at a second stimulation point separated within a temporally and/or spatially predetermined threshold value from the first stimulation point of the first type of tactile stimulus that has been determined or generated by a first stimulation unit.

12 Claims, 28 Drawing Sheets

(51) Int. Cl.
*B25J 13/02* (2006.01)
*G06F 3/01* (2006.01)

(56) References Cited

U.S. PATENT DOCUMENTS

| | | | | |
|---|---|---|---|---|
| 2013/0038603 A1* | 2/2013 | Bae | ........................ | G06F 3/016 345/419 |
| 2013/0113760 A1* | 5/2013 | Gossweiler, III | ....... | G06F 3/016 345/177 |

FOREIGN PATENT DOCUMENTS

| | | |
|---|---|---|
| JP | 2011086068 A | 4/2011 |
| JP | 5057068 B2 | 10/2012 |
| JP | 2013091114 A | 5/2013 |

OTHER PUBLICATIONS

Yamaoka et al. Basic Analysis of Stickiness Sensation for Tactile Displays. EuroHaptics. 2008. pp. 427-436.
Tachi et al. Electrocutaneous Communication in a Guide Dog Robot (MELDOG). IEEE Transaction on Biomedical Engineering. Jul. 1985. 10 pages. 7.
Tanie et al. Basic Study on Discriminability of Mental Location of Electrocutaneous Phantom Sensation. Sep. 18, 1978. pp. 91-98.
Mohri. International Preliminary Report on Patentability. Oct. 9, 2018. 5 pages. With English Translation. (11 pages).
WIPO. International Search Report dated Jul. 7, 2017. 3 pages. With English translation (5 pages).
Offfice Action dated Feb. 4, 2020 in JP Application No. 2018-510680.

* cited by examiner

FIG. 7
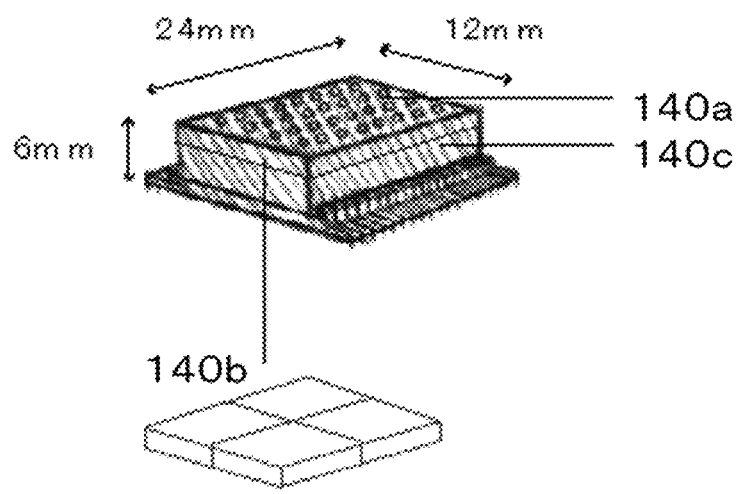
FIG. 8A  FIG. 8B
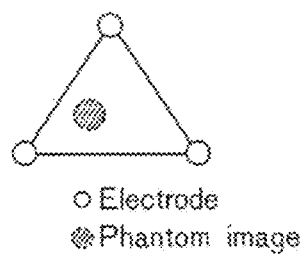 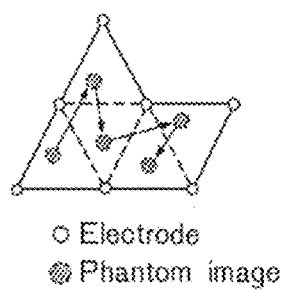

PRESS CONDITION

RELEASE CONDITION

PRESS CONDITION

RELEASE CONDITION

Both

Pad

Side

FIG. 46

| | STIMULATION IN ERROR RANGE | ERROR RANGE OVERLAPPING | ERROR RANGES SEPARATED |
|---|---|---|---|
| CAUSING OF SENSATION | CAUSED (IMPOSSIBLE TO DETERMINE STIMULATION POSITION [6] | CAUSED (POSSIBLE TO DETERMINE STIMULATION POSITION [1, 2, 3, 4, 5, 6] | HARD TO BE CAUSED [4, 6] |
| PERCEIVED STRENGTH | SAME DEGREE | WEAKER THAN ACTUAL STIMULUS THERE IS POSSIBILITY FOR BEING INCREASED BY VIBRATION STIMULUS [2, 3, 4] | WEAKENED [4] |
| PERCEPTION TIME | SAME DEGREE [6] | DELAYED, HOWEVER BECAME THE SAME DEGREE BY VIBRATION STIMULUS APPLIED BEFORE THE SAME TIME [5, 6] | DELAYED THERE IS POSSIBILITY FOR BEING EARLIER BY VIBRATION STIMULUS APPLIED BEFORE THE SAME TIME [6] |

TACTILE INFORMATION CONVERSION DEVICE, TACTILE INFORMATION CONVERSION METHOD, TACTILE INFORMATION CONVERSION PROGRAM, AND ELEMENT ARRANGEMENT STRUCTURE

BACKGROUND OF THE INVENTION

1. Field of the Invention

The present invention relates to a tactile information conversion device, a tactile information conversion method, a tactile information conversion program, and an element arrangement structure.

2. Description of the Related Art

In the related art, tactile sensation presentation devices have been developed that present a tactile sensation for a real or virtual object to a user.

For example, Patent Document 1 discloses a pen-type force sensation presentation device that presents, by allowing for motions such as a reciprocating motion, a swinging motion, a tilting motion, a rotation, and the like at a movable part where a fingertip touches when a user holds the device, proprioception to the fingertip.

In addition, Non-Patent Document 1 discloses a tactile sensation presentation device that creates a tactile map using pressure, vibration, and temperature as elementary tactile sensations and synthesizes the element tactile sensations so as to present an arbitrary tactile sensation.

In addition, Non-Patent Document 2 discloses that a vibrator provided on the nail side is vibrated at the time of a finger stroking operation in a real environment so as to present a virtual sense of unevenness.

In addition, Patent Document 2 discloses an electrical tactile sensation display provided with an electrode substrate provided with a plurality of stimulation electrodes, a conductive gel layer between the stimulation electrodes and the skin, etc., in order to present electrical stimulation to the user.

Patent Document 1: Japanese Patent Application Publication No. 2010-287221

Patent Document 2: Japanese Patent No. 5057068

Non-Patent Document 1: Chikai, Manabu, "Study on New Tactile Sense Presentation Devices", Nagaoka University of Technology doctoral thesis, Nagaoka University of Technology Nagaoka University of Technology, Mar. 25, 2014, 13102 No. 702, URL: http://hdl.handle.net/10649/719

Non-Patent Document 2: Ando, Hideyuki, Watanabe, Junji, Inami, Masahiko, Sugimoto, Maki, Maeda, Taro, "A Study of the Nail-Mounted Tactile Display for Augmented Reality System", Journal of the Institute of Electronics, Information and Communication Engineers, the Institute of Electronics, Information and Communication Engineers, Nov. 1, 2004, Vol. J87-D2, No. 11, pp. 2025-2033

SUMMARY OF THE INVENTION

However, conventional tactile sensation presentation devices have a problem that, when applying two or more types of tactile stimuli, tactile stimulators cannot be disposed at the same place resulting in an increase in the size of the devices. Therefore, there is a problem that the user cannot obtain integrated sensation at the same place when there are many types of stimuli.

For example, in Non-patent Document 2, although it is possible to present uneven edge sensation to the finger pad by applying a vibration stimulus from above the nail at the time of tracing an object with a finger, there is a problem that a pressure change occurring at the finger pad is merely expanded by the vibration stimulus from above the nail and a plurality of types of stimuli cannot be presented in a concentrated manner at a place from different sites.

In this background, the present invention provides a tactile information conversion device, a tactile information conversion method, a tactile information conversion program, and an element arrangement structure for presenting a plurality of types of stimuli that are capable of presenting a plurality of types of stimuli at one point in a concentrated manner from different points.

In order to achieve such a purpose, a tactile information conversion device according to the present invention comprises at least a storage unit and a control unit in order to provide tactile information to one or a plurality of output units capable of outputting a tactile stimulus, wherein the storage unit includes a tactile definition unit that defines a first type of tactile stimulus and a second type of tactile stimulus for allowing the second type of tactile stimulus to be perceived at a first stimulation point at which the first type of tactile stimulus is generated or a first type of tactile stimulus and a second type of tactile stimulus for allowing the first type of tactile stimulus to be perceived at a second stimulation point at which the second type of tactile stimulus is generated, and wherein the control unit includes: a first stimulation unit that determines the first stimulation point at which the first type of tactile stimulus is generated or generates the first type of tactile stimulus at the first stimulation point via the output unit; and a second stimulation unit that outputs to the output unit tactile information for generating the second type of tactile stimulus via the output unit at the second stimulation point separated within a temporally and/or spatially predetermined threshold value from the first stimulation point of the first type of tactile stimulus, which is determined or generated by the first stimulation unit.

The tactile information conversion device according to the present invention is the above tactile information conversion device, wherein the tactile sensation definition unit defines, as the second type of tactile stimulus, a type of tactile stimulus with a temporal or spatial physiological discrimination range that is larger than that of the first type of tactile stimulus in order to allow the second type of tactile stimulus to be perceived at the first stimulation point or defines, as the first type of tactile stimulus, a type of tactile stimulus with a temporal or spatial physiological discrimination threshold that is larger than that of the second type of tactile stimulus in order to allow the first type of tactile stimulus to be perceived at the second stimulation point.

The tactile information conversion device according to the present invention is the above tactile information conversion device, wherein the first stimulation unit determines or causes force presentation as the first type of tactile stimulus, and the second stimulation unit generates one or a plurality of stimuli among vibration, temperature, and electrical stimuli as the second type of tactile stimulus at the second stimulation point, thereby allowing the second type of tactile stimulus to be perceived at the first stimulation point.

The tactile information conversion device according to the present invention is the above tactile information conversion device, wherein the first stimulation unit determines or generates one or a plurality of stimuli among vibration, temperature, and electrical stimuli as the first type of tactile stimulus, and the second stimulation unit causes force presentation as the second type of tactile stimulus at the second stimulation point, thereby allowing the first type of tactile stimulus to be perceived at the second stimulation point.

The tactile information conversion device according to the present invention is the above tactile information conversion device, wherein the first stimulation unit determines or causes vibration presentation as the first type of tactile stimulus, and the second stimulation unit generates a temperature stimulus as the second type of tactile stimulus at the second stimulation point, thereby allowing the second type of tactile stimulus to be perceived at the first stimulation point.

The tactile information conversion device according to the present invention is the above tactile information conversion device, wherein the first stimulation unit determines or causes temperature presentation as the first type of tactile stimulus, and the second stimulation unit generates a vibration stimulus as the second type of tactile stimulus at the second stimulation point, thereby allowing the first type of tactile stimulus to be perceived at the second stimulation point.

The tactile information conversion device according to the present invention is the above tactile information conversion device, wherein the first stimulation unit determines or causes electrical stimulus presentation as the first type of tactile stimulus, and the second stimulation unit generates vibration and/or temperature as the second type of tactile stimulus at the second stimulation point, thereby allowing the second type of tactile stimulus to be perceived at the first stimulation point.

The tactile information conversion device according to the present invention is the above tactile information conversion device, wherein the first stimulation unit determines or generates vibration and/or temperature as the first type of tactile stimulus, and the second stimulation unit causes electrical stimulus presentation as the second type of tactile stimulus at the second stimulation point, thereby allowing the first type of tactile stimulus to be perceived at the second stimulation point.

The tactile information conversion device according to the present invention is the above tactile information conversion device, wherein the first stimulation point and/or the second stimulation point are perceptual points caused due to phantom sensation illusion.

An input device according to the present invention comprises the above tactile information conversion device.

The input device according to the present invention comprises at least: a multipoint distribution type pressure sensation measurement sensor on a surface layer; a warm/cold feeling measurement sensor in an intermediate layer; and a vibration feeling measurement sensor in a lower layer.

A transmission device according to the present invention comprises the above tactile information conversion device.

A storage device according to the present invention comprises the above tactile information conversion device.

A server device according to the present invention comprises the above tactile information conversion device.

A receiving device according to the present invention comprises the above tactile information conversion device.

An output device according to the present invention comprises the above tactile information conversion device.

The output device according to the present invention comprises, in the above output device, at least: a distribution-type pressure presentation unit using a multipoint electrical tactile sensation stimulus on a surface layer; a high-speed driving type warm/cold feeling presentation unit using a Peltier element in an intermediate layer; and a vibration presentation unit of a wide frequency range in a lower layer.

An interaction operation system according to the present invention is an interaction operation system comprising the above tactile information conversion device that teaches motion to a robot by using a robot teaching device operated by an operator, wherein the robot has: a finger portion for holding an object; an object detection unit that detects the object or the characteristics of the object and generates object detection information and that is arranged in the finger portion; and a robot driving device that drives the robot, and wherein the robot teaching device has: an object detection sensation providing unit that provides a corresponding tactile feeling to the operator in accordance with tactile information converted by the tactile information conversion device based on the object detection information transmitted from the robot.

A tactile sensation presentation method according to the present invention is a tactile information conversion method performed in a tactile information conversion device comprising at least a storage unit and a control unit in order to provide tactile information to one or a plurality of output units capable of outputting a tactile stimulus, wherein the storage unit includes a tactile definition unit that defines a first type of tactile stimulus and a second type of tactile stimulus for allowing the second type of tactile stimulus to be perceived at a first stimulation point at which the first type of tactile stimulus is generated or a first type of tactile stimulus and a second type of tactile stimulus for allowing the first type of tactile stimulus to be perceived at a second stimulation point at which the second type of tactile stimulus is generated, comprising: a first stimulation module that determines the first stimulation point at which the first type of tactile stimulus is generated or generates the first type of tactile stimulus at the first stimulation point via the output unit; and a second stimulation module that outputs to the output unit tactile information for generating the second type of tactile stimulus via the output unit at the second stimulation point separated within a temporally and/or spatially predetermined threshold value from the first stimulation point of the first type of tactile stimulus, which is determined or generated by the first stimulation module.

A tactile information conversion program according to the present invention comprises modules that are implemented by a computer comprising at least a storage unit and a control unit in order to provide tactile information to one or a plurality of output units capable of outputting a tactile stimulus and that are executed in the control unit, wherein the storage unit includes a tactile definition unit that defines a first type of tactile stimulus and a second type of tactile stimulus for allowing the second type of tactile stimulus to be perceived at a first stimulation point at which the first type of tactile stimulus is generated or a first type of tactile stimulus and a second type of tactile stimulus for allowing the first type of tactile stimulus to be perceived at a second stimulation point at which the second type of tactile stimulus is generated, the modules including: a first stimulation module that determines the first stimulation point at which the first type of tactile stimulus is generated or generates the first type of tactile stimulus at the first stimulation point via the output unit; and a second stimulation module that outputs to the output unit tactile information for generating the second type of tactile stimulus via the output unit at the second stimulation point separated within a temporally and/or spatially predetermined threshold value from the first stimulation point of the first type of tactile stimulus, which is determined or generated by the first stimulation module.

The element arrangement structure according to the present invention is an element arrangement structure of a laminated type and/or a horizontally arranged type for elements in the case of presenting at least two types of tactile sensations among electricity, temperature, vibration, and force, wherein either one of or a combination of a plurality of features among features (1) to (4) is employed: (1) a presentation element for electricity is arranged more toward the body than a presentation element for vibration or temperature in a laminated manner; (2) a presentation element for temperature is arranged more toward the body than a presentation element for vibration in a laminated manner; (3) a presentation element for electricity, temperature, and/or vibration is arranged more toward the body than a presentation element for force in a laminated manner; and (4) at least a presentation element for vibration is horizontally arranged.

The element arrangement structure according to the present invention is the above element arrangement structure, wherein, in the case of horizontally arranging the presentation element for vibration, a gap for conversion of vibration into sound, for vibration resonance, or for heat dissipation is provided.

The element arrangement structure according to the present invention is the above element arrangement structure, wherein presentation elements for electricity are horizontally arranged in a dense manner, and presentation elements for temperature and/or vibration are horizontally arranged in a sparse manner.

The element arrangement structure according to the present invention is the above element arrangement structure, wherein at least a portion of the element arrangement structure is of a horizontally arranged type, and wherein presentation elements that are arranged horizontally are connected such that the presentation elements have flexibility as a whole.

The element arrangement structure according to the present invention is the above element arrangement structure, wherein the presentation element for electricity functions as a ground when the presentation element for electricity does not present electricity.

The element arrangement structure according to the present invention is the above element arrangement structure, wherein at least a portion thereof has a horizontally arranged type element arrangement structure, and wherein, in a plurality of presentation elements of the same type that are arranged in the horizontal surface direction, a stimulus is localized between the plurality of elements by phantom sensation.

The element arrangement structure according to the present invention is the above element arrangement structure, wherein at least a portion of the element arrangement structure is of a horizontal type, and wherein the horizontally arranged structure is provided so as to surround the body as a whole.

The element arrangement structure according to the present invention is the above element arrangement structure, wherein at least a portion thereof has a horizontal type element arrangement structure, and wherein the gap is provided between the plurality of presentation elements for vibration that are arranged in the horizontal surface direction.

The element arrangement structure according to the present invention is the above element arrangement structure, wherein the gap is provided on the back side of the horizontally arranged structure so as to surround the body as a whole.

According to the present invention, an effect can be achieved where, in order to provide tactile information to one or a plurality of output units capable of outputting a tactile stimulus, a first stimulation point at which a first type of tactile stimulus is generated is determined or generated, and tactile information for generating a second type of tactile stimulus via the output unit is output to the output unit at a second stimulation point separated within a temporally and/or spatially predetermined threshold value from the first stimulation point of the first type of tactile stimulus that has been determined or generated such that a plurality of types of stimuli can therefore be presented at a point in a concentrated manner from different points.

Further, according to the present invention, an element arrangement structure for presenting a plurality of types of stimuli in a case of presenting a plurality of types of stimuli in a concentrated manner at a point from different points as described above or the like can be provided, the element arrangement structure being an element arrangement structure of a laminated type and/or a horizontally arranged type for elements in the case of presenting at least two types of tactile sensations among electricity, temperature, vibration, and force, where either one of or a combination of a plurality of features among features (1) to (4) is employed: (1) a presentation element for electricity is arranged more toward the body than a presentation element for vibration or temperature in a laminated manner; (2) a presentation element for temperature is arranged more toward the body than a presentation element for vibration in a laminated manner; (3) a presentation element for electricity, temperature, and/or vibration is arranged more toward the body than a presentation element for force in a laminated manner; and (4) at least a presentation element for vibration is horizontally arranged.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 7 is a perspective view showing the structure of an integrated-type tactile transmission module based on the haptic primary color principle;

FIGS. 8A and 8B are diagrams showing perceptual points caused due to phantom sensation illusion;

FIG. 46 is a diagram showing the results of Experiments 1 to 6 according to the second exemplary embodiment.

DETAILED DESCRIPTION OF THE INVENTION

Figure 1:
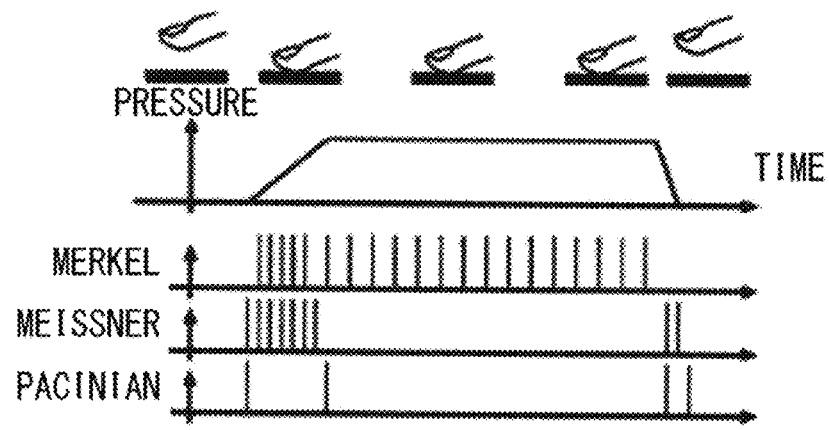
FIG. 1 is a schematic diagram showing the reaction of each cell when a finger is brought into contact with the object and slid on the object or released after being kept still.

Embodiments of a tactile information conversion device, a tactile information conversion method, a tactile information conversion program, a recording medium and an element arrangement structure according to the present embodiment of the present invention will be described in detail in the following with reference to the figures. It should be noted that the present invention is not limited by these embodiment. For example, although an example in which a feature of the tactile information conversion device according to the present invention is connected to an input unit such as a sensor or an output unit that outputs a tactile stimulus or the like may be described in the following embodiments, the present invention is not limited to this, and the feature may be formed as a feature of an independent server device or the like that is not directly connected to the input unit or the output unit. In addition, the present invention may be formed as a part of an input device, a transmitter, a memory device, a receiver, an output device, or the like, or as a converter installed between these devices.

Overview of the Present Embodiment

In the following, for the purpose of explaining the outline of the embodiment of the present invention, a background and an outline leading to the devising of the embodiment of the present invention will be described first, and then the details of the configuration, processes, etc., of the present embodiment will be described in detail. It should be noted that the outline of the present embodiment shows the background and the outline leading to the devising of the embodiment of the present invention and does not limit the present invention.

As the background in which the embodiment of the present invention has been devised, it has been known that human sensation can be divided into a "specific sensation" and a "somatic sensation". A specific sensation refers to a sensation for which there exists a corresponding special sensory organ, such as an eye for a visual sensation, an ear for an auditory sensation, and the like. For example, an "acceleration" sensation is classified as a special sensation in the sense that the sensation corresponds to an ear, in particular, sensory organs such as semicircular canals, a utricle, and a saccule, which serve as a vestibule inside the ear.

On the other hand, a somatic sensation means a body segmental sensation and is roughly divided into a cutaneous sensation, which comes from the skin, and a proprioception sensation, which is a sensation relating to postures and movements that come from internal muscles and tendons. A proprioception sensation is also called a proprioceptive sensation.

The term "tactile sensation" in a broad sense means the entire somatic sensations, which includes cutaneous sensations and proprioception sensations, and the term "tactile sensation" used in the present embodiment means a tactile sensation in the broad sense. Meanwhile, the term "tactile sensation" in a narrow sense means only a touch sensation and a pressure sensation among cutaneous sensations, which include various sensations such as warmth, coldness, pain, etc. These touch sensation and pressure sensation correspond to sensory organs such as Merkel cells, Meissner's corpuscles, Pacinian corpuscles, and Ruffini endings in the skin. When the entire skin is dented or pulled, the skin's deformation and vibration are transmitted to the sensory organs, and a sensation occurs.

Further, there is also a comprehensive sensation with a proprioception sensation that occurs due to stimulation of not only the skin but also the sensory receptors such as the muscle spindle of a muscle, the Golgi receptor of a tendon, and the like caused by touching as a result of moving the body, which is referred to as active touch. Therefore, a tactile sensation in a broad sense can be considered to be the integration of a wide variety of sensations including not only a simple sensation indicating whether or not something is touching, which corresponds to one sensory organ, but also proprioception sensations. As an example, an explanation will be given of a process in which a person recognizes a certain object, e.g., an iron ball through the tactile sensation in the broad sense. First, a person learns the shape through touching. However, even when a person touches an iron ball through thick gloves that are put on the fingers instead of directly touching the iron ball with the fingers, the person can predict that the iron ball is a "sphere" based on information indicating how the joints of the arms, the hands, and the fingers have moved and what kind of shape has been obtained. As is also predictable from this, the recognition of a rough shape is made not through the skin but through proprioception of muscle spindles, Golgi receptors, etc. In addition to a rough shape, feeling hardness or spring-like repulsive force and sensation for, e.g., resistance that occurs when moving an arm in water also come from proprioception.

Cutaneous sensation is for recognizing a finer shape pattern of a surface called "texture". This sensation does not occur when thick gloves are on, and it is important to touch directly with the skin. This sensation is further improved in recognition accuracy through active touch described above. This tactile sensation, in which the proprioception sensation and the cutaneous sensation come together, accompanied with movements is referred to as haptic perception or haptics. The ball cannot be recognized to be of iron just by holding and touching the ball. However, cutaneous sensation for feeling warmth and coldness in addition to the texture greatly contributes to the recognition that the ball is of a metal. In the following description of the present embodiment, tactile sensation may particularly indicate cutaneous sensation. However, tactile sensation is not limited to this and may also include proprioception sensation.

In order to convey a sensation obtained when a person directly touches a certain object with the surface of the finger, it is difficult to treat a tactile sensation as a medium if an object that is completely the same as the actual object is not reproduced on the surface of the person's finger. For example, in the case of visual sensation, even if the color of an object is different from that of the actual spectrum, since a person can see the same color as long as the pyramidal cells respectively being in charge of the three primary colors of RGB of the person fire in the same manner, this principle is applied to the current TV sets, color photos, and color prints.

The inventors of the present invention consider that tactile sensation should be able to be used as an information medium in the same way as in the visual sensation as long as there exist haptic primary colors for the tactile sensation just like the three primary colors of light. One of the facts that supports the existence of the haptic primary colors is the fact that there are distinctly different types of cutaneous sensory organs in the tactile sensation of a person. In other words, similar to the RGB pyramidal cells corresponding to the three primary colors, there exist Merkel cells, Meissner's corpuscles, Pacinian corpuscles, Ruffini endings, etc., which correspond to haptic primary colors also in tactile sensation. There also exit free nerve endings that react to warmth, coldness, and pain. As a result of conventional neurophysiology study, it is known that Merkel cells and Ruffini endings detect pressure and shear force, that Meissner's corpuscles detect low frequency vibration, and that Pacinian corpuscles detect high frequency vibration. FIG. 1 is a schematic diagram showing the reaction of each cell when a finger is brought into contact with an object and slid on the object or released after being kept still. The horizontal axis represents time, and the vertical axis indicates the excitation state of each cell.

As shown in FIG. 1, when coming into contact with an object, Merkel cells detect pressure, Meissner's corpuscles detect low frequency vibration, and Pacinian corpuscles detect high frequency vibration, and thereby the pressure, the low frequency vibration, and the high frequency vibration can be perceived by giving meanings to the displacement, the velocity, and the acceleration by the Merkel cells, the Meissner's corpuscles, and the Pacinian corpuscles, respectively. Not limited to a flat surface as shown in the figure, real objects have many physical properties such as concavo-convex shape, friction, heat, and elasticity. Considering a situation where a cutaneous sensation occurs, when touching an object, force, vibration, temperature change, etc., occur on the skin surface and are transmitted to the inside of the skin, and the above-stated sensory organs react, causing a tactile sensation. Therefore, the inventors of the present invention consider that, if it is possible to cause each sensory organ to have a reaction that is the same as the reaction occurring when touching the object, the person has the same tactile sensation as if the person were touching the actual object, regardless of the physical properties of the object such as concavo-convex shape, friction, heat, and elasticity. In other words, the inventors of the present invention consider that, if it is possible to react cells that correspond to the haptic primary colors in a tactile sensation in the same manner as in a visual sensation, only the tactile sensation can be reproduced and used as an information medium just like a visual sensation without reproducing and presenting the actual object.

In this case, there are roughly two ways to cause the sensory organs to fire in the same manner. The first method is to find bases in the physiological space and then selectively cause the sensory organs, which serve as the bases, to fire through electrical stimulation. In the present embodiment, the term "base" means a constituent unit or an element. Since an invasive method where electrodes are implanted at the locations of all the sensory organs so as to provide stimulation is not practical, one possible option is a method where transcutaneous electrostimulation through the skin surface is used and where the sensory organs are selectively stimulated (see, for example, Japanese Patent No. 3543097 by the present inventor). This method was developed by the inventors of the present application, and, for example, it allows only Meissner's corpuscles to be selectively stimulated through an anodal stimulus and allows Merkel cells to be stimulated via skin electrodes through electrical stimulation of the cathode such that a sensation similar to a pressure sensation can be transmitted. However, there is a problem that selective stimulation cannot be made for the Pacinian corpuscles and selective stimulation cannot be made for warmth and coldness, either. Further, even a stimulus that does not originally generate a pain sensation may cause a pain sensation due to an electrical stimulus. Therefore, the first method has not reached the point where general stimulation can be provided as a method of directly and selectively stimulating the cells serving the bases of the physiological space.

Figure 2:
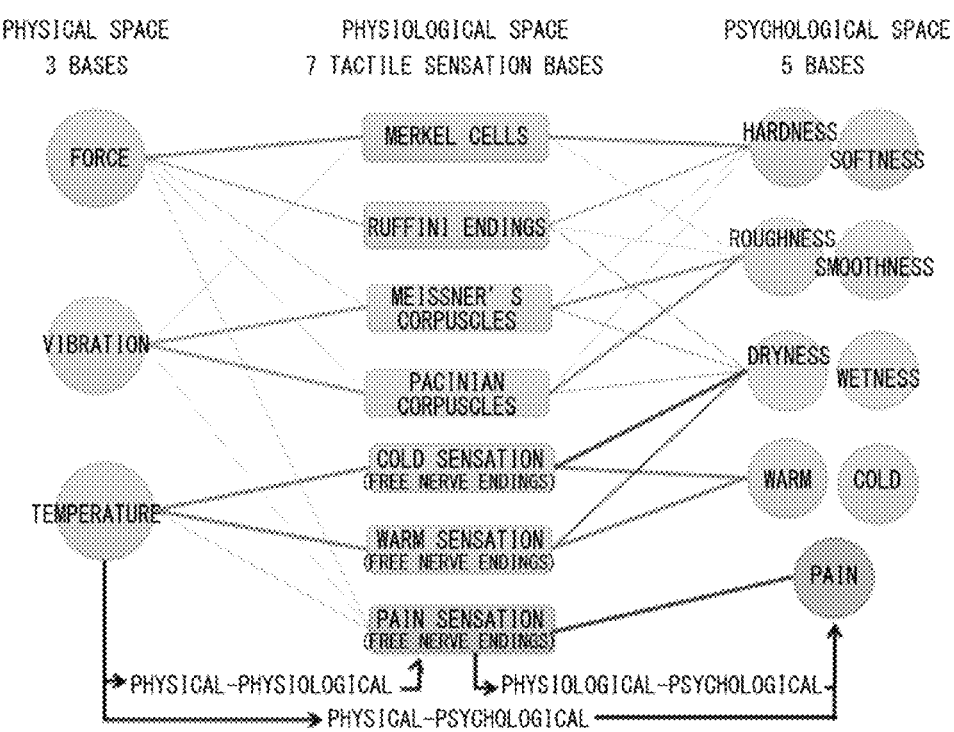
FIG. 2 is a diagram schematically showing a second method for synthesizing three bases "force", "vibration", and "temperature" so as to stimulate seven tactile sensation bases in a physiological space.

The second method is a method of selecting bases in the physical space by a method that is equivalent to a method where RGB in visual sensation are used as bases. FIG. 2 is a diagram schematically showing the second method for synthesizing three bases "force", "vibration", and "temperature" so as to stimulate seven tactile sensation bases in a physiological space. Merkel cells and Ruffini endings respond to pressure and shear force, Meissner's corpuscles respond to low frequency vibrations, Pacinian corpuscles respond to high frequency vibrations, and free nerve endings respond to warmth, coldness, and pain. Thus, a person ends up obtaining a feeling that is the same as the actual feeling as long as the pressure and shear force, i.e., "force" serving as a vector force, "vibration" of from a low frequency to a high frequency, and "temperature" at the skin surface of the person obtained when touching the actual object can be presented in the same way even when the person is not actually touching the object. Forces and vibrations often change due to active movements of the person. However, in that case, the forces and vibrations need to be reproduced while following the movements of the person. This method is considered to be similar to a method where, in visual sensation, not all spectra of light are reproduced and only spectra corresponding to RGB are used as bases such that almost all visual information is reproduced by synthesis based on those bases. In other words, the inventors of the present application consider that, instead of reproducing all physical properties such as concavo-convex shape, friction, heat, and elasticity of an object, it is only necessary to record and transmit, using as bases only the three physical quantities of "force", "vibration", and "temperature" that occur on the skin surface due to contact with the object and that are captured by receptor cells, temporal changes of the bases and perform synthesis based on these bases. In other words, the inventors of the present application have proceeded with the development of this second method as a basic form of the haptic primary color principle.

Figure 3:
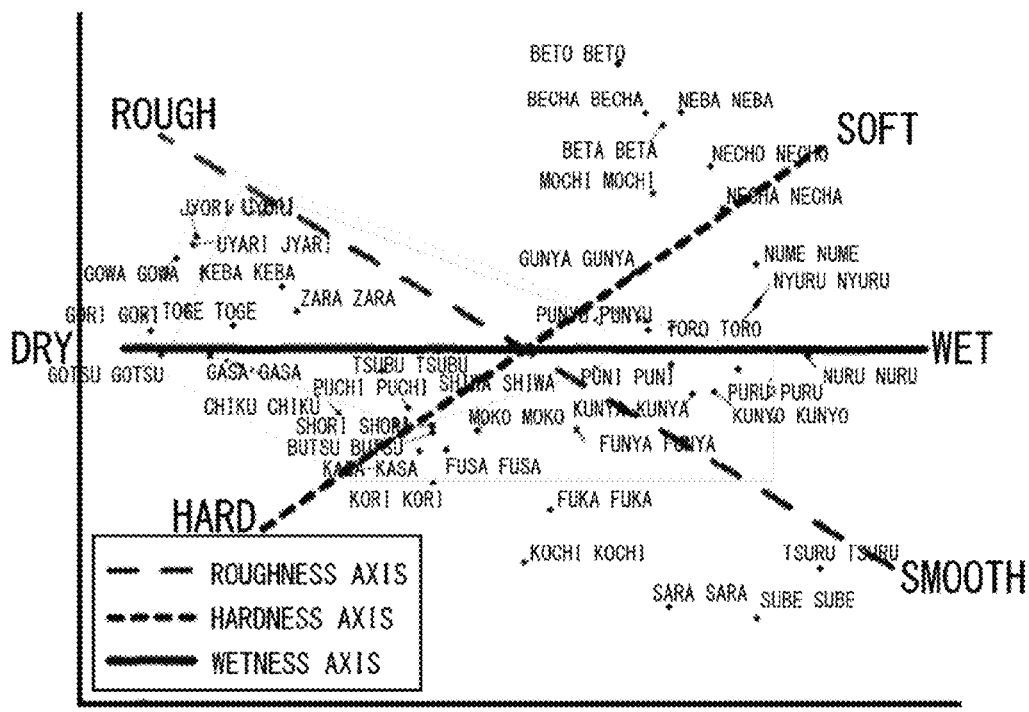
FIG. 3 is a diagram showing an example of a psychological texture map in which various onomatopoeias are positioned on a map with three axis: a roughness axis; a hardness axis; and a wetness axis.

The inventors of the present application consider that there remain problems toward miniaturization in the method based on "force", "vibration", and "temperature" and that even more intensive study is necessary. In other words, for the presentation of "force", it is necessary to prepare a fixed place (ground) for exerting a force at a location different from a point where the force is applied, due to the characteristics of the force physical quantity. For example, in order to apply force to the finger pad, grounding needs to be done at a part such as the back side of the finger, and the force needs to be applied from there. In this case, when preparing a presentation device itself, the device cannot be put only in the vicinity of a stimulation site thereof. Therefore, a comparatively large space is inevitably required, which is a huge restriction in miniaturizing the device. Also, in general force presentation to the skin surface, there remains the problem that, even though pressure in the pushing direction can be presented, force in the pulling direction cannot be presented. If the force in the pulling direction cannot be presented, for example, it is difficult to present a variety of psychological textures expressed by onomatopoeia such as a necho-necho feeling (a sticky and wet feeling). FIG. 3 is a diagram showing an example of a psychological texture map in which various onomatopoeias are positioned on a map with three axis: a roughness axis; a hardness axis; and a wetness axis.

Figure 4:
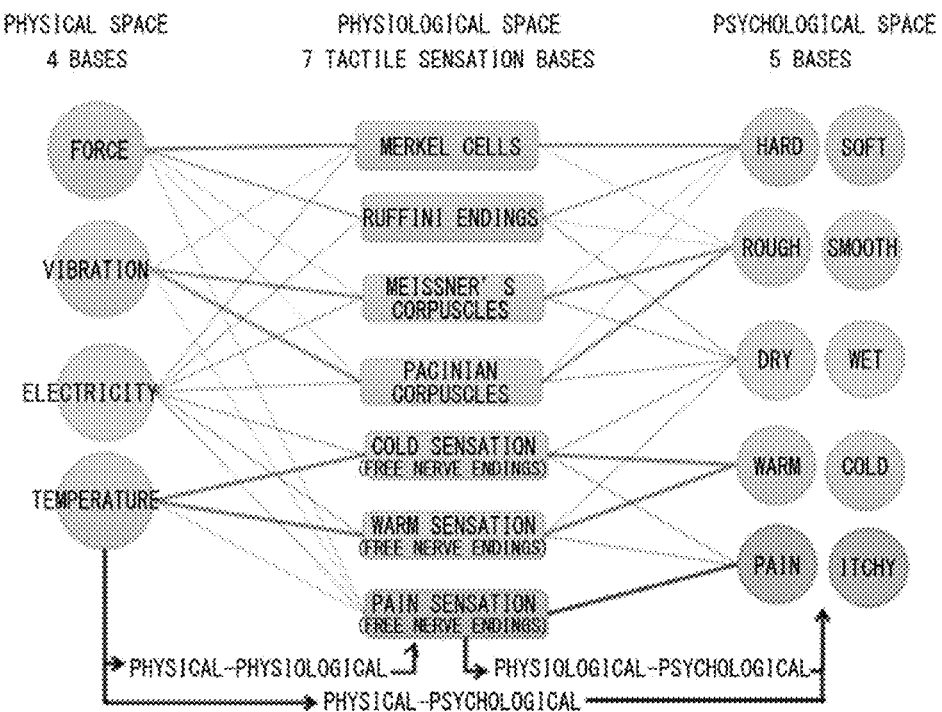
FIG. 4 is a diagram schematically showing a method according to the present embodiment for performing synthesis based on four bases: "force"; "vibration"; "temperature"; and "electricity", in a physical space so as to reproduce various tactile feelings in a psychological space.

An embodiment according to the present invention has been devised as a result of intensive study by the inventors of the present application in view of the various problems described above, and the problems are to be overcome by including "electricity" as a base in addition to the three bases: "force", "vibration"; and "temperature". That is, the first method and the second method are combined so as to compensate for each other's disadvantages. FIG. 4 is a diagram schematically showing a method according to the present embodiment for performing synthesis based on four bases: "force"; "vibration"; "temperature"; and "electricity", in a physical space so as to reproduce various tactile feelings in a psychological space.

In the present embodiment, all the "force" may be replaced with "electricity" so that synthesis is performed based on the three bases while having zero involvement of "force" among the four bases. Further, the present embodiment is not limited to this, and a spatiotemporal element of "time" and/or "space" may be further added to the bases. Electricity is not generated during the contact with the actual normal object except for a special case where static electricity is felt. However, since electricity is an obvious physical quantity, electricity is a base in the physical space.

Since this electrical stimulus causes a pressure sensation, a vibration sensation, and even a pain sensation, etc., it is a major feature of the present embodiment that the electrical stimulus has an effect on tactile feelings based on the five bases in the psychological space depending on the way the electrical stimulus is applied. In other words, instead of proving an approach of stimulating tactile sensation according to the seven bases in the physiological space based on the bases in the physical space, this embodiment provides an approach of combining a plurality of bases in the physical space including electricity so as to reproduce a variety of tactile feelings based on the five bases in the psychological space. For example, by appropriately selecting a plurality of bases in the physical space including electricity and creating tactile information for presenting a predetermined tactile feeling based on the selected physical quantity, it is possible to reproduce a psychological texture that is expressed by onomatopoeia, in other words, a psychological quantity integratedly perceived in the brain from the information obtained by a plurality of different tactile receptors of a human body. This makes it possible to present a tactile feeling that works on tactile ability based on multimodal (multi-sensory type), unlike conventional techniques that simply stimulate tactile sensation. A specific technique of presenting a psychological texture that is expressed by onomatopoeia will be described later.

According to an embodiment of the present invention, the range of feelings that can be presented only by conventional force, vibration, and temperature can be greatly widened, in particular, by providing feelings such as hardness and softness, dryness and wetness, and the like. Further, when it is difficult to present the force, it is possible to substitute electricity for the presentation of force. Thus, it is possible to create a miniaturized multimodal (multi-sensory type) device. One of the major features of the present embodiment is to present a tactile feeling by performing syntheses based on a plurality of bases in the physical space including electricity.

Further, according to one embodiment of the present invention, one of the features of the present embodiment is an element arrangement structure of a laminated type and/or a horizontally arranged type for elements for presenting at least two types of tactile sensations among electricity, temperature, vibration, and force in order to produce a multimodal (multi-sensory type) device or the like, where either one of or a combination of a plurality of features among features (1) to (4) is employed: (1) a presentation element for electricity is arranged more toward the body than a presentation element for vibration or temperature in a laminated manner; (2) a presentation element for temperature is arranged more toward the body than a presentation element for vibration in a laminated manner; (3) a presentation element for electricity, temperature, and/or vibration is arranged more toward the body than a presentation element for force in a laminated manner; and (4) at least a presentation element for vibration is horizontally arranged.

Described above is the outline of the present embodiment. Next, a detailed example of the configurations of devices and processes for realizing the above-described embodiment of the present invention will be described in detail in the following.

Configuration of Tactile Feeling Presentation System

Figure 5:
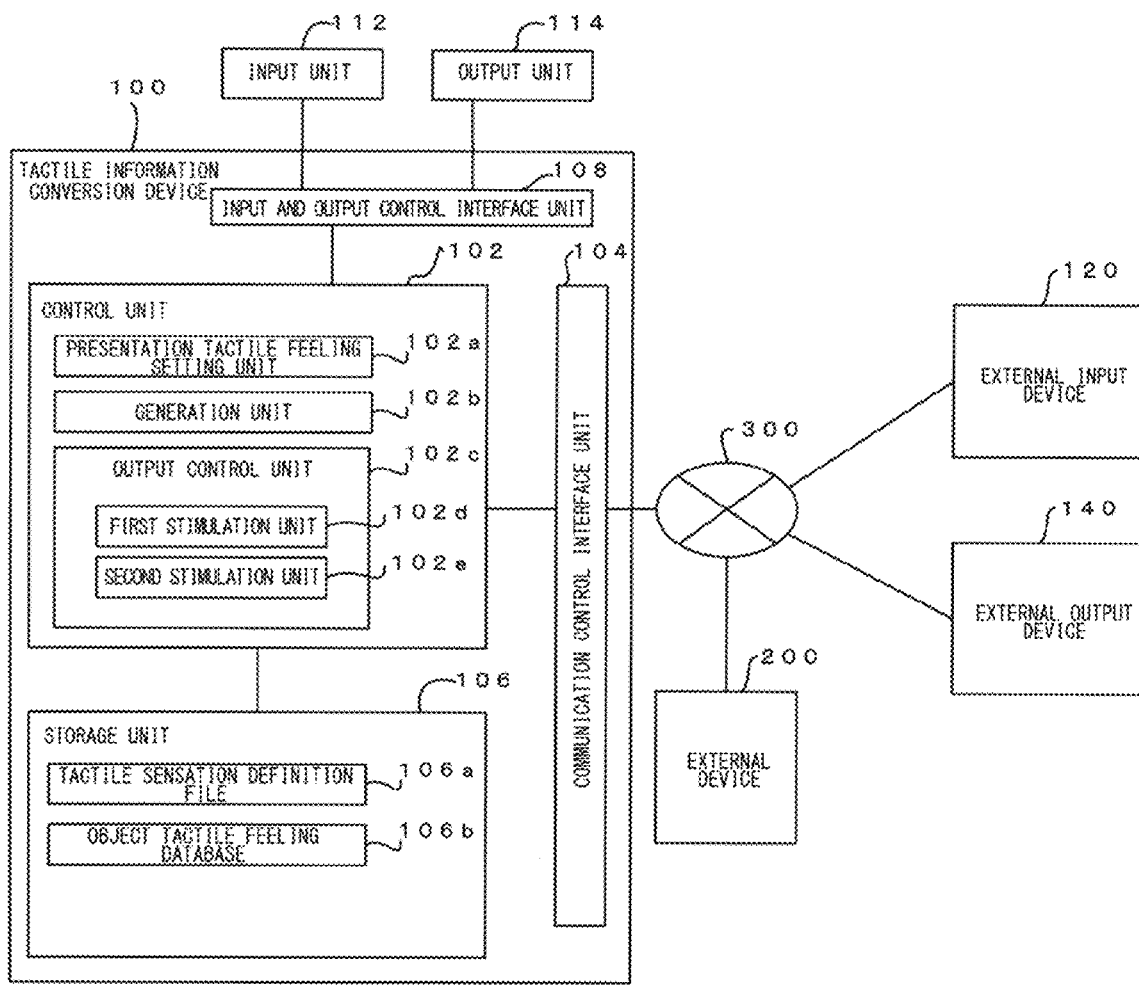
FIG. 5 is a block diagram showing an example of the configuration of a tactile feeling presentation system including a tactile information conversion device according to an embodiment of the present invention.

The configuration of a tactile feeling presentation system including a tactile information conversion device will be described with reference to the figures. FIG. 5 is a block diagram showing an example of the configuration of the tactile feeling presentation system including the tactile information conversion device according to the embodiment of the present invention and conceptually shows only parts of the configuration that are related to the present invention.

As shown in FIG. 5, in the present embodiment, the tactile feeling presentation system includes a tactile information conversion device 100, an external input device 120 such as various sensors, an external output device 140 capable of outputting a physical quantity, and an external device 200 such as a server, which are connected via a network 300. In FIG. 5, an example is shown where the tactile information conversion device 100, the external input device 120, the external output device 140, and the external device 200 are provided, one of each, in the tactile feeling presentation system. However, the tactile feeling presentation system is not limited to this and may include a plurality of each of the devices. The tactile information conversion device 100 is a personal computer, a computer for a server, a portable information terminal (a tablet type computer, etc.), or the like. The network 300 has a function of mutually connecting the tactile information conversion device 100, the external input device 120, the external output device 140, and the external device 200 and is, for example, a wired or wireless LAN, the Internet, or the like.

In FIG. 5, the external input device 120 is an input means such as various sensors. The external input device 120 may be a recognition device, such as a camera, a touch panel, a motion sensor, or the like, for recognizing a user's movement or an object. More specifically, the external input device 120 may recognize the body movement of a person by an arbitrary detection means such as a camera, a pressure sensor, or the like. For example, the external input device 120 may detect the body movement of the user by using a publicly-known gesture recognition technique, a publicly-known motion sensor, or the like. A gesture can be obtained based on the position and movement of the user in the physical space and can include an arbitrary movement of the user, which is dynamic or static, such as the movement of the arm or the leg or a stationary posture.

As an example of the present embodiment, in the external input device 120, a capture device such as a camera may capture user image data and recognize the user's gesture(s) based on this user image data. More specifically, the external input device 120 may recognize and analyze the gesture(s) made by the user in the user's three-dimensional physical space using a computer environment and transmit motion data of the user that has been interpreted, raw data before the analysis, etc., to the tactile information conversion device 100. As an example, the external input device 120 may be a wearable-type sensor that detects the shape of a finger, the posture of a body, a contact place, a contact area, pressure, vibration, and the like. For example, a sensing technique such as a glove-type sensor of the TELESAR system may be used, which is a tele-existence system capable of transmitting reaction force and temperature to a fingertip developed by the inventors of the present application. The external input device 120 may be provided with a plurality of two-dimensionally arranged force detection sensors, a vibration generation source, a vibration detection sensor, a temperature sensor, a timer, and the like as in an integrated type tactile measurement module or the like described later. As an example of publicly-known motion recognition means, a Kinect sensor manufactured by Microsoft Corporation, a RealSense sensor manufactured by Intel Corporation, or the like may be used. According to these publicly-known sensing techniques, motion data such as skeleton motion data of a whole body and/or fingers, contact data, etc., can be obtained. In publicly-known motion sensors, the movement of a person is analyzed by using a control means built in the sensors, or the movement and attributes of a person are analyzed by a control means of a computer that is connected. In the present embodiment, either way may be employed, and, for example, these analysis functions may be realized by a control means (processor or the like) of the external input device 120, a control means of the tactile information conversion device 100 that has received the raw data before analysis, or the control means of both in a decentralized manner. In addition, a publicly-known film pressure sensor or the like described in Non-patent Document 2 or the like may be used.

Figure 6:
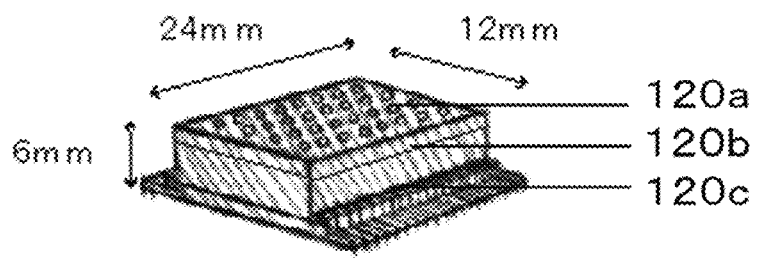
FIG. 6 is a perspective view showing the structure of an integrated-type tactile measurement module based on the haptic primary color principle.

As described above, the external input device 120 may be used to recognize an object from an image captured by a camera or the like and present a tactile feeling according to the object that has been recognized; alternatively, the external input device 120 may be used to present a tactile stimulus at an appropriate timing in accordance with the posture and movement of the body of the user. In addition, the external input device 120 may be used to detect a tactile sensation or a tactile feeling and present a tactile feeling recognized based on a learning result from the tactile feeling that have been detected or tactile information that has been detected, or may be used as basic data for compensating an error from a sensation quantity so as to present the detected tactile sensation and/or the actual tactile feeling based on the tactile sensation. FIG. 6 is a perspective view showing the structure of the integrated-type tactile measurement module based on the haptic primary color principle. FIG. 7 is a perspective view showing the structure of the integrated-type tactile transmission module based on the haptic primary color principle.

In the haptic primary color principle, tactile sensation is considered as a synthesis of elements: a pressure sensation/a shear force (perceived by Merkel cells and Ruffini endings)/a low frequency vibration sensation (perceived by Meissner's corpuscles)/a high frequency vibration sensation (perceived by Pacinian corpuscles)/a cold sensation/a warmth sensation/a pain sensation (each perceived by free nerve endings), based on spatiotemporal relationships between the elements so as to achieve decomposition and synthesis of the tactile sensation. As shown in FIG. 6 and FIG. 7, the inventors of the present invention have developed modules capable of integrally acquiring and presenting each of elements: force, a vibration sensation, and a coldness and warmth sensation, based on this haptic primary color principle. Both modules have a length of 24 mm, a width of 12 mm, and a height of 6 mm, which are suitable for contact with the finger pad.

In the integrated-type tactile measurement module shown as an example of the external input device 120 in FIG. 6, a 32-point distribution-type pressure sensation measurement sensor 120a is disposed on a surface layer, a warm/cold feeling measurement sensor 120b having a body temperature presentation function is disposed in an intermediate layer below the surface layer, and a vibration feeling measurement sensor 120c in a wide frequency range is disposed in a further lower layer.

In an integrated-type tactile presentation module shown as an example of the external output device 140 in FIG. 7, a distribution-type pressure presentation unit 140a based on 32-point electrical tactile stimulation is disposed on a surface layer and a high-speed driving-type warm/cold feeling presentation unit 140b formed of a matrix of four Peltier elements is disposed in an intermediate layer below the surface layer. A vibration presentation unit 140c of a wide frequency range (HiFi) is disposed in a further lower layer.

Thereby, force, vibration, and temperature that have been considered as individual physical properties thus far and whose transmission have required the combining of a large number of elements can be integrated in a spatiotemporal manner, and the transmission of a tactile sensation with high presence can be achieved. In the related art, there exist several technological problems in realizing a compact tactile transmission module. First, in the related art, in order to present a pressure sensation and a low frequency vibration sensation, an actuator such as a motor or air pressure is generally used to generate a physical force on the skin. However, with such a method, miniaturization of a certain level or more cannot be expected. Therefore, in the present embodiment, by using selective stimulation of a tactile receptor through percutaneous electrical stimulation so as to electrically stimulate nerves connected to Merkel cells, which perceive a pressure sensation, and Meissner's corpuscles, which perceive a low frequency vibration sensation, through the skin, a pressure sensation and a low frequency vibration sensation can be freely generated without any physical stimulation. It is shown that, by changing the stimulation pattern, each of the pressure sensation and the low frequency vibration sensation can be selectively stimulated. For a stimulating electrode, a thin-type high density electric tactile display that uses a flexible printed substrate is used.

It is shown that, due to the human's tactile perception characteristic, 2 mm pitch is enough even for fingertips, which have the smallest two-point discrimination threshold, with respect to pressure sensation presentation. In the integrated-type tactile measurement module according to the present embodiment, by using a flexible substrate and using a thin pressure sensation sensor that allows for multi-point measurement corresponding to the electric tactile display of the integrated-type tactile measurement module, a thin sensor and a display are formed that acquire and present a high density and multi-point pressure sensation. In other words, the distribution-type pressure sensation measurement sensor 120a and the distribution-type pressure presentation unit 140a can realize highly accurate pressure sensation presentation and pressure sensation measurement at 32 points of four rows and eight columns at intervals of 3 mm or less. This module can be applied not only to fingertips but also to any part of a human body surface by making the module compact and integrated. In addition, since the encoding is performed based on the principle of haptic primary colors, general-purpose use is possible.

Regarding the presentation of a high frequency vibration sensation, many vibration actuators have been developed in the past, most of which are designed by setting the resonance frequency in the frequency band of around 200 Hz, which is most easily perceived by people. This is effective in presenting strong stimulation with low power consumption. However, on the other hand, there is a problem that it is not suitable for presenting a delicate tactile feeling including various vibration frequencies generated in a natural touch motion. Therefore, in the vibration presentation unit 140c of the integrated-type tactile presentation module, in order to realize a vibration actuator optimum for vibration sensation presentation, a small vibration actuator capable of presenting a vibration sensation with flat characteristics is used in a wide vibration frequency band of 1 Hz to 1000 Hz. As physiological knowledge of a tactile sensation, it is known that Pacinian corpuscles, which mainly perceive high frequency vibrations, have a large receptive field of about 1 to 2 $cm^2$, and, based on this, the size of the vibration actuator is designed to be 2 $cm^2$. As for the acquisition of a vibration sensation by a vibration feeling measurement unit 120c, a technique for acquiring vibration in a wide frequency band using a vibration microphone has been established, and this technique is applied.

Regarding the presentation of a coldness and warmth sensation, it is known that it is necessary to reproduce the heat transfer between the human skin and the contact object instead of reproducing the absolute temperature in the haptic primary color principle. Therefore, the warm/cold feeling measurement sensor 120b and the warm/cold feeling presentation unit 140b have bidirectionality in the acquisition and presentation of a coldness and warmth sensation, that is, the sensor that acquires a coldness and warmth sensation has a function as a display for reproducing a body temperature equivalent to that of a human. Also, in conventional coldness and warmth sensation transmission, low time responsiveness is considered to be a problem. However, by a high-speed coldness and warmth sensation presentation technique that allows for a temperature change of around 1 Hz by utilizing the coldness and warmth sensation perception characteristic of a human being and arranging and controlling a plurality of temperature presentation elements in a matrix form, the transmission of a warm/cold feeling that changes in a spatiotemporal manner can be realized.

Referring back to FIG. 5 again, the external output device 140 is not limited to the above-described integrated-type tactile presentation module and is an output unit that can output physical quantities including electricity, force, temperature, vibration, time and space, and the like. For example, the external output device 140 may be an output device in which an electric stimulator, a force presentation actuator, a Peltier element, a vibration element, etc., are arranged in a matrix form that is capable of spatiotemporally outputting the physical quantities. Here, the vibrator may be a voice coil type vibrator, a piezo element, or a vibration motor. In addition, the external output device 140 may output the above-mentioned physical quantities using publicly-known electric output means, force presentation means, temperature presentation means, vibration presentation means, or spatiotemporal arrangement means. As an example, an object detection sensation providing technique of the TELESAR system may be used, which is a tele-existence system capable of transmitting reaction force and temperature to a fingertip developed by the inventors of the present application (see, for example, Japanese Patent Application Publication No. 2013-91114). The external output device 140 may be provided with a plurality of two-dimensionally arranged pressing means, a vibration generating means, a heat generating means, a timer, a receiving device, and the like as in the integrated-type tactile presentation module described above.

An explanation will be now made regarding an example of an element arrangement structure preferred for a case where at least two types of tactile sensations among electricity, force, temperature, vibration, and the like are output by the external output device 140 or the like so as to localize a plurality of types of stimuli at a point in a concentrated manner from different points, where a stimulus is localized between a plurality of elements by phantom sensation using the same type of stimulus, where a multimodal tactile feeling is presented, or the like. In the element arrangement structure, elements may be arranged in a laminated manner or horizontally arranged parallel to the skin surface, or some of the elements may be arranged in a laminated manner while the rest are horizontally arranged.

(1) As one of the features of the element arrangement structure, a presentation element for electricity may be arranged more toward the body than a presentation element for vibration or temperature in a laminated manner as shown in the following table. While vibration and temperature are easy to be transmitted through the structure and physiological discrimination thereof is ambiguous, electricity is suitable for element arrangement since the stimulus thereof is difficult to be transmitted unless the stimulus is presented directly onto the skin surface and the discrimination thereof is exact.

TABLE 1

| (OUTSIDE) |
|---|
| PRESENTATION ELEMENT FOR VIBRATION/TEMPERATURE |
| PRESENTATION ELEMENT FOR ELECTRICITY |
| (SKIN SIDE) |

(2) As one of the features of the element arrangement structure, a presentation element for temperature may be arranged more toward the body than a presentation element for vibration in a laminated manner as shown in the following table. In the case of temperature and vibration, vibration is relatively more easily transmitted inside the structure and physiological discrimination thereof is more ambiguous, and temperature is more suitable for element arrangement since temperature is more difficult to be transmitted through the structure and the discrimination thereof is more exact.

TABLE 2

| (OUTSIDE) |
|---|
| PRESENTATION ELEMENT FOR VIBRATION |
| PRESENTATION ELEMENT FOR TEMPERATURE |
| (SKIN SIDE) |

(3) As one of the features of the element arrangement structure, a presentation element for electricity, temperature, and/or vibration may be arranged more toward the body than a presentation element for force in a laminated manner as shown in the following table. Among them, force is more easily transmitted inside the structure and is more suitable for element arrangement.

TABLE 3

| (OUTSIDE) |
|---|
| PRESENTATION ELEMENT FOR FORCE |
| PRESENTATION ELEMENT FOR ELECTRICITY/ TEMPERATURE/VIBRATION |
| (SKIN SIDE) |

(4) As one of the features of the element arrangement structure, at least a presentation element for vibration may be horizontally arranged. For example, in the case of horizontally arranging the presentation element for vibration, a gap for conversion of vibration into sound, vibration resonance, or heat dissipation may be provided. As shown in the following table, vibration and sound can be resonated so as to be amplified by providing a gap between horizontally arranged elements for vibration, and unnecessary heat that does not need to be presented to the skin side using a Peltier element or the like can be suitably dissipated. When the element arrangement structure is attached so as to surround the body as a whole, a gap may be provided on the back side so as not to hinder the tactile presentation on the ventral side.

TABLE 4

| PRESENTATION ELEMENT FOR VIBRATION | (OUTSIDE) PART OF STRUCTURE GAP PART OF STRUCTURE SUCH AS OTHER PRESENTATION ELEMENTS (SKIN SIDE) | PRESENTATION ELEMENT FOR VIBRATION |
| --- | --- | --- |

As one of the features of the element arrangement structure, presentation elements for electricity may be horizontally arranged in a dense manner, and presentation elements for temperature and/or vibration may be horizontally arranged in a sparse manner. Among them, temperature or vibration relatively has a larger two-point discrimination threshold and the physiological discrimination thereof is more ambiguous, and electricity has a smaller two-point discrimination threshold and the physiological discrimination thereof is more exact; thus, electricity is more suitable for element arrangement.

Further, as one of the features of the element arrangement structure, when at least a part thereof is horizontally arranged, the element arrangement structure may be formed to have flexibility as a whole. This is particularly suitable when the element arrangement structure in which at least a part thereof is horizontally arranged is provided so as to surround the body as a whole. For example, elements that are arranged horizontally may be placed on a flexible substrate such that the elements are easily in contact with the skin in a close manner. As another example, elements that are arranged horizontally may be connected such that the elements have flexibility as a whole. For example, although the elements arranged horizontally are mounted on solid substrates, as long as the solid substrates are rotatably connected to one another, the elements are flexible as a whole. As another example, the element arrangement structure may be formed so as to fit the shape of the body surface close to a spherical surface by connecting element substrates in the form of a narrow belt by a connector or the like and causing curvature, lateral displacement, or the like in each of the narrow belts. In the laminated arrangement, the element arrangement structure may be formed so as to easily fit the body by providing a layer of an elastic body between the substrate on the skin side and the substrate on the outside. As the elastic body, a silicone rubber, a urethane foam, or the like may be used.

In the above-described element arrangement structure, the presentation element for electricity may function as a ground (earth) when the presentation element for electricity does not present electricity. In particular, since elements to be energized for electrical stimulation are limited when a large number of presentation elements for electricity are horizontally arranged, this is suitable since the surroundings thereof can function as a ground (earth) so as to serve as the ground for an electrical potential.

If the tactile information conversion device 100 does not perform the inputting or outputting of a tactile sensation or the like in real time with the external input device 120 or the external output device 140, the tactile information conversion device 100 does not need to be connected to the network 300 all the time. For example, when the connection is established, the tactile information conversion device 100 may acquire input data stored in the external input device 120 and input data stored in the external device 200 or the like such as a server from the external input device 120. In the same way, when performing tactile presentation, the external output device 140 may be connected to the tactile information conversion device 100 or the external device 200, to which tactile information has been uploaded, to acquire tactile information.

Configuration of Tactile Information Conversion Device 100

Next, the configuration of the tactile information conversion device 100 according to the present embodiment will be described in detail. Referring back to FIG. 5, the illustration shows a block diagram showing an example of the configuration of the tactile information conversion device 100 to which the present embodiment is applied and conceptually shows mainly parts of the configuration that are related to the present invention. In the present embodiment, an example is explained where the tactile information conversion device 100 includes the input unit 112, the output unit 114, and the like. However, the present invention is not limited to this example, and the tactile information conversion device 100, without including the input unit 112, the output unit 114, or the like, may function as a server or the like that generates tactile information and outputs and transmits the tactile information according to a request from the outside.

In FIG. 5, the tactile information conversion device 100 roughly includes a control unit 102 such as a processor (e.g., a CPU) that comprehensively controls the entire tactile information conversion device 100, a communication control interface unit 104 that is connected to a communication device (not shown) such as a router or the like connected to a communication line or the like, an input and output control interface unit 108 connected to the input unit 112 and the output unit 114, and a storage unit 106 for storing various types of databases, tables, and the like, and these units are communicably connected via an arbitrary communication path. The units may be configured to be temporarily connected to be able to communicate via the arbitrary communication path in accordance with a need for inputting and/or outputting by the input unit 112 and the output unit 114. For example, the units may be configured such that the units can temporarily exchange tactile information using a recording medium such as a USB memory or the like.

Various types of databases and tables (for example, a tactile sensation definition file 106a, an object tactile feeling database 106b, etc.) stored in the storage unit 106 are storage means for a small capacity high-speed memory (for example, cache memory) or the like configured using static random access memory (SRAM), a fixed disk drive or the like such as a hard disk drive (HDD) or a solid state drive (SSD), or the like and store various types of programs, tables, files, databases, web pages, etc., used for various types of processes.

Of these, the tactile sensation definition file 106a is a tactile sensation definition means for defining the types of two or more tactile stimuli to be presented. The tactile sensation definition file 106a may store a temporal and/or spatial threshold value with respect to a first stimulation point. For example, the tactile sensation definition file 106a may define a first type of tactile stimulus and a second type of tactile stimulus. More specifically, the tactile sensation definition file 106a may define, as the second type of tactile stimulus, a type of tactile stimulus with a temporal or spatial physiological discrimination threshold that is larger than that of the first type of tactile stimulus. This allows the second type of tactile stimulus to be perceived at the first stimulation point through the processes performed by the output control unit 102c described later. The tactile sensation definition file 106a may define, as the first type of tactile stimulus, a type of tactile stimulus with a temporal or spatial physiological discrimination threshold that is larger than that of the second type of tactile stimulus. This allows the first type of tactile stimulus to be perceived at a second stimulation point through the processes performed by the output control unit 102c described later. The term "discrimination threshold" means the minimum amount of change that allows for the perception of the difference in a stimulus. For example, a temporal physiological discrimination threshold is the minimum time difference with which a difference in a stimulus can be perceived, and a spatial physiological discrimination threshold is the minimum spatial position difference (such as a distance or the like) with which a difference in a stimulus can be perceived. Normally, for the temporal physiological discrimination threshold and the spatial physiological discrimination threshold, there is a predetermined threshold depending on a site of the body, and, as one example, a predetermined threshold for the tactile sensation definition file 106a may be set in advance using the publicly-known range of the threshold (an upper limit for the perception for the same time/place and a lower limit value for the perception for different time/place) for temporal or spatial physiological discrimination. In general, it is considered that discrimination becomes more difficult spatiotemporally in the order of the following: force (especially pressure), electricity, vibration, and temperature.

As an example, the tactile sensation definition file 106a may define force presentation as the first type of tactile stimulus and define one or a plurality of stimuli among vibration, temperature, and an electrical stimulus as the second type of tactile stimulus. This allows the vibration, the temperature, and/or the electrical stimulus to be perceived while being positioned at the stimulation point for the force presentation. The same effect can be obtained when the tactile sensation definition file 106a defines one or a plurality of stimuli among vibration, temperature, and electrical stimuli as the first type of tactile stimulus and defines force presentation as the second type of tactile stimulus.

As another example, the tactile sensation definition file 106a may define vibration presentation as the first type of tactile stimulus and define a temperature stimulus as the second type of tactile stimulus. This allows the temperature stimulus to be perceived while being positioned at a stimulation point for the vibration presentation. The same effect can be obtained when the tactile sensation definition file 106a defines the temperature stimulus as the first type of tactile stimulus and defines the vibration presentation as the second type of tactile stimulus.

As another example, the tactile sensation definition file 106a may define electrical stimulus presentation as the first type of tactile stimulus and define vibration and/or temperature as the second type of tactile stimulus. This allows the vibration and/or the temperature stimulus to be perceived while being positioned at the stimulation point for the electricity presentation. The same effect can be obtained when the tactile sensation definition file 106a defines the vibration, and/or the temperature as the first type of tactile stimulus and defines the electrical stimulus presentation as the second type of tactile stimulus.

The object tactile feeling database 106b is an object tactile feeling accumulation means storing an object and a tactile feeling in association with each other. For example, when an object is recognized in the real world by a publicly-known object recognition technique, or for a virtual object in an extended reality space or a virtual space, the object tactile feeling database 106b defines a tactile feeling to be presented according to the object. As the tactile feeling to be presented, the object tactile feeling database 106b may define a psychological tactile feeling as a psychological quantity or the like that is integratedly perceived in the brain based on information obtained by a plurality of different tactile receptors of the human body. As in a psychological tactile feeling map (onomatopoeic map) shown in FIG. 3 described above, the object tactile feeling database 106b may define a tactile feeling corresponding to an object or a material using a map in which the material, the object, etc., are positioned on a predetermined quantitative axis.

As an example, as shown in the following table, the object tactile feeling database 106b may store a conversion table for converting, in accordance with an object and a tactile feeling, tactile information for input that does not include electricity as a base to tactile information for output that includes electricity as a base. By using this conversion table, for example, a problem that, although pressure in the pushing direction can be presented, force in the pulling direction cannot be presented in general force presentation to a skin surface can be overcome, and the force in the pulling direction can be reproduced by the presentation of a stimulus including electricity such that various psychological textures expressed by onomatopoeia such as, for example, a necho-necho feeling (a sticky and wet feeling) can be presented.

TABLE 5

| | INPUT | | | | OUTPUT | | | |
|---|---|---|---|---|---|---|---|---|
| OBJECT | FORCE | TEM-PERATURE | VIBRATION | ONOMATOPOEIA | ELEC-TRICITY | FORCE | TEM-PERATURE | VIBRATION |
| TOFU | Δ | ◎ | X | FUNYA-FUNYA (SOFT AND FLABBY FEELING) | ○ | Δ | ◎ | X |
| RICE CRACKER | ◎ | X | ◎ | KOCHI-KOCHI (DRY AND HARD FEELING) | ◎ | ◎ | X | ◎ |
| KONNYAKU | ○ | ○ | ○ | PERU-PERU (BOUNCING FEELING) | ○ | ○ | ○ | ○ |
| NATTO | ◎ | Δ | ○ | NEBA-NEBA (STICKY FEELING) | ◎ | ○ | Δ | ○ |

Information stored in the tactile sensation definition file 106a, the object tactile feeling database 106b, and the like may be downloaded periodically or each time from the external device 200 or the like, and the storage unit 106 may store, in a temporary or non-temporary manner, the information that has been downloaded.

In FIG. 5, the input and output control interface unit 108 controls the input unit 112 such as various types of sensors and the output unit 114 such as an output unit capable of outputting physical quantities or the like. The input unit 112 such as various types of sensors may have the same function as that of the above-described external input device 120. The output unit 114 such as an output unit capable of outputting physical quantities or the like may have the same function as that of the above-described external output device 140. In addition, as the output unit 114, a monitor (including a home TV, a touch screen monitor, etc.), or the like can be used. As the input unit 112, a touch panel, an audio microphone, a keyboard, or the like can be used. As an example, the input unit 112 and the output unit 114 may be an input and output means such as a touch panel in which an output unit 114 such as a liquid crystal panel and an input unit 112 such as a touch position input device are combined. Further, the input and output control interface unit may be connected to a recording medium such as a USB memory so as to perform data exchange control. In the following embodiment, either the input unit 112 or the external input device 120 may be used as an input means, and in this case, the input units are collectively referred to as input means 112 and 120 in some cases. Similarly, either the output unit 114 or the external output device 140 may be used as an output means, and the output units are collectively referred to as output means 114 and 140 or output units 114 and 140 in some cases.

Further, in FIG. 5, the control unit 102 has a control program such as an OS (Operating System), a program prescribing various processing procedures and the like, and an internal memory for storing required data and is a processor such as a CPU that performs information processing for executing various processes by these programs and the like. The control unit 102 is formed being provided with a presentation tactile feeling setting unit 102a, generation unit 102b, and an output control unit 102c in a functionally conceptual manner.

Of these, the presentation tactile feeling setting unit 102a is a presentation tactile feeling setting means for setting a tactile feeling to be presented. For example, the presentation tactile feeling setting unit 102a may set a predetermined tactile feeling as a tactile feeling to be presented. As another example, the presentation tactile feeling setting unit 102a may set a tactile feeling corresponding to the movement of the body as a tactile feeling to be presented, based on motion data obtained from the external input device 120 and the input unit 112. Further, based on information on an object or a virtual object recognized by the object recognition of the actual object obtained from the external input device 120 or the input unit 112, the presentation tactile feeling setting unit 102a may set a tactile feeling to be presented by acquiring a tactile feeling that corresponds to the object from the object tactile feeling database 106b. Moreover, the presentation tactile feeling setting unit 102a may allow the user to set a tactile feeling to be presented, via the external input device 120, the input unit 112, or the like. As an example, the presentation tactile feeling setting unit 102a may perform multipoint measurement on the time axis using flexible substrates of the input means 120 and 112 as described above and determine a tactile feeling such as a sticky sensation, a sticky and springy feeling, or the like based on changes, etc., in the contact area and the pressure distribution in consideration of this time axis. Regarding the conversion from the tactile feeling that has been determined to the tactile information to be presented, the conversion may be performed by the control unit 102 using a conversion table such as the table described above. The presentation tactile feeling setting unit 102a may acquire information from a tactile sensor (input means 120 and 112 such as a force sensor, a vibration sensor, a temperature sensor, etc.) of a finger portion of a robot such as the TELESAR system described above, classify the information into tactile feeling-related category information such as a plurality of onomatopoeias by a method such as machine learning or the like, and store a tactile feeling expressed by the category information and a spatiotemporal combination from a tactile display (output means 140 and 114 for presenting stimuli such as force, electricity, vibration, temperature, etc.) in the object tactile feeling database 106b in association with each other. Thereby, the tactile feeling of an object located at a remote place can be estimated based on information from the tactile sensor, and the estimated tactile feeling can be presented in a multi-sensory form to the user located in a different place. The presentation tactile feeling setting unit 102a may perform calibration of the input means 120 and 112 and the output means 140 and 114 by a publicly-known technique or the like. For example, the presentation tactile feeling setting unit 102a may perform various types of calibration by transmitting an initial operation signal to the external output device 140, followed by outputting according to the initial operation signal by the external output device 140.

Further, the generation unit 102b selects at least two or more physical quantities according to the tactile feeling to be presented and also generates tactile information for presenting a predetermined tactile feeling based on the physical quantities that have been selected. In the present embodiment, in order to synthesize a plurality of physical quantities as bases, the generation unit 102b may select at least two or more physical quantities according to the tactile feeling to be presented and generate tactile information for presenting a predetermined tactile feeling based on the physical quantities that have been selected. As an example, physical quantities include at least electricity and include force, temperature, vibration, and/or time and space, and the generation unit 102b may select, out of the physical quantities, at least two or more physical quantities and generate tactile information. When presenting a tactile feeling due to a temporal change in force, the generation unit 102b may select at least electrical and spatiotemporal physical quantities so as to generate tactile information. The generation unit 102b may select the first and second types of tactile stimuli defined in the tactile sensation definition file 106a as the plurality of physical quantities. The generation unit 102b may select a plurality of physical quantities and generate tactile information for the purpose of presenting a tactile feeling set by the above-described presentation tactile feeling setting unit 102a. As an example, referring to the object tactile feeling database 106b, the generation unit 102b may determine a tactile feeling corresponding to information from the tactile sensor obtained from the input means 120 and 112 and generate tactile information based on a plurality of physical quantities such as an electrical stimulus and the like in order to present the tactile feeling.

An explanation will be given now regarding encoding accompanied by the synthesis of a plurality of physical quantities performed by the generation unit 102b. For example, when presenting a "soft" tactile feeling to a hand, there is no tactile signal capable of presenting "softness" by the above-described tactile presentation module alone, and it is necessary to spatiotemporally change a tactile signal that is presented in each tactile element of the haptic primary colors in accordance with motion information (motion data, etc.) indicating how much the hand has pushed the object. In addition, the user's body movements do not always match completely in a situation where a physical experience is recorded by the external input device 120 or the input unit 112 and in a situation where the physical experience is experienced by means of the external output device 140 and the output unit 114, and, if the same tactile sensation control signal is presented under different movement situations, different tactile feelings will be perceived. Therefore, it is important that, instead of simply presenting the recorded tactile information without any change, the tactile information conversion device 100 performs appropriate conversion according to the difference in body movements.

As described above with reference to FIG. 4, a tactile feeling a person sensitively feels is defined as a psychological space for tactile sensation, a physiological element such as a tactile receptor, which generates a nerve pulse that constitutes the tactile feeling, is defined as a physiological space for tactile sensation, and a physical stimulus that activates tactile receptors is defined as a physical space for tactile sensation. Tactile transmission modules 120 and 112 according to the present embodiment are considered as a hybrid structure for stimulation in the physiological space of Merkel cells and Meissner's corpuscles by electrical stimulation and stimulation in the physical space of vibration and temperature. Therefore, in order to present an arbitrary tactile feeling using the tactile transmission modules 120 and 112, it is necessary to construct an algorithm for breaking down an arbitrary "tactile feeling" on the psychological space into each sensory element of tactile presentation modules 140 and 114, interactively selecting the sensory element according to body movements, and generating tactile information for presenting the predetermined tactile feeling based on a selected physical quantity and a software environment in which the algorithm can be executed by the tactile information conversion device 100. Thus, the control unit 102 of the tactile information conversion device 100 edits and processes the information recorded based on the real world through the processes of the generation unit 102b, the output control unit 102c, and the like so as to create arbitrary tactile information, executes an algorithm that converts the tactile information into an appropriate tactile sensation control signal in accordance with a body movement that is being experienced and an algorithm that converts the tactile information recorded based on the real world into new tactile information that corresponds to a different body movement, and functions as a haptic primary color encoder.

Referring back to FIG. 5, a specific algorithm for combining a plurality of physical quantities by the generation unit 102b will be described. For example, when presenting a soft psychological texture, in other words, when presenting a "sticky and springy feeling", the generation unit 102b may synthesize the texture by a plurality of physical quantities such that a stimulus by electricity, force, or vibration that is stronger than that in the case of a hard surface or a stimulus by electricity, force, or vibration in an area wider than that in the case of a hard surface is applied in the process of transition or the process of body displacement from a non-contact state to a contact state. As an example, the generation unit 102b may apply an electrical stimulus, force, or a vibration stimulus that is stronger than the strength of a tactile stimulus received when a finger or the like is brought into contact with a hard surface. Further, the generation unit 102b may generate tactile information for applying a stimulus by electricity, force, or vibration that is in an area wider than a contact area of a tactile stimulus received when a finger or the like is brought into contact with a hard surface. A transition process of a finger or the like from a non-contact state to a contact state and a body displacement process of the movement can be determined based on motion data received by the external input device 120 and the input unit 112 described above.

As another example, when presenting a sticky psychological texture, in other words, when presenting a "sticky feeling", the generation unit 102b may synthesize the texture by a plurality of physical quantities such that a stimulus by electricity, force, or vibration that is stronger than that in the case of a hard surface or a stimulus by electricity, force, or vibration in an area wider than that in the case of a hard surface is applied in the process of transition or the process of body displacement from a contact state to a non-contact state. As an example, the generation unit 102b may apply an electrical stimulus, force, or a vibration stimulus that is stronger than the strength of a tactile stimulus received when a finger or the like in a contact state is removed from a hard surface under the same pressure. Further, the generation unit 102b may generate tactile information for applying an electricity stimulus, a force stimulus, or a vibration stimulus in an area wider than a contact area of a tactile stimulus received when a finger or the like is removed from a hard surface through the same movement of the finger or the like. A transition process of a finger or the like from a contact state to a non-contact state and a body displacement process of the movement can be determined based on motion data received by the external input device 120 and the input unit 112 described above.

The output control unit 102c is an output control means that outputs tactile information to the output unit of the external output device 140, the output unit 114, and the like. More specifically, the output control unit 102c outputs tactile information generated by the generation unit 102b to the output means 140 and 114 side. For example, the output control unit 102c may transmit the tactile information to the external output device 140 or may output the tactile information to the output unit 114 via the input and output control interface unit 108. As shown in FIG. 5, the output control unit 102c may further include a first stimulation unit 102d and a second stimulation unit 102e.

The first stimulation unit 102d is a first stimulation means that determines a first stimulation point at which a first type of tactile stimulus is generated or generates a first type of tactile stimulus at a first stimulation point via the output units 140 and 114. In other words, the first stimulation unit 102d may actively generate the first type of tactile stimulus at the first stimulation point via the output units 140 and 114 or determine the first stimulus point of the first type of tactile stimulus generated by the user moving relatively with respect to the object. The stimulation point means a time point in time and/or a position point in space (a position on a one-dimensional line, a position on a two-dimensional plane, a position in three-dimensional space, and the like). On the other hand, the second stimulation unit 102e is a second stimulation means that generates a second type of tactile stimulus via the output units 140 and 114 at a second stimulation point separated within a temporally and/or spatially predetermined threshold value from the first stimulation point of the first type of tactile stimulus, which is determined or generated by the first stimulation unit 102d. The predetermined temporal threshold value and the predetermined spatial threshold value vary depending on a tactile stimulus to be presented and may be stored in the storage unit 106 (tactile sensation definition file 106a, etc.) in advance. A publicly-known two-point discrimination threshold (a spatial two-point discrimination threshold, a temporal two-point discrimination threshold, or the like) may be used as the temporally and/or spatially predetermined threshold value.

In the case where another stimulus is perceived while being positioned at a stimulation point for force presentation, as an example, the first stimulation unit 102d may determine or cause the force presentation as the first type of tactile stimulus, and the second stimulation unit 102e may generate one or a plurality of stimuli among vibration, temperature, and an electrical stimulus at the second stimulation point as the second type of tactile stimulus. As another example, the same effect can be achieved by the first stimulation unit 102d determining or generating one or a plurality of stimuli among vibration, temperature, and an electrical stimulus as the first type of tactile stimulus and the second stimulation unit 102e causing the force presentation as the second type of tactile stimulus at the second stimulation point.

In the case where another stimulus is perceived while being positioned at a stimulation point for vibration presentation, as an example, the first stimulation unit 102d may determine or cause the vibration presentation as the first type of tactile stimulus, and the second stimulation unit 102e may generate a temperature stimulus at the second stimulation point as the second type of tactile stimulus. As another example, the same effect can be achieved by the first stimulation unit 102d determining or generating a temperature stimulus as the first type of tactile stimulus and the second stimulation unit 102e generating a vibration stimulus as the second type of tactile stimulus at the second stimulation point.

In the case where another stimulus is perceived while being positioned at a stimulation point for electrical stimulus presentation, the first stimulation unit 102d may determine or cause the electrical stimulus presentation as the first type of tactile stimulus, and the second stimulation unit 102e may generate vibration and/or temperature at the second stimulation point as the second type of tactile stimulus. As another example, the same effect can be achieved by the first stimulation unit 102d determining or generating vibration and/or temperature as the first type of tactile stimulus and the second stimulation unit 102e causing the electrical stimulus presentation as the second type of tactile stimulus at the second stimulation point.

The stimulation points of the first stimulation point and the second stimulation point may be perceptual points caused due to phantom sensation illusion. FIGS. 8A and 8B are diagrams showing perceptual points caused due to phantom sensation illusion. When a person actually touches an object in the real world with the pad of a finger, the points of application for four stimuli of force, vibration, and temperature applied to the skin surface of the pad of the finger are the same. However, in a tactile sensation presentation device for presentation to a person, it is generally difficult to have the same points of application for force, vibration, temperature, and electricity due to the arrangement of various elements.

On the other hand, examining human sensation, the same sensation can be generated even when the points of application are different. A sensation can be also generated at a place different from the point of application. A good example of the latter is phantom sensation. White circles in FIG. 8 represent stimulation sites, and circles with hatched lines represent perceptual points caused by phantom sensation. Phantom sensation is a phenomenon of cutaneous sensation confirmed by von Bekesy that is similar to the sound localization by binaural hearing. In phantom sensation, by applying stimuli to two sites under certain conditions, a stimulation image can be provided to a site different from the stimulation sites between the two sites. Moreover, as shown in FIG. 8A, by applying stimuli to three or more sites, a stimulation image can be localized inside the sites. Furthermore, as shown in FIG. 8B, the position of the image can be controlled by differences in stimulation strength at the plurality of stimulation sites. It is known that this also occurs for vibration stimuli and electrical stimuli (see Kazuo Tanie, Susumu Tachi, Kiyoshi Komoriya, Minoru Abe, "Basic Study on Discriminability of Mental Location of Electrocutaneous Phantom Sensation", Transactions of the Society of Instrument and Control Engineers, Vol. 15, No. 4, p. 505-512 (1979.8), and Susumu Tachi, Kazuo Tanie, Kiyoshi Komoriya and Minoru Abe: Electrocutaneous Communication in a Guide Dog Robot (MELDOG), IEEE Transactions on Biomedical Engineering, Vol. BME-32, No. 7, pp. 461-469 (1985).

Figure 9:
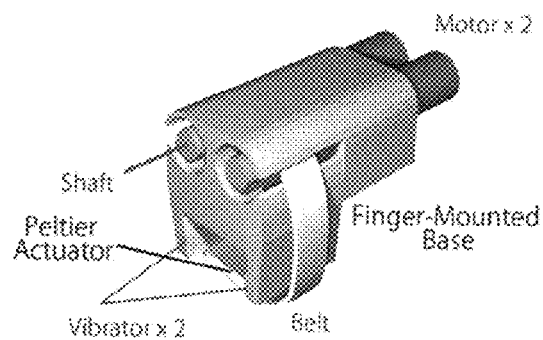
FIG. 9 is a diagram showing the appearance of a finger-mounted sensor/actuator of a tele-existence robot called TELESAR V developed by the present inventors.
Figure 10:
FIG. 10 is a diagram showing the appearance of the above-described finger-mounted type sensor/actuator of the tele-existence robot called TELESAR V developed by the present inventors when the finger-mounted type sensor/actuator is worn.

The existence of this phantom sensation phenomenon means that a vibration stimulus can be felt at a site that is different from a directly stimulated site. FIGS. 9 and 10 are diagrams showing the above-described finger-mounted type sensor/actuator of the tele-existence robot called TELESAR V developed by the present inventors and the appearance thereof when the finger-mounted type sensor/actuator is worn on a finger (for the details of the device configuration and the like, see Japanese Patent Application Publication No. 2013-91114). When presenting, using the illustrated presentation device set in a glove, pressure sensation information and vibration information measured with a hand of this TELESAR V, pressure and shearing force were applied to a finger pad, and vibration was presented from both sides of the finger. As a result, it was confirmed that a vibration stimulus was also felt on the finger pad where a pressure sensation was felt. It can be considered that the vibration stimulus was felt in the center by phantom sensation. Furthermore, it seems that there was also an effect where a part to which the pressure sensation was applied was susceptible to stimuli. Also in the verification experiment described later, examination is done by (1) comparing a site where a stimulus is felt between the case where both sides of the site are stimulated at the same time and the case where only one side of the site is stimulated and (2) comparing a site where a vibration stimulus is generated between when only a vibration stimulus is applied without applying pressure and when a vibration stimulus is applied while applying pressure.

Therefore, an electrical stimulus is applied at the force presentation part instead, a vibration stimulus can be presented at an electrically stimulated part by phantom sensation in the same way. Further, a phantom sensation image is more clearly localized by the electrical stimulus. Therefore, by phantom sensation, for example, a vibration stimulus can be localized at a site stimulated by force and a site stimulated by electricity, and a phantom sensation image by the vibration stimulus can be clearly localized at a site where force or an electrical stimulus is presented by force presentation or electricity presentation.

Regarding temperature presentation, when a temperature stimulus is applied from the side, the stimulus is not localized on the finger pad if the stimulus is applied only on one side; however, when a vibration stimulus is presented to the finger pad, the stimulus is localized at that site. Whether the phantom sensation localized at the center when the stimulus is applied from both left and right sides also exists in this case was verified through experiments. In the case of temperature, the presentation is delayed due to the characteristics of the element and the nature of the heat. In order to correct this delay, a non-contact temperature sensor can be incorporated in addition to a contact type temperature sensor in the sensor.

In addition to the external input device 120 and the external output device 140, the tactile information conversion device 100 may be formed being communicably connected, via the network 300, to the external device 200 for providing a database for storing tactile information, threshold values, etc., and an external program or the like such as a tactile information conversion program. Further, this tactile information conversion device 100 may be communicably connected to the network 300 via a communication device such as a router and a wired or wireless communication line such as a dedicated line.

In FIG. 5, the communication control interface unit 104 is a device that performs communication control between the tactile information conversion device 100 and the network 300 (or a communication device such as a router). In other words, the communication control interface unit 104 has a function of communicating data with another terminal or station via a communication line (regardless of whether the line is wired or wireless). In the present embodiment, the communication control interface unit 104 performs communication control with the external input device 120, the external output device 140, the external device 200, and the like.

The external device 200 is mutually connected to the tactile information conversion device 100, the external input device 120, and the external output device 140 via the network 300 and has a function of providing an external database relating to calibration in addition to threshold values, conversion tables, etc., stored in a tactile feeling definition file, an object tactile feeling database, and the like and a website for executing an external program or the like such as a tactile information conversion program and an encoding program, for each terminal.

The external device 200 may be realized, for example, by hardware elements such as a personal computer, a server computer and software elements such as an operating system, an application program, and other data. For example, the external device 200 may be configured as a WEB server, an ASP server, or the like, and the hardware configuration thereof may be configured by an information processing device such as a commercially available workstation, a personal computer, etc., and accessory devices of the information processing device. Further, each function of the external device 200 is realized by a processor such as a CPU, a disk device, a memory device, an input device, an output device, a communication control device, and the like in the hardware configuration of the external device 200, a program for controlling these processor and devices, and the like.

Described above is the explanation of each configuration of the tactile feeling presentation system according to the present embodiment. In the configuration example described above, an explanation has been given regarding an example in which the tactile information conversion device 100 is configured as a housing different from the input units 120 and 112, the output units 140 and 114, and the external devices 200 such as a server. However, the preset embodiment is not limited thereto. For example, the tactile information conversion device 100 may be configured integrally with an input device, may be configured integrally with a transmission device, may be configured integrally with a storage device, may be configured integrally with a server device, may be configured integrally with a receiving device, or may be configured integrally with an output device.

Processes of Tactile Feeling Presentation System

Next, an example of the processes of the tactile feeling presentation system according to the present embodiment thus configured will be described in detail with reference to FIGS. 11 to 13 in the following.

Tactile Feeling Presentation Process

Figure 11:
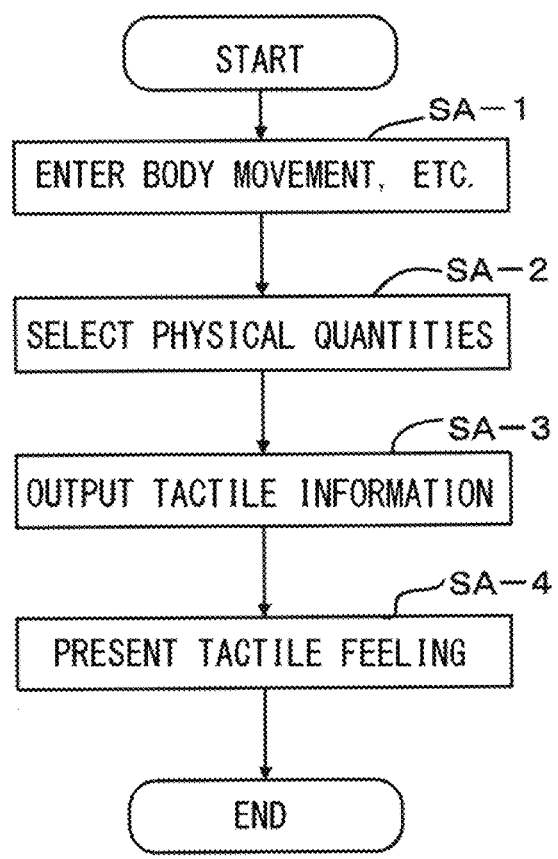
FIG. 11 is a flowchart showing an example of a tactile information conversion process in the tactile feeling presentation system according to the present embodiment.

FIG. 11 is a flowchart showing an example of a tactile information conversion process in the tactile feeling presentation system according to the present embodiment.

As shown in FIG. 11, first, the input units 120 and 112 of the present tactile feeling presentation system detect the body movement of the user, and the tactile information conversion device 100 acquires body movement information such as motion data through the process of the generation unit 102b (Step SA-1). As an example, the input units 120 and 112 may perform touch detection, may detect the contact area, or may detect the displacement of a finger. If the external output device 120 acquires, for example, the body movement information, the body movement information is transmitted to the tactile information conversion device 100, and the tactile information conversion device 100 receives the body movement information.

Through the process of the generation unit 102b, the tactile information conversion device 100 of the present tactile feeling presentation system selects at least two or more physical quantities among electrical, force, temperature, and spatiotemporal physical quantities in accordance with a tactile feeling to be presented and also generates tactile information for presenting a predetermined tactile feeling based on the physical quantities that have been selected (Step SA-2). For example, when presenting a tactile feeling due to a temporal change in force, the generation unit 102b may synthesize the tactile information based on at least electrical and spatiotemporal physical quantities. When the first and second types of tactile stimuli are defined in the tactile sensation definition file 106a, the generation unit 102b may synthesize the tactile information as the plurality of physical quantities based on the first and second types of tactile stimuli.

The tactile information conversion device 100 of the present tactile feeling presentation system outputs the tactile information to the output unit of the external output device 140, the output unit 114, or the like (Step SA-3). More specifically, the output control unit 102c outputs the tactile information generated by the generation unit 102b to the output units 140 and 114 side. In the case where the output destination is the external output device 140, the tactile information conversion device 100 transmits the tactile information to the external output device 140 under the control of the output control unit 102c. In this case, the output control unit 102c may execute processes performed by the first stimulation unit 102d and the second stimulation unit 102e (the processes will be described later).

Then, the output units 140 and 114 of the present tactile presentation system perform multimodal (multi-sensory type) output from the output units 140 and 114 based on the tactile information and present a tactile feeling that works on the tactile ability of the user (Step SA-4).

The above is an example of the tactile feeling presentation process of the present tactile feeling presentation system.

Next, an explanation will be given regarding an example of a multipoint stimulation process of the present tactile feeling presentation system in the following.

Multipoint Stimulation Process

Figure 12:
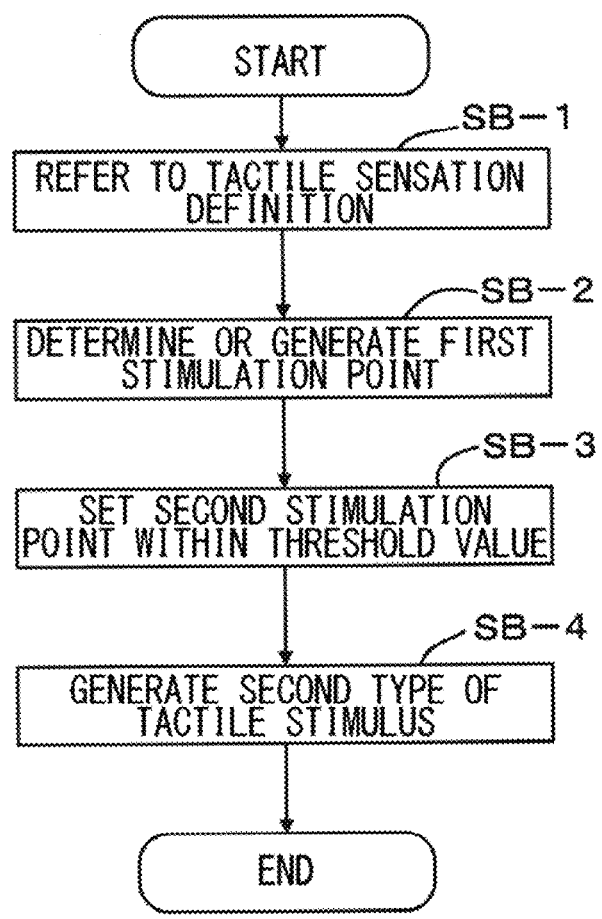
FIG. 12 is a flowchart showing an example of a multipoint stimulation process in a tactile information conversion device 100 of the tactile feeling presentation system according to the present embodiment.

FIG. 12 is a flowchart showing an example of the multipoint stimulation process in the tactile information conversion device 100 of the tactile feeling presentation system according to the present embodiment.

As shown in FIG. 12, the output control unit 102c of the tactile information conversion device 100 first refers to the tactile sensation definition file 106a and sets a first type tactile stimulus and a second type of tactile stimulus that are defined (Step SB-1).

Then, the output control unit 102c of the tactile information conversion device 100 determines a first stimulation point at which the first type of tactile stimulus is generated by the process of the first stimulation unit 102d (Step SB-2). More specifically, the output control unit 102c may determine the point of time, the position point, and the like of the first type of tactile stimulus generated by the user, for example, coming into contact with the object. Alternatively, the output control unit 102c may output stimulation information for causing the first type of tactile stimulus to be generated at the first stimulation point via the output units 140 and 114 by the process of the first stimulation unit 102d.

Then, by the process of the second stimulation unit 102e, the output control unit 102c of the tactile information conversion device 100 sets a second stimulation point that is separated within a temporally and/or spatially predetermined threshold value from the first stimulation point of the first type of tactile stimulus, which is determined or generated by the first stimulation unit 102d (Step SB-3). In this case, by the process of the second stimulation unit 102e, the output control unit 102c may set the second stimulation point by referring to the threshold value stored in advance in the tactile sensation definition file 106a.

Then, by the process of the second stimulation unit 102e, the output control unit 102c of the tactile information conversion device 100 outputs tactile information for generating the second type of tactile stimulus via the output units 140 and 114 at the second stimulation point set in Step SB-3 (Step SB-4).

The above processes allow a tactile feeling to be presented such that stimulation is felt at a single part while arranging the presentation elements of all of electricity, force, temperature, vibration, or an arbitrary combination thereof on different sites on the human skin. As an example of the means thereof, by using a presentation method using phantom sensation or another method, a sensation can be felt at a single location even through the presentation elements are physically arranged at different locations.

For example, by arranging force presentation at the point of application of a stimulus and arranging a stimulator for any one of vibration, temperature, and an electrical stimulus or an arbitrary combination thereof at a place that is physically apart, the sensation for the stimulus can be localized at the point of application of force by phantom sensation. Further, clarification of an image localized by phantom sensation through the presentation of force allows the presentation sites for the haptic primary colors of force, electricity, vibration, and temperature to coincide with one another.

As another specific example, by arranging force presentation at the point of application of a stimulus and arranging an stimulator for either one of vibration and temperature or the combination thereof at a place that is physically apart, the sensation for the stimulus can be localized at the point of application of force by phantom sensation, and clarification of an image localized by phantom sensation through the presentation of force allows the presentation sites for the haptic primary colors of force, vibration, and temperature to coincide with one another.

Further, according to the present embodiment, by arranging electrical stimulus presentation at the point of application of a stimulus and arranging either one of vibration and temperature or both at a place that is physically apart, the sensation for the stimulus can be localized at the point of application of force by phantom sensation. Further, clarification of an image localized by phantom sensation through the presentation of an electrical stimulus also allows the presentation sites for the haptic primary colors of force, vibration, and temperature to coincide with one another.

Further, according to the present embodiment, by arranging vibration presentation at the point of application of a stimulus and arranging temperature at a place that is physically apart, the sensation for the stimulus can be localized at the point of application of vibration by phantom sensation. Further, clarification of an image localized by phantom sensation through the presentation of vibration allows the presentation sites for the haptic primary colors of vibration and temperature to coincide with one another.

Remote Tactile Feeling Transmission Process

Figure 13:
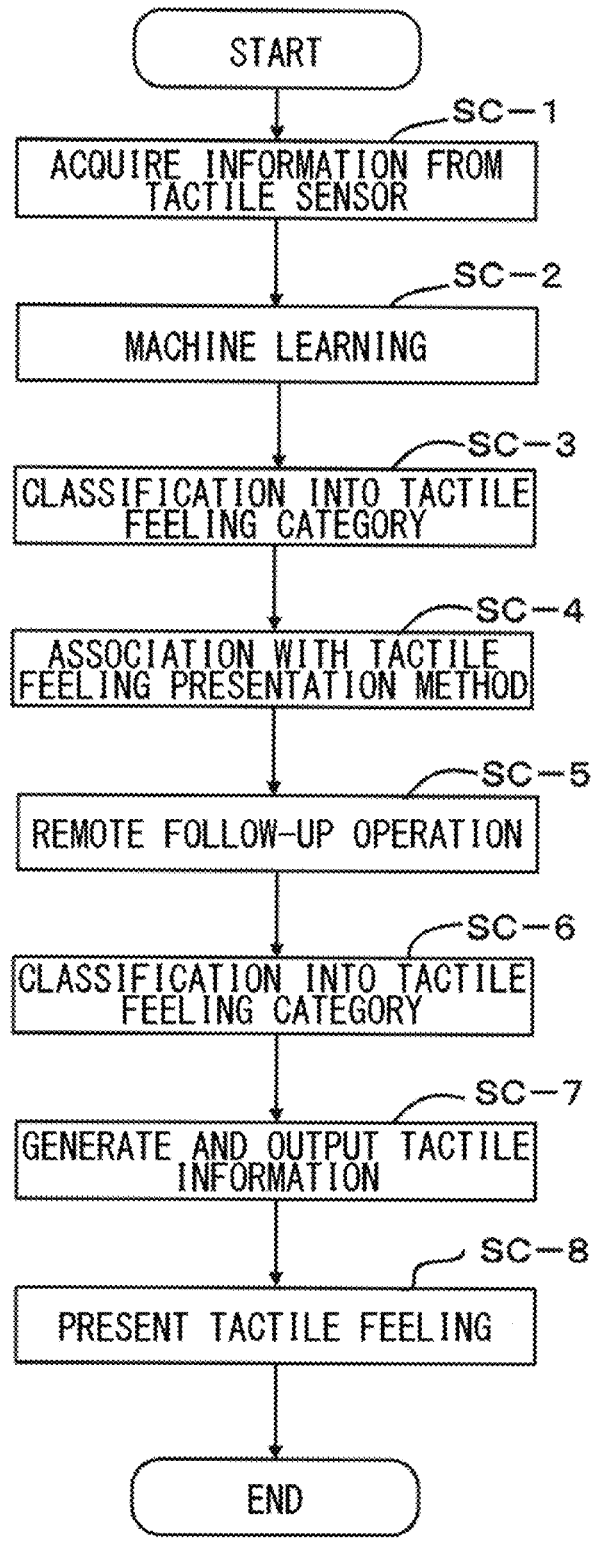
FIG. 13 is a flowchart showing an example of a remote tactile feeling transmission process in the tactile feeling presentation system according to the present embodiment.

FIG. 13 is a flowchart showing an example of a remote tactile feeling transmission process in the tactile feeling presentation system according to the present embodiment. As a part of the functions of the tactile feeling presentation system, the TELESAR system described above may be used (see, for example, Japanese Patent Application Publication No. 2013-91114).

As shown in FIG. 13, first, in the present tactile feeling presentation system, the presentation tactile feeling setting unit 102a acquires information from a tactile sensor (input means 120 and 112 such as a force sensor, a vibration sensor, a temperature sensor, or the like) of a finger portion of a robot such as the TELESAR system described above (Step SC-1).

Subsequently, the presentation tactile feeling setting unit 102a of the present tactile feeling presentation system performs machine learning based on information from the tactile sensor and teaching data on the tactile feeling of the object recognized by a camera or the like (Step SC-2). The operator of the tactile information conversion device 100 may input the teaching data on the object and the tactile feeling via the input unit 112 such as a keyboard.

Then, the presentation tactile feeling setting unit 102a of the present tactile feeling presentation system classifies the characteristics (spatiotemporal variation pattern, etc.) of the information from the tactile sensor into tactile feeling category information (onomatopoeia map, etc.) such as onomatopoeia as a result of the machine learning and the like (Step SC-3).

Then, the presentation tactile feeling setting unit 102a of the present tactile feeling presentation system stores the tactile feeling category information into which the characteristics have been classified and a tactile feeling presentation technique according to the present embodiment in the object tactile feeling database 106b in association with each other (Step SC-5). The tactile feeling category information and the tactile feeling presentation technique may be stored in the object tactile feeling database 106b in association with a spatiotemporal combination from a tactile display (external output means 140 for presenting stimuli such as force, electricity, vibration, temperature, etc.). The processes in the above Steps SC-1 through SC-4 may be performed in advance as preprocessing, and the results of the processes may be stored in the storage unit 106 in advance.

Subsequently, in the present tactile feeling presentation system, using the TELESAR system or the like, a finger portion of the robot is moved following the movement of the hand of the user of a robot teaching device in real time, and tactile sensor information obtained through the interaction with the object is acquired and classified, in reference to the object tactile feeling database 106b, into a corresponding tactile feeling category (Step SC-6). The robot-side finger portion and an object detection unit of the TELESAR system can be considered as the external output device 140 and the external input device 120. Further, a detection means for the movement of a hand and a tactile stimulation means that are on the robot teaching device side of the TELESAR system can be considered as the input unit 112 and the output unit 114.

Then, the generation unit 102b and the output control unit 102c of the present tactile feeling presentation system select a plurality of physical quantities, generate tactile information, and output the tactile information to the output unit 114 in accordance with a tactile category (Step SC-7).

Thereby, the tactile feeling of an object located at a remote place can be estimated based on information from the tactile sensor, and the estimated tactile feeling can be presented in a multi-sensory form such as an electrical stimulus to the user (Step SC-8).

Described above is the explanation of the processes of the tactile feeling presentation system according to the present embodiment.

First Exemplary Embodiment

The first exemplary embodiment demonstrating the effect of the tactile feeling presentation system according to the present embodiment will be explained in the following. In the first exemplary embodiment, it was confirmed experimentally that the presentation of a tactile feeling that normally requires suction force, such as sticky feeling, was able to be presented by alternatively using an electronic stimulus.

Conventionally, many tactile feeling presentation devices have been developed. However, no practical technique has been proposed for presenting the feeling of stickiness represented by an onomatopoeia such as "neba-neba (sticky)". Thus far, there is a report indicating, based on the observation of the skin when touching the actual sticky substance, that the relationship between force and a contact area during pushing motion is unrelated to the presence or absence of stickiness but there is a large difference observed at the time of peeling off (Masaaki Yamaoka, Akio Yamamoto, Toshiro Higuchi "Basic Analysis of Stickiness Sensation for Tactile Displays" EuroHaptics 2008 (Japanese: Yamaoka VRSJ2007, VRSJ2008) URL: http://link.springer.com/chapter/10.1007/978-3-540-69057-3_56).

Further, a device "Vacuum Touch" that presents a sticky feeling by suction from an air suction hole has been developed (http://dl.acm.org/citation.cfm?id=2557252). However, in either case, suction and suction force are physically generated by using the air, and this is an ad hoc technology specialized for presenting a specific tactile feeling and lacks practicality.

Figure 14:
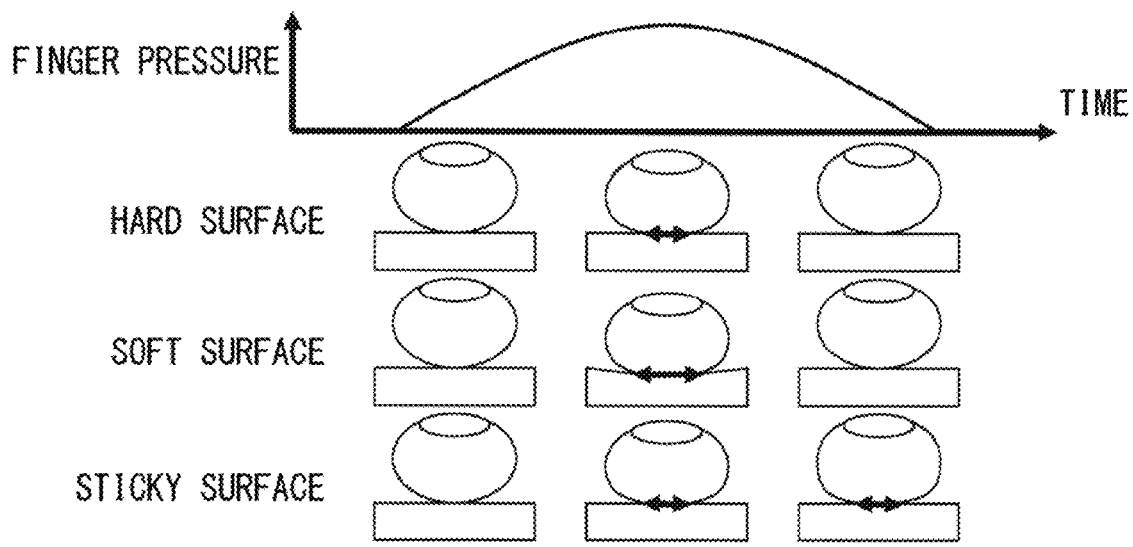
FIG. 14 is a diagram schematically showing changes in a contact surface and pressure in the case of touching a hard surface, a soft surface, or a sticky surface.

Therefore, the purpose of the first exemplary embodiment of the present embodiment is to present a tactile feeling such as sticky feeling or the like by the combination with electrical tactile sensation or machine presentation. FIG. 14 is a diagram schematically showing changes in a contact surface and pressure in the case of touching a hard surface, a soft surface, or a sticky surface. The figure shows a case where a finger is seen in the body axis direction from the fingertip side, and a two-way arrow shows the width of a contact surface.

As shown in FIG. 14, when pressing down the soft surface, the finger comes into contact with an area that is larger than that in the case of the hard surface. Therefore, the inventors of the present invention consider that it is possible to present a soft tactile feeling by applying a stimulus that is stronger than that in the case of a hard surface or a stimulus in an area that is larger than that for a hard surface at the time of the pressing down. Generally, in the case of a soft surface, it is often assumed that the stimulation will be reduced during pressing down. This is true for the same displacement of the finger; however, this is not true for the same force thereof.

Figure 15:
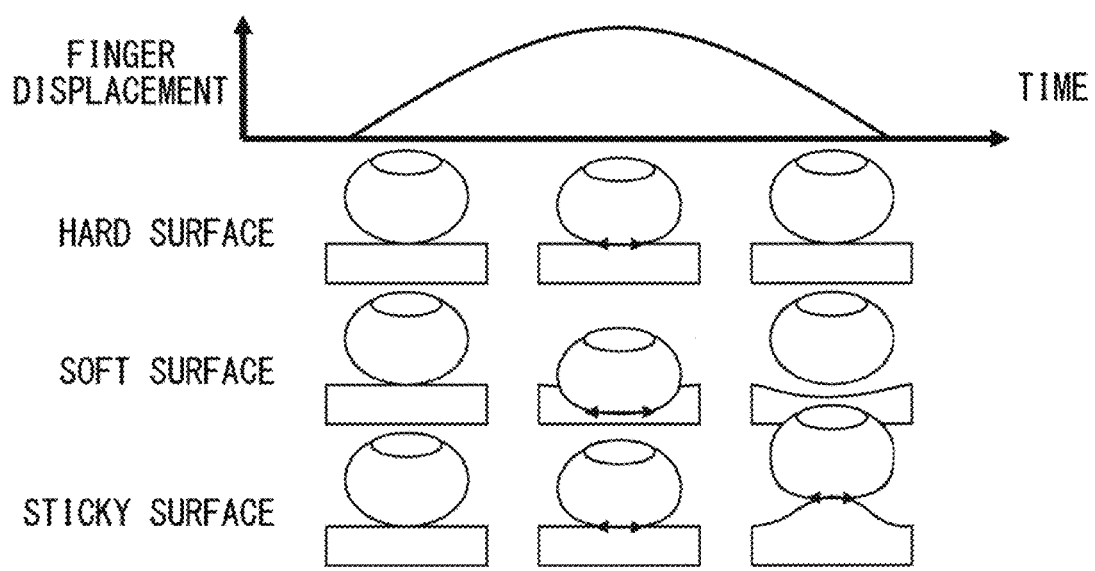
FIG. 15 is a diagram schematically showing changes in a contact surface and pressure in the case where large deformation occurs when touching a hard surface, a soft surface, or a sticky surface.

Further, as shown in FIG. 14, when lifting the finger from the sticky surface, the finger comes into contact with an area that is larger than that in the case of the hard surface. Therefore, the inventors of the present invention consider that it is possible to present a sticky feeling by applying a stimulus that is stronger than that in the case of the hard surface or a stimulus in an area that is larger than that for the hard surface at the time of the lifting. FIG. 14 shows a case where the deformation is minute. A case where the deformation is larger is now taken into consideration. FIG. 15 is a diagram schematically showing changes in a contact surface and pressure in the case where large deformation occurs when touching a hard surface, a soft surface, or a sticky surface.

As shown in FIG. 15, when the soft surface is largely deformed, in many cases, the surface plastically deforms and does not return completely to the original shape. Therefore, the inventors of the present invention have built a hypothesis that providing hysteresis when lifting the finger after pressing down the surface once allows the softness to be felt. Further, in the case of the sticky surface, when lifting the finger, the finger comes into contact with an area that is larger than that in the case of the hard surface. Therefore, the inventors of the present invention have built a hypothesis that providing hysteresis when lifting the finger after pressing down the surface once allows the stickiness to be felt.

That is, in Experiment 1 in the present exemplary embodiment, an experiment was conducted as to whether it was possible to present the stickiness by changing a stimulus with respect to the "force" at the fingertip. For example, since the finger comes into contact with the soft surface in an area larger than that in the case of the hard surface at the time of the pressing down, the inventors built a hypothesis that softness was felt by applying a stronger stimulus at the time of the pressing down and conducted an experiment. On the other hand, since the finger comes into contact with the sticky surface in an area larger than that in the case of the hard surface at the time of the lifting, an experiment was conducted as to whether a sticky feeling could be presented by applying a stronger stimulus.

Figure 16:
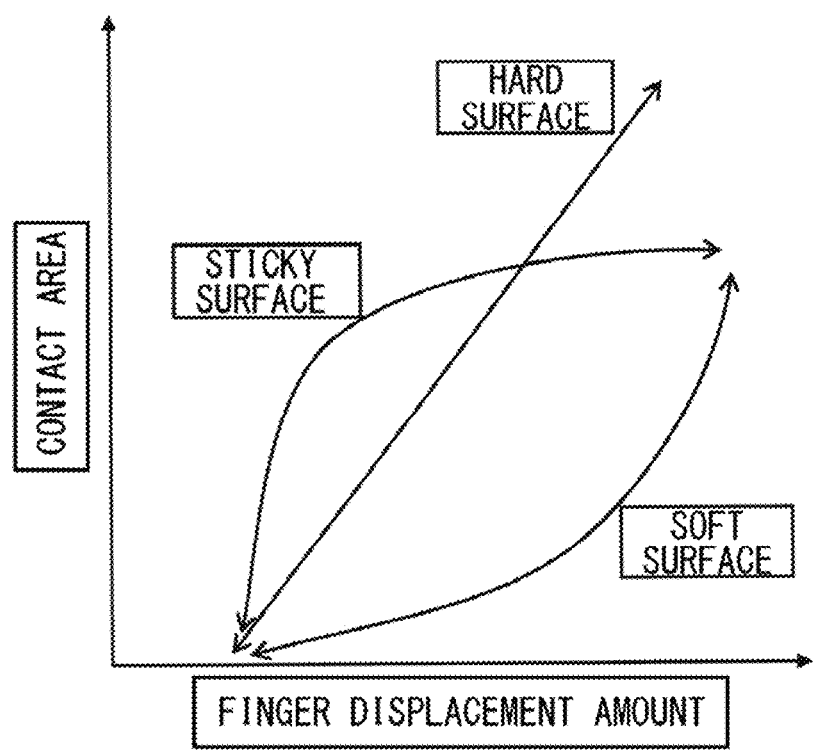
FIG. 16 is a diagram showing changes in the respective contact areas of the hard surface, the soft surface, and the sticky surface with respect to the amount of displacement of the finger.
Figure 17:
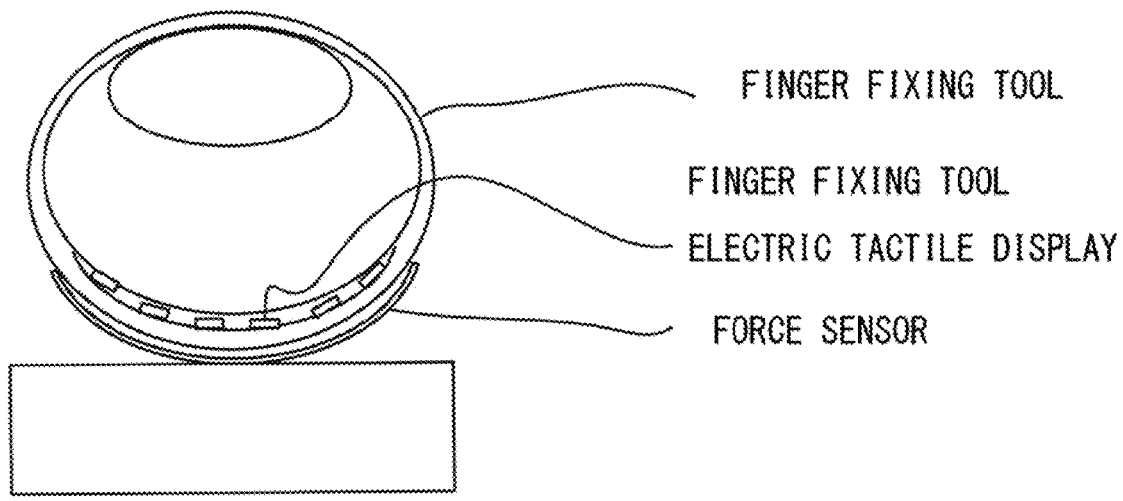
FIG. 17 is a diagram schematically showing, from the fingertip side, the configuration of an experimental device used in Experiment 1 according to the first exemplary embodiment.
Figure 18:
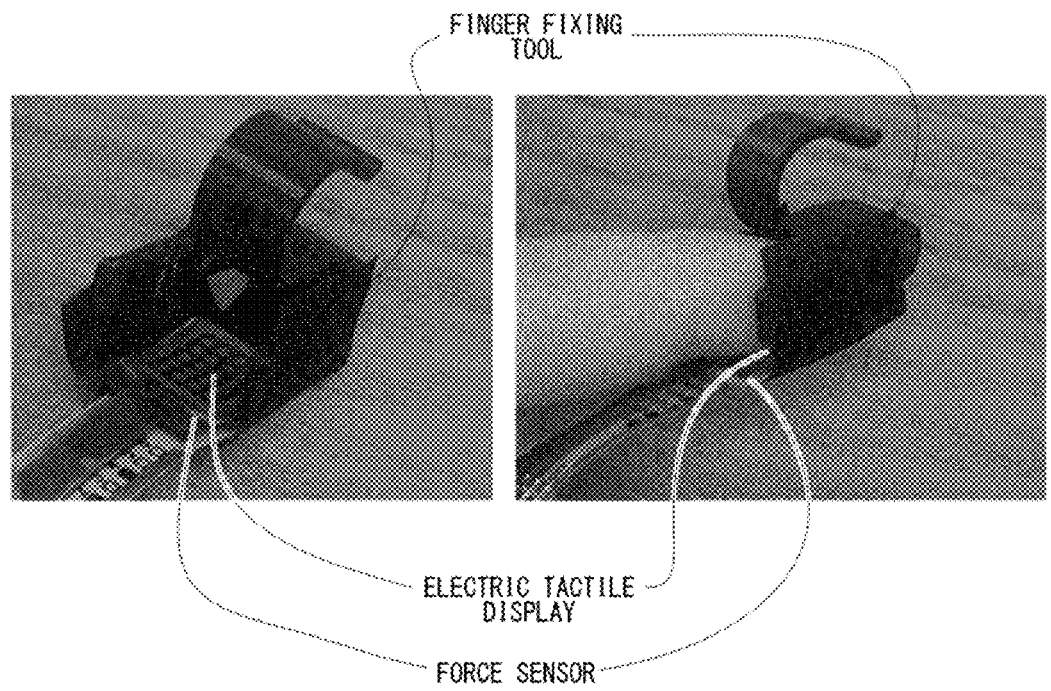
FIG. 18 is a photo diagram showing a state before the experimental device used in Experiment 1 according to the first exemplary embodiment is worn on the finger and a state after the experimental device is worn.

In Experiment 2 in the present exemplary embodiment, an experiment was conducted as to whether it was possible to present the stickiness by changing a stimulus with respect to the "displacement" at the fingertip. FIG. 16 is a diagram showing changes in the respective contact areas of the hard surface, the soft surface, and the sticky surface with respect to the amount of displacement of the finger. For example, on the soft surface, in many cases, a largely deformed soft plane is plastically deformed, and the contact area is decreased. An experiment was conducted as to whether providing hysteresis when lifting the finger after pressing down the surface once allows the softness to be felt. Since the finger comes into contact with the sticky surface in an area larger than that in the case of the hard surface at the time of the lifting, an experiment was conducted as to whether the stickiness was felt by applying hysteresis when lifting the finger after pressing down the surface once. FIG. 17 is a diagram schematically showing, from the fingertip side, the configuration of an experimental device used in Experiment 1 according to the first exemplary embodiment. FIG. 18 is a photo diagram showing a state before the experimental device used in Experiment 1 according to the first exemplary embodiment is worn on the finger and a state after the experimental device is worn.

Figure 19:
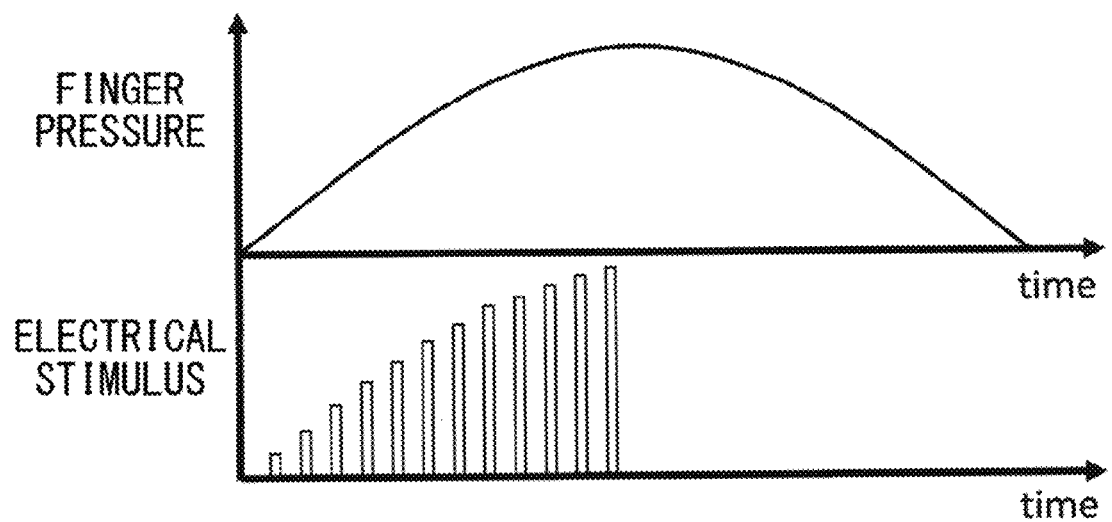
FIG. 19 is a diagram showing an experimental condition (Press condition) used for presenting a soft feeling in Experiment 1 according to the first exemplary embodiment.
Figure 20:
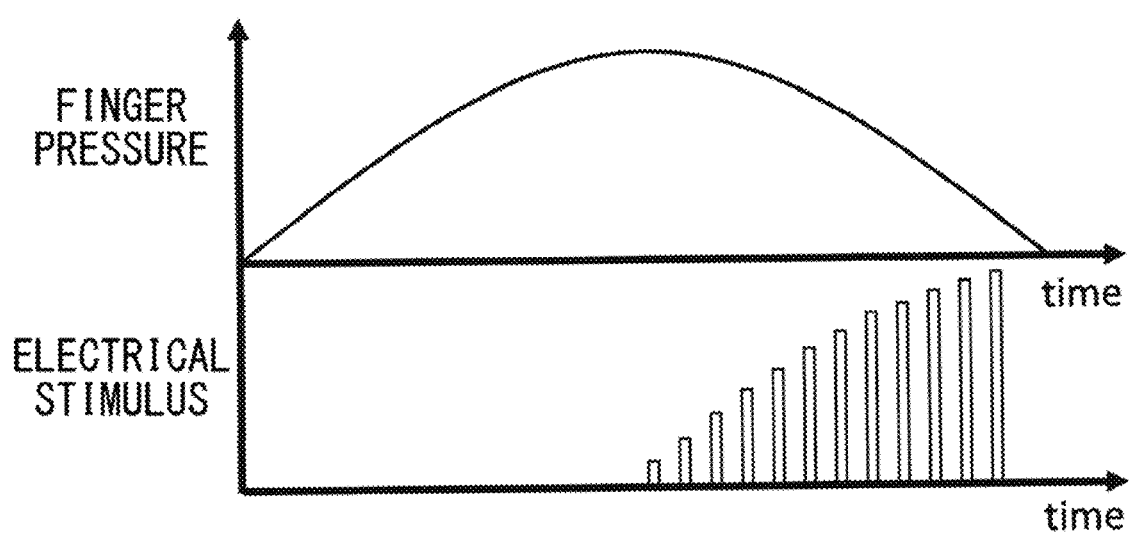
FIG. 20 is a diagram showing an experimental condition (Release condition) used for presenting a sticky feeling in Experiment 1 according to the first exemplary embodiment.

As shown in FIGS. 17 and 18, in Experiment 1 according to the first exemplary embodiment, a film-like force sensor was used as the input unit 112. As the output unit 114, an electrical tactile display having a diameter of 1.4 mm was used in which electric stimulators were arranged in a 4 by 5 matrix at intervals of 2 mm. As shown in the figure, a finger fixing tool was used to maintain contact between an electrode for electrical stimulation and the skin. In the present experiment, unless otherwise specified, cathodal stimulation was used for the polarity of all the electrical stimulation. Further, all twenty electrodes were stimulated one at a time with a pulse period of 60 pps (pulses per sec). FIG. 19 is a diagram showing an experimental condition (Press condition) used for presenting a soft feeling in Experiment 1 according to the first exemplary embodiment. FIG. 20 is a diagram showing an experimental condition (Release condition) used for presenting a sticky feeling in Experiment 1 according to the first exemplary embodiment.

Figure 21:
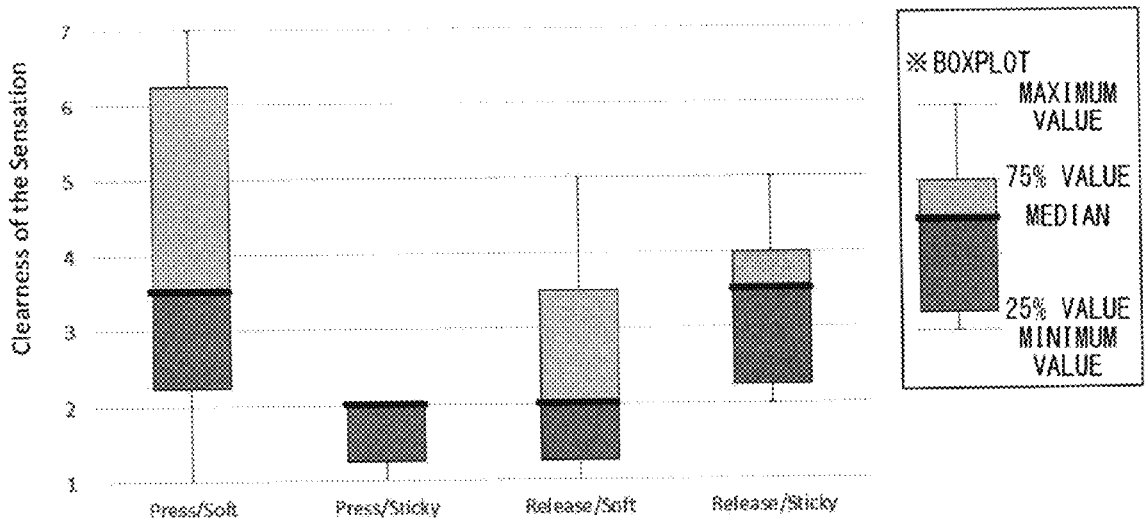
FIG. 21 is a diagram showing subjective evaluation experimental results according to Experiment 1 according to the first exemplary embodiment.

In order to confirm that desired tactile feeling presentation can be realized, seven levels of subjective evaluation experiments were conducted. The target pressing down pressure was changed sinusoidally between 0 g and 500 g at 1 Hz. The target pressing down pressure and the current pressing down pressure were displayed on a screen, and subjects were asked to change the force for pressing the finger against a plate according to these pressures such that the force was adjusted so as to clearly feel the stimulation from the electric stimulation. The subjects were asked to provide an answer indicating the soft feeling felt at this time in the seven subjective levels from "not feeling at all" to "feeling clearly". In the same manner, the subjects were asked to provide an answer indicating the sticky feeling in the seven subjective levels. There were six subjects. FIG. 21 is a diagram showing subjective evaluation experimental results according to Experiment 1 according to the first exemplary embodiment. The vertical axis shows numerical values for the seven levels of subjective evaluation. Further, the horizontal axis indicates, starting from the left, a subjective evaluation result of a soft feeling under the Press condition, a subjective evaluation result of a sticky feeling under the Press condition, a subjective evaluation result of a soft feeling under the Release condition, and a subjective evaluation result of a sticky feeling under the Release condition.

As shown in FIG. 21, under the Press condition, a soft feeling was able to be clearly presented as expected, and no sticky feeling was generated. Under the Release condition, a result was obtained indicating that a sticky feeling was felt more than a soft feeling. A result was obtained indicating that a soft feeling was felt more under the Press condition than the Release condition and that a sticky feeling was felt more under the Release condition than the Press condition. Therefore, it was shown that both the soft feeling and the sticky feeling were able to be presented by the presentation of cutaneous sensation by electric stimulation according to the pressing down force. Inotherwords, in Experiment 1, with regard to the hypothesis of whether it was possible to present stickiness by changing stimulation with respect to the force at the fingertip, it was confirmed that stickiness was able to be presented by changing stimulation with respect to the "force" at the fingertip.

Figure 22:
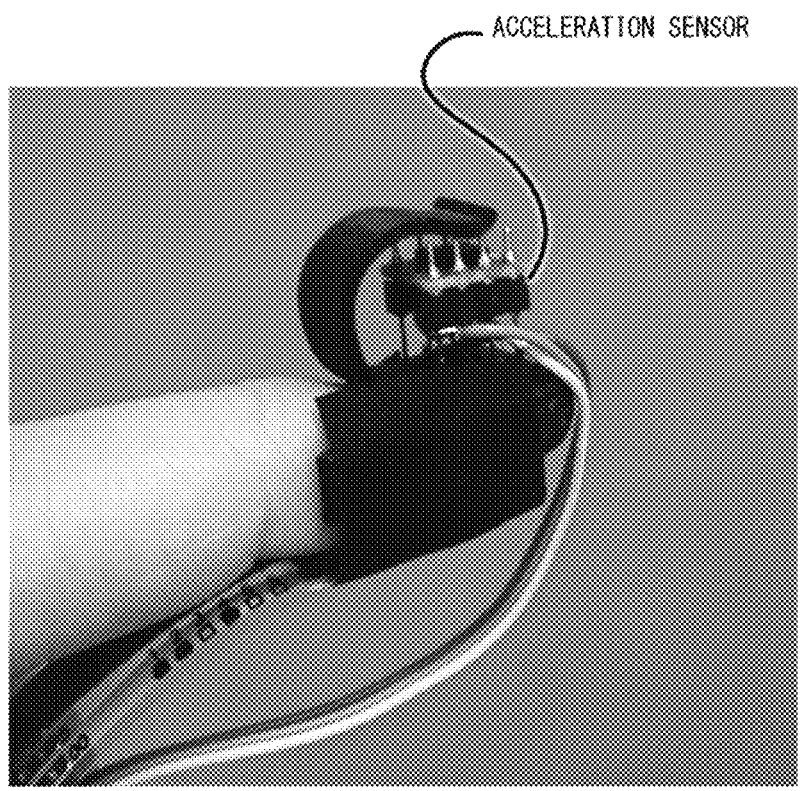
FIG. 22 is a photo diagram showing a state where an experimental device used in Experiment 2 according to the first exemplary embodiment is worn on the finger.
Figure 23:
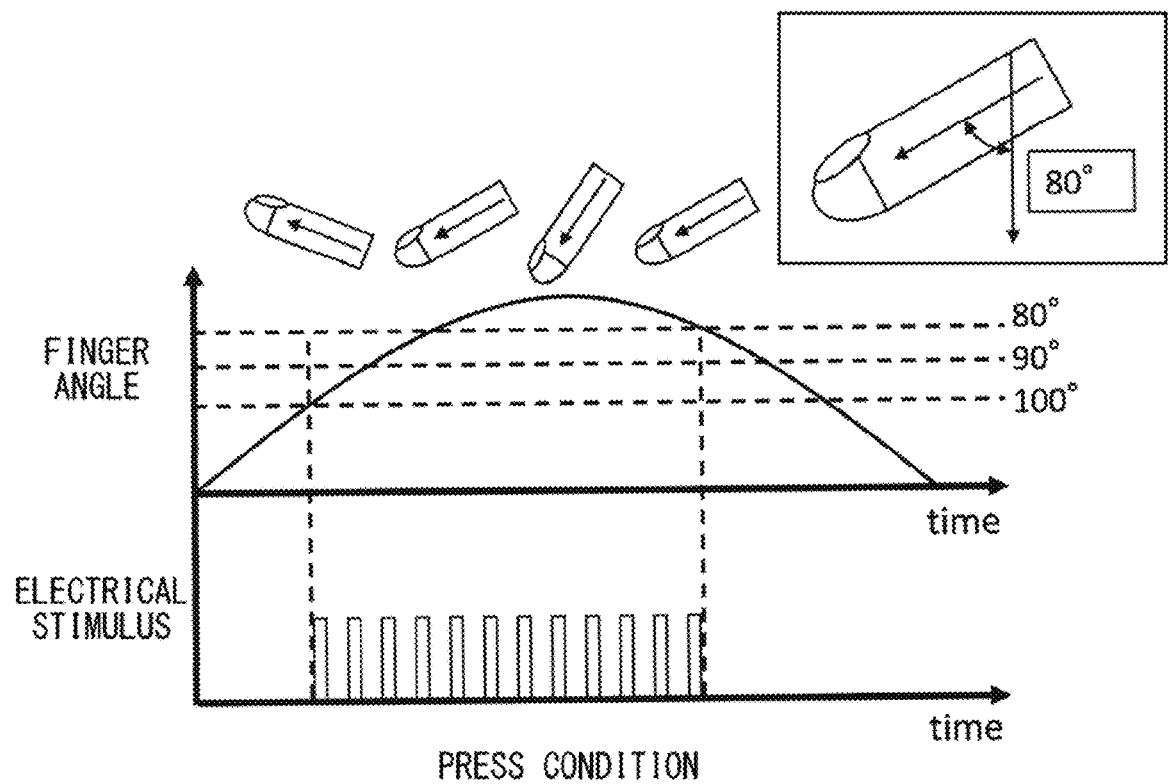
FIG. 23 is a diagram showing an experimental condition (Press condition) of Experiment 2 according to the first exemplary embodiment.
Figure 24:
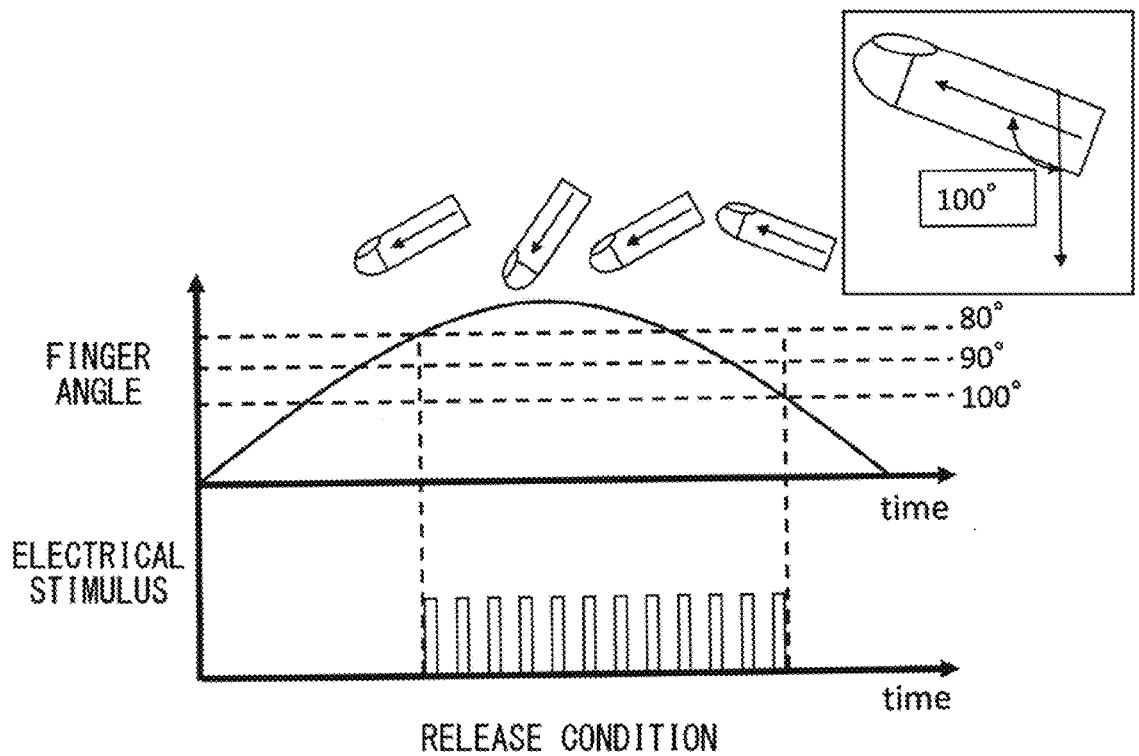
FIG. 24 is a diagram showing an experimental condition (Release condition) of Experiment example 2 according to the first exemplary embodiment.

Subsequently, in Experiment 2 in the present exemplary embodiment, an experiment was conducted as to whether it was possible to present stickiness by changing stimulation with respect to the "displacement" at the fingertip. FIG. 22 is a photo diagram showing a state where an experimental device used in Experiment 2 according to the first exemplary embodiment is worn on the finger. As shown in FIG. 22, unlike the device configuration in Experiment 1, an acceleration sensor is provided. Thereby, the tilt of the finger can be measured, and the stimulation can be changed according to the movement of the finger in the air. The desk and the pressure sensor of Experiment 1 are not used. FIG. 23 is a diagram showing an experimental condition (Press condition) of Experiment 2 according to the first exemplary embodiment. FIG. 24 is a diagram showing an experimental condition (Release condition) of Experiment example 2 according to the first exemplary embodiment.

As shown in FIG. 23, under the Press condition, at the time of a pushing motion, a lifting up motion was performed at an angle of 100 degrees or less from the vertically downward direction, and stimulation was provided at a constant current value adjusted by a volume at an angle of 80 degrees or more. On the other hand, as shown in FIG. 24, under the Release condition, stimulation was provided at a constant current value adjusted by a volume at an angle of 100 degrees or less from the vertically downward direction at the time of a pushing motion and at an angle of 80 degrees or more at the time of a lifting up motion. As a result, under the Press condition, the stimulation range at the time of the pushing motion became larger than that at the time of the lifting up motion, and under the Release condition, on the contrary, the stimulation range at the time of the lifting up motion became larger than that at the time of the pushing operation. Thus, it can be considered that the hysteresis characteristic was simulated.

Figure 25:
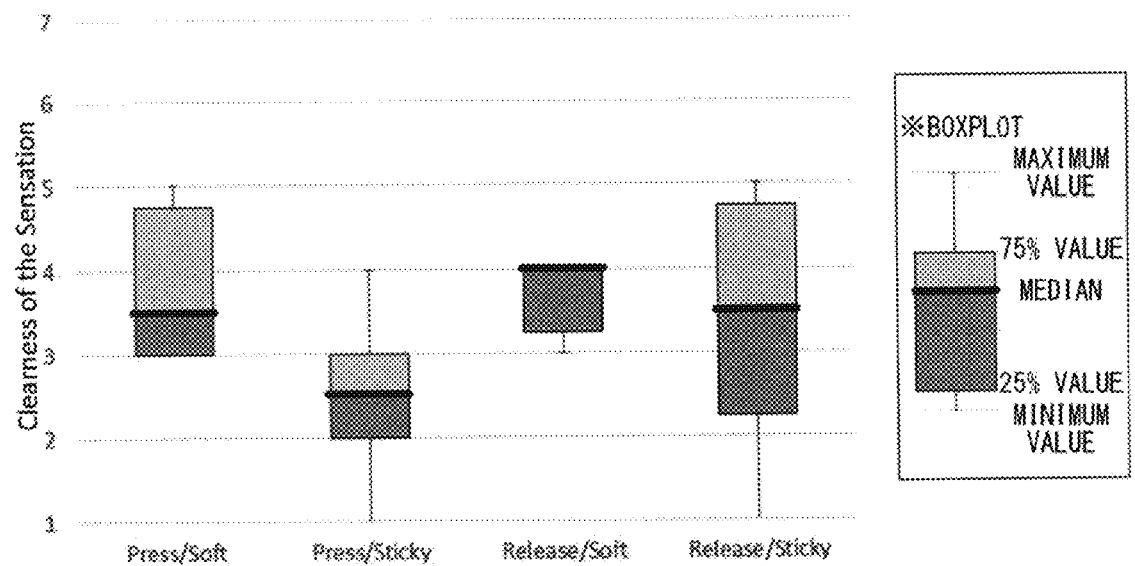
FIG. 25 is a diagram showing subjective evaluation experimental results according to Experiment 2 according to the first exemplary embodiment.

In order to confirm that desired tactile feeling presentation can be realized, seven levels of subjective evaluation experiments were conducted. The angle of the finger was changed sinusoidally between 60 degrees and 120 degrees every 1.5 seconds. The target pressing down pressure and the current pressing down pressure were displayed on a screen, and subjects were asked to move their fingers according to these pressures so as to make adjustment to clearly feel the stimulation from the electric stimulation. The subjects were asked to provide an answer indicating the soft feeling felt at this time in the seven subjective levels from "not feeling at all" to "feeling clearly". In the same manner, the subjects were asked to provide an answer indicating the sticky feeling in the seven subjective levels. There were six subjects. FIG. 25 is a diagram showing subjective evaluation experimental results according to Experiment 2 according to the first exemplary embodiment. The vertical axis shows numerical values for the seven levels of subjective evaluation. Further, the horizontal axis indicates, starting from the left, a subjective evaluation result of a soft feeling under the Press condition, a subjective evaluation result of a sticky feeling under the Press condition, a subjective evaluation result of a soft feeling under the Release condition, and a subjective evaluation result of a sticky feeling under the Release condition.

As shown in FIG. 25, a result was obtained indicating that, under the Press condition, a soft feeling was clearly felt and a sticky feeling was not felt. Under the Release condition, there was almost no difference between a soft feeling and a sticky feeling. A result was obtained indicating that a sticky feeling was felt more under the Release condition than the Press condition. In conclusion, it was confirmed that, by providing hysteresis to the stimulation with respect to the motion through electrical stimulation in the movement in the air, a sticky feeling was able to be presented.

As described above, in the first exemplary embodiment, a soft feeling was able to be presented by applying stronger stimulation at the time of the pressing down, using a technique of changing electrical stimulation with respect to the force at the fingertip in a situation where the fingertip is pressed against the object in Experiment 1. Further, it was found that it is possible to present a sticky feeling by applying stronger stimulation at the time of the lifting. Further, in Experiment 2, it was confirmed that a sticky feeling was able to be presented by providing hysteresis of applying stimulation that was longer at the time of the pressing down than that at the time of the lifting, using a technique of changing electrical stimulation with respect to the displacement of the fingertip in a situation where the fingertip was moved in the air.

Advantages of electrical stimulation being better than stimulation by a mechanical pin matrix or the like include the following. When there is stickiness, it is normally necessary to reproduce a situation where pressure sensation is generated although the finger is being lifted upward. However, the reproduction of the situation is difficult with mechanical stimulation. In the case of a stationary (desk-top) tactile display, there is a problem that the total amount of stimulation cannot be changed since the total amount of the reaction force from each pin to the skin is always equal to the pressing down force of the finger in the case of stimulation by a pin matrix, which moves up and down. By using electrical stimulation, the total amount of stimulation can be changed independently of the pressing down force of the finger, and the problem with mechanical stimulation can be overcome. Further, in the case of a wearable tactile display, there is a problem that, since reaction force is generated inside the fingerstall being put on due to the total amount of the reaction force from each pin to the skin in the case of stimulation by a pin matrix, which moves up and down, counter force is generated on the backside of the finger even when the stimulation is desired to be applied only to the finger pad. By using electrical stimulation, stimulation can be applied independently to the finger pad.

Figure 26:
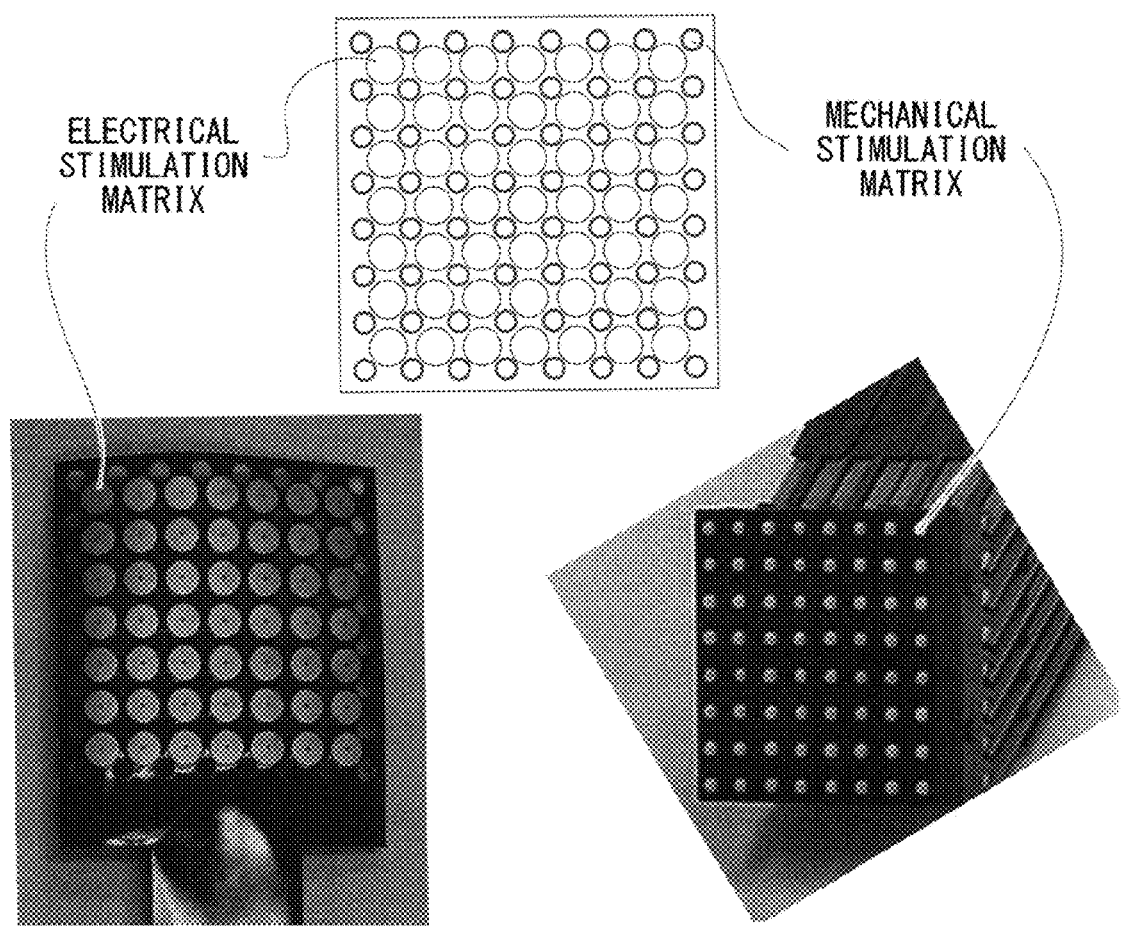
FIG. 26 is a diagram showing a configuration example of a high-density presentation device in which an electrical stimulation matrix and a mechanical stimulation matrix are combined.

Instead of choosing between mechanical stimulation and electrical stimulation, an output device that makes use of the characteristics of both may be constructed. FIG. 26 is a diagram showing a configuration example of a high-density presentation device in which an electrical stimulation matrix and a mechanical stimulation matrix are combined. In the case of electrical stimulation, there are problems related to sensation stability and sensation quality with prolonged stimulation. However, electrical stimulation also has an advantage of providing a very natural sensation in the case of brief pulse presentation. In addition, electrical stimulation has an advantage of being able to output stimulation with high temporal resolution (such as vibration sensation). Mechanical stimulation, on the other hand, comes with a problem that time responsiveness is poor especially when the stimulation is made smaller as in matrix presentation. In addition, in the case of increasing time responsiveness, there is a problem that presentation can be achieved only at a certain frequency since a design where resonance is generated is employed. However, there are also advantages that it is easy to continue presenting a certain pressure and that pressure sensation presentation is easy. Therefore, as shown in FIG. 26, it is possible, by combining the gains and losses of both, to use a technique of presenting a variation component of tactile sensation using an electrical tactile display and presenting a pressure distribution component of tactile sensation using mechanical stimulation. In the present configuration example, the mechanical stimulation matrix and the electrical stimulation matrix were set at intervals of 3 mm each, and for the mechanical stimulation matrix, a dot matrix display manufactured by KGS corporation was used. The electrode size is 2.4 mm in diameter.

Second Exemplary Embodiment

The second exemplary embodiment using the tactile feeling presentation system according to the present embodiment will be explained in the following.

Temperature presentation tends to be delayed in the presentation due to the characteristics of the element and the nature of the heat. Also, there is a problem that the perception is difficult because the temporal and spatial two-point discrimination threshold of temperature stimulation is large due to the physiological characteristics of a human being. In the second exemplary embodiment, it was confirmed experimentally that a perception point was able to be clarified temporally and spatially mainly for temperature presentation.

Figure 27:
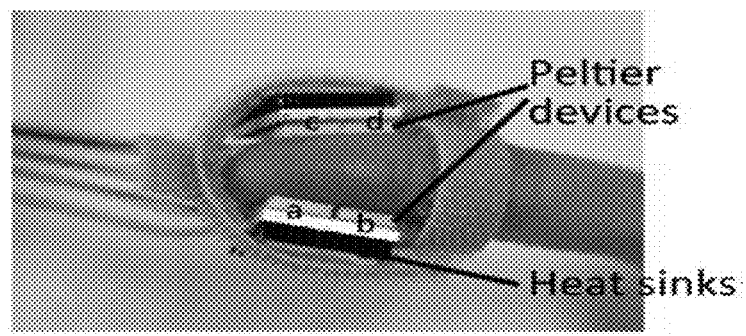
FIG. 27 is a diagram showing the configuration of an experimental device (Peltier element) according to the second exemplary embodiment.
Figure 28A:
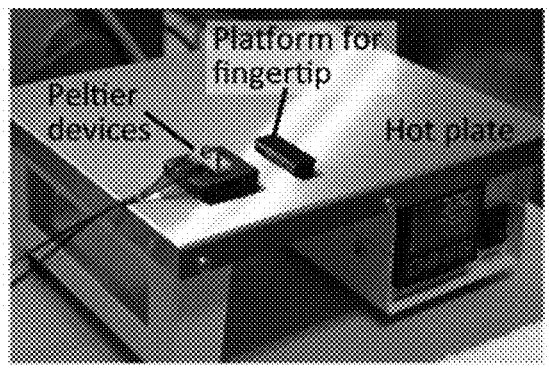
FIGS. 28A and 28B are diagrams showing an experimental environment according to the second exemplary embodiment and examples of how a Peltier element is attached.

That is, as the purpose of the second exemplary embodiment, it was confirmed whether a warm/cold feeling obtained from an object was changed so as to be able to realize the augmented reality of the warm/cold feeling by presenting the warm/cold stimulation to a finger side surface portion at the same time a finger pad touches the object. There were nine female subjects aged from 18 to 21 years old. No prior knowledge regarding the experimental hypothesis was provided to the subjects. The skin temperature of the finger pad was adjusted to 32 degrees, and the experiment was then conducted. FIG. 27 is a diagram showing the configuration of an experimental device (Peltier element) according to the second exemplary embodiment, and FIGS. 28A and 28B are diagrams showing an experimental environment according to the second exemplary embodiment and examples of how a Peltier element is attached.

Figure 28B:
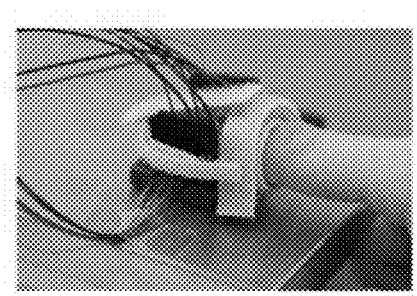

As shown in FIG. 27 and FIG. 28B, a Peltier element was attached to the finger side surface (parts indicated by a, b, c, and d). Also, as shown in FIG. 28A, the skin temperature was adjusted using a hot plate. On the hot plate, a Peltier element to be touched and an aluminum plate (Platform) for rest were placed.

As a method of the experiment according to the second exemplary embodiment, at intervals of 30 seconds, an object to be touched was touched at the same time a signal was provided. The subjects were asked to feel a randomly chosen stimulus when touching the object to be touched for two seconds and asked to answer the stimulus strength felt at the finger pad in a numerical number while setting the perceived strength with respect to a standard stimulus as 100. Three trials were conducted for each condition, and the average value was adopted as the perceived strength of the subject.

Figure 29:
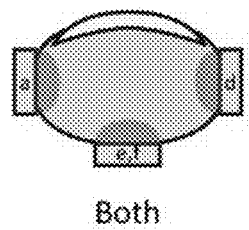
FIG. 29 is a diagram schematically showing a position at which a thermal stimulus is provided, when a finger is viewed from the fingertip side.
Figure 29:
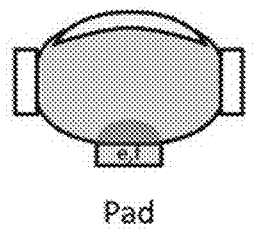
Figure 29:
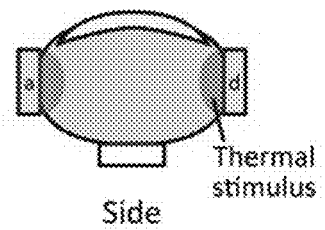

As the conditions for the second exemplary embodiment, the types of the stimulation were set to be two kinds: warm; and cold. Further, as shown in FIG. 29, there were three kinds of stimulus presentation sites, which were: Both (side and pad); Pad (pad only); and Side (side surface only). FIG. 29 is a diagram schematically showing a position at which a thermal stimulus is provided, when a finger is viewed from the fingertip side. Two Peltier elements were used for each of the pad and the side, and there were two kinds of stimulation strength: (warm and strong 4° C./s, warm and weak 3° C./s, cold and strong 3° C./s, and cold and weak 2° C./s). A strong stimulus to Pad (pad only) was used as the standard stimulus, and the strength of the standard stimulus was checked for every six trials.

Figure 30A:
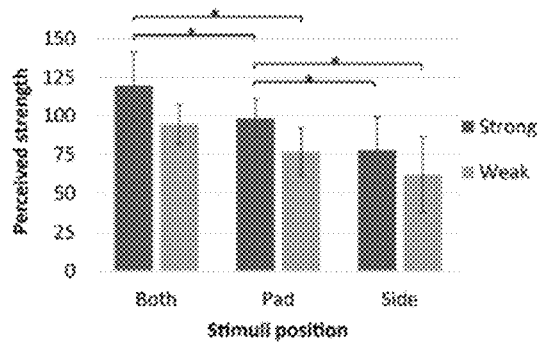
FIGS. 30A and 30B are graphic diagrams showing experimental results of the second exemplary embodiment.
Figure 30B:
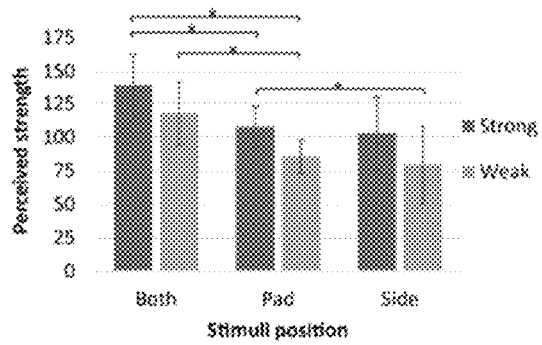

FIGS. 30A and 30B are graphic diagrams showing experimental results of the second exemplary embodiment. FIG. 30A shows the case of a warm stimulus, and FIG. 30B shows the case of a cold stimulus, and the figures illustrate only significant differences from Pad (finger pad only) while having p<0.05 (multiple comparison by ANOVA and Ryan method).

As a result, as shown in FIG. 30, in Both (side and pad) and Pad (pad only), both warmth and coldness were perceived stronger in Both than in Pad. Also, in Pad (pad only) and Side (side only), Pad weak and Side strong were perceived to have equal strength under the warm stimulus. Also, under the cold stimulus, Pad weak and Side strong were also perceived to have equal strength.

As the consideration of Experiment 1 according to the second exemplary embodiment, it was confirmed that, by applying warm/cold stimulation to the finger side surface portion at the moment when the finger pad came into contact with the object, a finger cooling feeling that was equivalent to the feeling felt when the temperature of the finger pad was actually changed was able to be perceived.

Subsequently, as Experiment 2 according to the second exemplary embodiment, the presentation position of warm/cold stimulation and the presence or absence of a pressure/vibration stimulus were examined. The purpose of Experiment 2 was to evaluate a warm/cold feeling perceived at each of the finger pad and the side surface when the finger pad was in contact with the object in advance or was not in contact with the object, in other words, how the warm/cold feeling was affected by the presence or absence of a pressure stimulus was experimentally checked.

In the case where the pad was in contact with the object, the influence of the presentation position (one side and both sides) of the warm/cold stimulation on a side surface portion and the influence of the presence or absence of a vibration stimulus were evaluated. There were twelve female subjects aged from 19 to 21 years old, and no prior knowledge regarding the experimental hypothesis was provided to the subjects. The skin temperature of the finger pad was adjusted to 32 degrees in advance.

Figure 31:
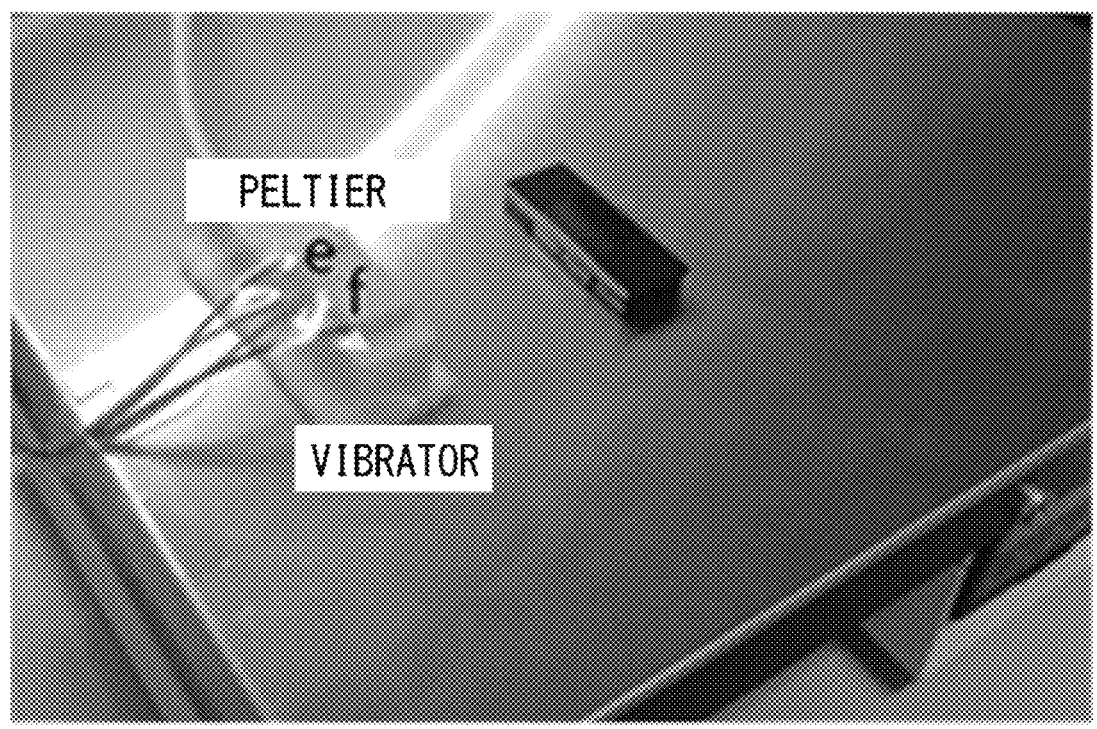
FIG. 31 is a diagram showing an experimental device for Experiment 2 according to the second exemplary embodiment.

FIG. 31 is a diagram showing an experimental device for Experiment 2 according to the second exemplary embodiment. As in Experiment 1, a Peltier element was attached to the side surface of the finger, and the skin temperature was adjusted using a hot plate. As shown in FIG. 31, on the hot plate, a Peltier element (parts indicated by e and b) to be touched and an aluminum plate for rest were placed. A vibrator (TECHTILE Toolkit) was provided under the Peltier element.

As an experimental method of Experiment 2 according to the second exemplary embodiment, at intervals of 30 seconds, the subjects touched an object to be touched at the same time a signal was provided or kept their fingers in the air. The subjects were asked to feel a randomly chosen stimulus for two seconds and asked to answer the stimulus strength felt at the pad and side surface portion of the finger in a numerical number while setting the perceived strength with respect to a standard stimulus as 100. The experiment was conducted for one trial for each condition.

Figure 32:
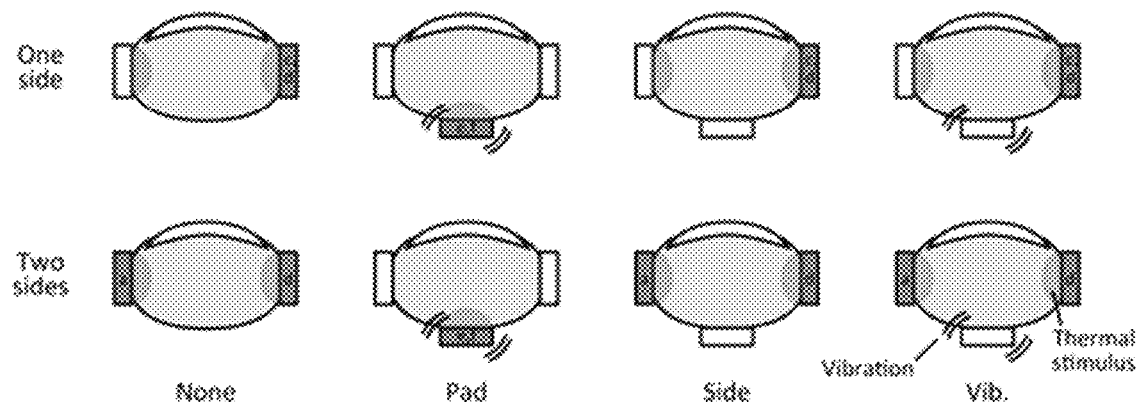
FIG. 32 is a diagram schematically showing a position at which a thermal stimulus is provided, when a finger is viewed from the fingertip side.

As the experimental conditions for Experiment 2 according to the second exemplary embodiment, the types of the stimulation were set to be two kinds: warm; and cold. Further, as shown in FIG. 32, there were four kinds of stimulation presentation conditions, which were: None (no pad contact); Pad (pad only); Side (side surface only without vibration); and Vib (side surface only with vibration). FIG. 32 is a diagram schematically showing a position at which a thermal stimulus is provided, when a finger is viewed from the fingertip side. As shown in FIG. 32, two Peltier elements were used for each of the pad and the side surface. There were two kinds of stimulation strength: warm and strong 4° C./s, warm and weak 3° C./s, cold and strong 3° C./s, and cold and weak 2° C./s. A vibration stimulus was applied to the finger pad at 200 Hz for 0.1 second immediately before the warm/cold stimulation. A strong stimulus to Pad (finger pad) was used as the standard stimulus, and the strength of the standard stimulus was checked for every eight trials.

Figure 33:
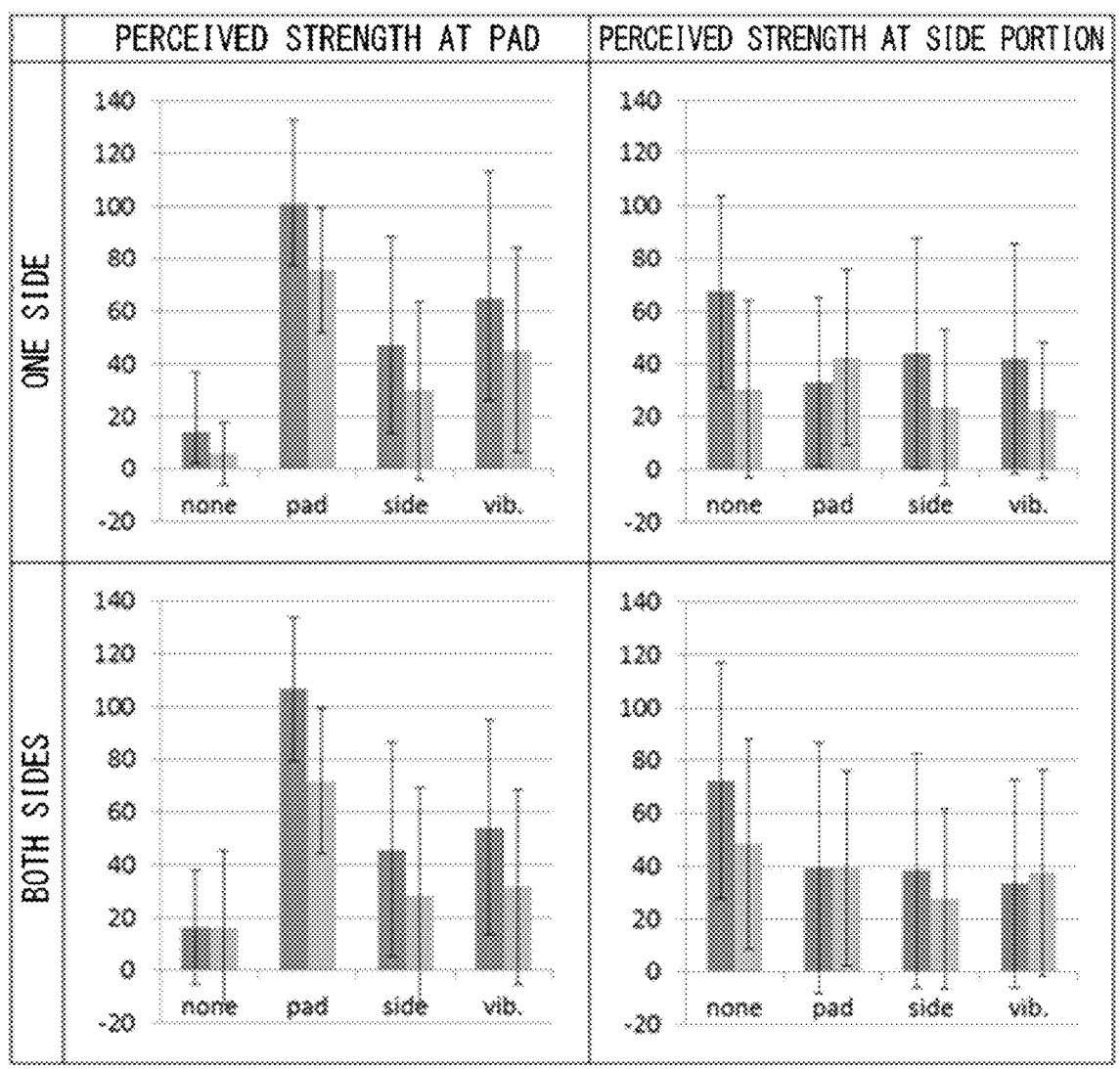
FIG. 33 is a graphic diagram showing experimental results of Experiment 2 according to the second exemplary embodiment in the case of a warm stimulus.
Figure 34:
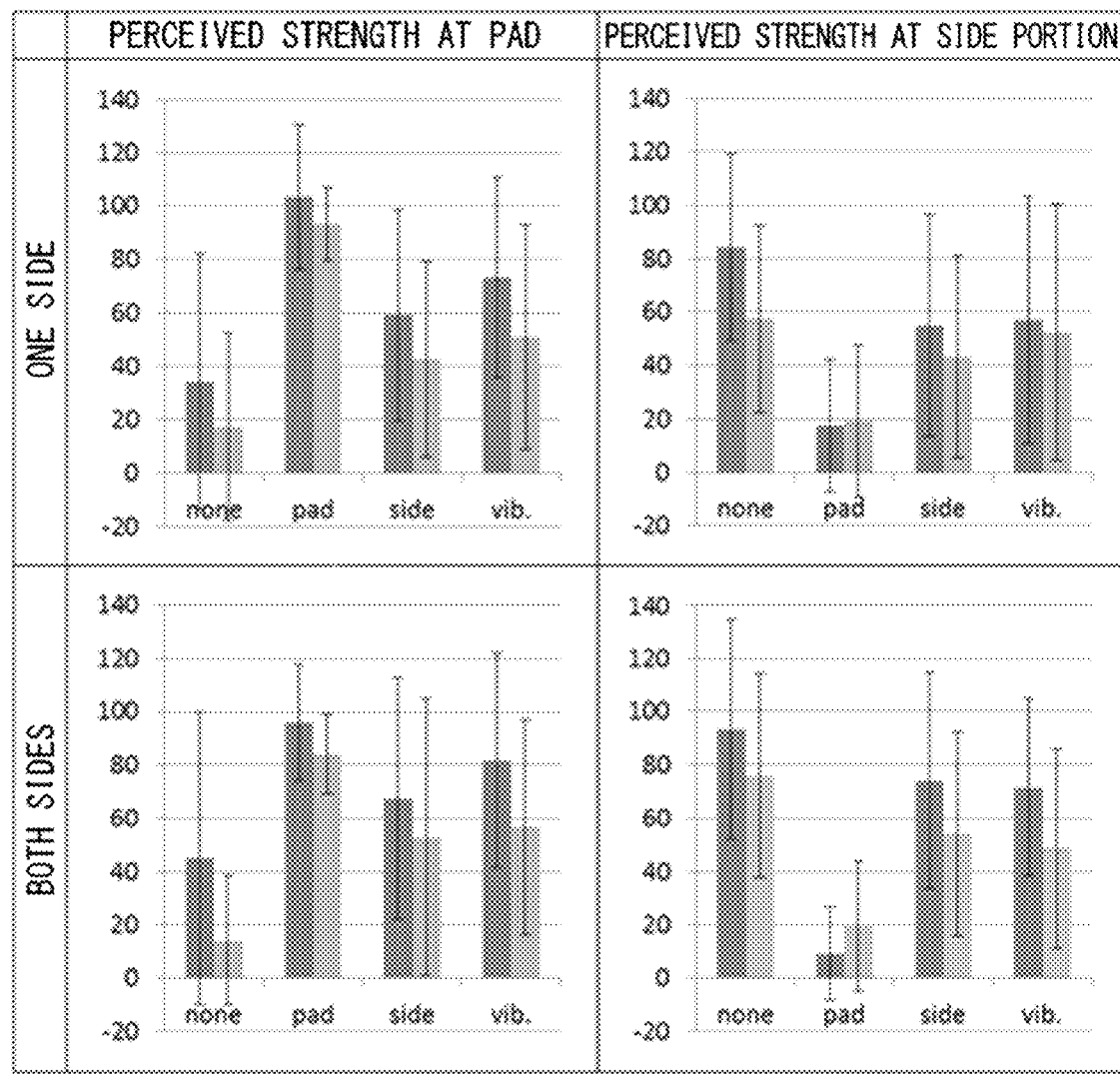
FIG. 34 is a graphic diagram showing experimental results of Experiment 2 according to the second exemplary embodiment in the case of a cold stimulus.

FIG. 33 is a graphic diagram showing experimental results of Experiment 2 according to the second exemplary embodiment in the case of a warm stimulus. FIG. 34 is a graphic diagram showing experimental results of Experiment 2 according to the second exemplary embodiment in the case of a cold stimulus. As in FIG. 30, the strong stimulus is shown by a thick bar graph, and the weak stimulus is shown by a light bar graph.

As shown in FIG. 33, in the case of the warm stimulus, no warm feeling was perceived at the pad without any contact with the stimulus to a side surface portion in both case of one side and both sides. When the stimulus was given only to the finger pad, a warm feeling was slightly perceived on a side portion. In the perceived strength at the pad, analysis of variance caused by the stimulation position on the side surface portion, the presence or absence of a vibration stimulus, and the stimulation strength was conducted, and the result shows a significant difference only in the main effect of the stimulation strength (F (1.95)=10.16, p<0.01). On the other hand, there was no significant difference in the main effect of the stimulation position and the presence or absence of the vibration stimulus (F (1.95)=0.80, p=0.39. F (1.95)=1.131, p<0.31).

In the perceived strength at the side portion, there was a significant difference in the interaction between the position and the strength (F (1.95)=4.85, p<0.05), and, as a result of multiple comparison, there was a significant difference in the strength in the case of one side stimulation (p<0.05).

As shown in FIG. 34, in the case of the cold stimulus, there was a case where a cold feeling was slightly perceived at the pad without any contact with the stimulus to a side surface portion in both cases of one side and both sides. On the other hand, when the stimulus was given only to the finger pad, no cold feeling was perceived on the side portion. In the perceived strength at the pad, analysis of variance caused by the stimulation position on the side surface portion, the presence or absence of a vibration stimulus, and the stimulation strength was conducted, and the result shows a significant difference only in the main effect of the presence or absence of the vibration stimulus and the stimulation strength (F (1.95)=5.55, p<0.05, F (1.95)=7.74, P<0.05). There was no significant difference in the main effect of the stimulation position (F (1.95)=0.76, p<0.40). Regarding the perceived strength at the side portion, there was a significant difference in the main effect of the strength (F (1.95)=10.45, p<0.01).

Based on Experiment 2 above, it was found that tactile stimulation to the finger pad was important in the presentation of a warm/cold feeling to the finger pad. Further, it was found that a warm/cold feeling was able to be presented to the pad even in the case of a pressure stimulus alone. Moreover, it was found that a warm/cold feeling was able to be presented to the pad even in the case of stimulation to one side of the side surface portion. In other words, since there was no difference between the case of one side and the case of both sides and there was no warm/cold feeling generated at the pad when there was no contact, it was considered that this phenomenon that was generated was not a phantom sensation phenomenon but a phenomenon similar to thermal referral. However, since there was a case where cold sensation was perceived at the pad even without any contact in the case of cold stimulation, there is a possibility that this is a completely new phenomenon different from thermal referral.

As a preliminary experiment (Experiment 3) of the second exemplary embodiment, basic checking was conducted on the following three items.

a. presence or absence of contact+thermal stimulus
b. presence or absence of vibration stimulus+thermal stimulus
c. pressure stimulus+vibration stimulus+thermal stimulus There were two female subjects, and the skin temperature of the finger was adjusted to 32 degrees. In the experimental device, as shown in FIG. 27, the Peltier element was attached on the side surface of the finger, and the stimulation strength was set to be about 3.5° C./s, and the stimulation time was set to be 2 seconds. As for the vibration stimulus, the TECHTILE Toolkit was used, and the frequency was set to be 200 Hz.

As an experiment method for Experiment 3 (a. presence or absence of contact+thermal stimulus) according to the second exemplary embodiment, a target object (plastic resin) was touched as soon as an alarm sounded, and a thermal stimulus was started at a specific time before and after the alarm (−2 seconds to +2 seconds, 9 types in increments of 0.5 seconds). Then, the subjects were asked to answer the thermal sensation felt at the finger pad using a numerical value (cold: −3 points to +3 points: warm). Two trials were conducted for each condition.

Figure 35:
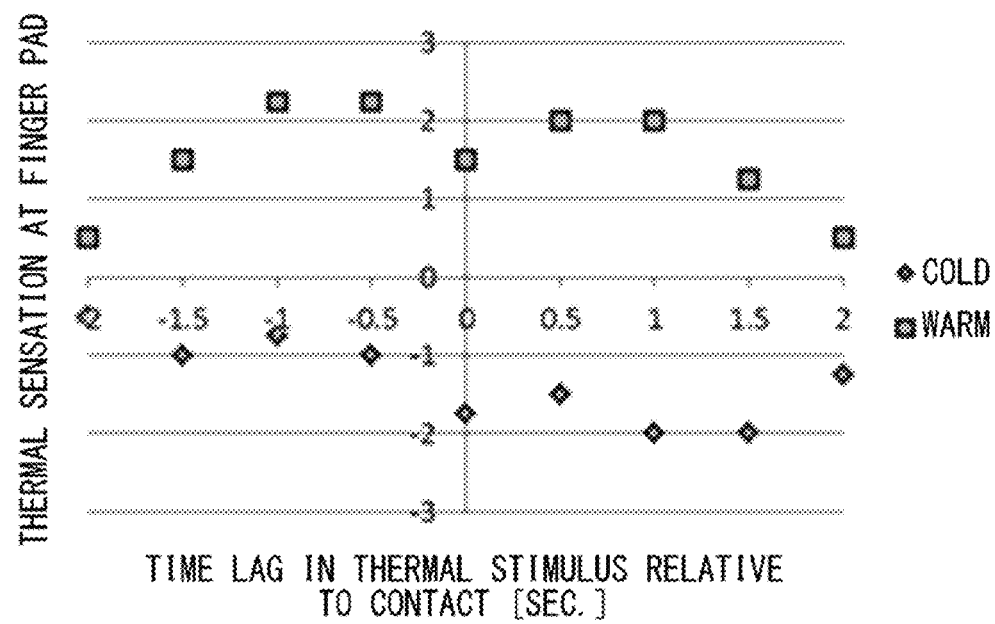
FIG. 35 is a diagram showing a time lag in thermal sensation relative to contact according to Experiment 3 (a. presence or absence of contact+thermal stimulus)

FIG. 35 is a diagram showing a time lag in thermal sensation relative to contact according to Experiment 3 (a. presence or absence of contact+thermal stimulus). As shown in FIG. 35, it was found that the thermal sensation at the finger pad did not occur when the time lag was about ±2 seconds. It is desirable to present a thermal stimulus earlier than a vibration stimulus in the case of warm sensation and to present a thermal stimulus and a vibration stimulus simultaneously in the case of cold sensation. Based on psychophysical knowledge, it is known that warm sensation is felt belatedly, and it is possible that this possibly had an effect. Also, as a subjective impression, the sensation was felt the strongest when the temperature of the skin changed at the same time as the contact, feeling that the subject was touching a warm (or cold) plastic resin.

Subsequently, an experiment was conducted regarding a time lag in thermal sensation relative to vibration through Experiment 3 (b. presence or absence of vibration stimulus+thermal stimulus). As the experimental method, the subjects were asked to wait while touching a plastic resin, and a stimulus was presented by vibrating the plastic. A thermal stimulus was started at a specific time before and after the vibration stimulus (−2 seconds to +2 seconds, 9 types in increments of 0.5 seconds). Then, the subjects were asked to answer the thermal sensation felt at the finger pad using a numerical value (cold: −3 points to +3 points: warm). Two trials were conducted for each condition.

Figure 36:
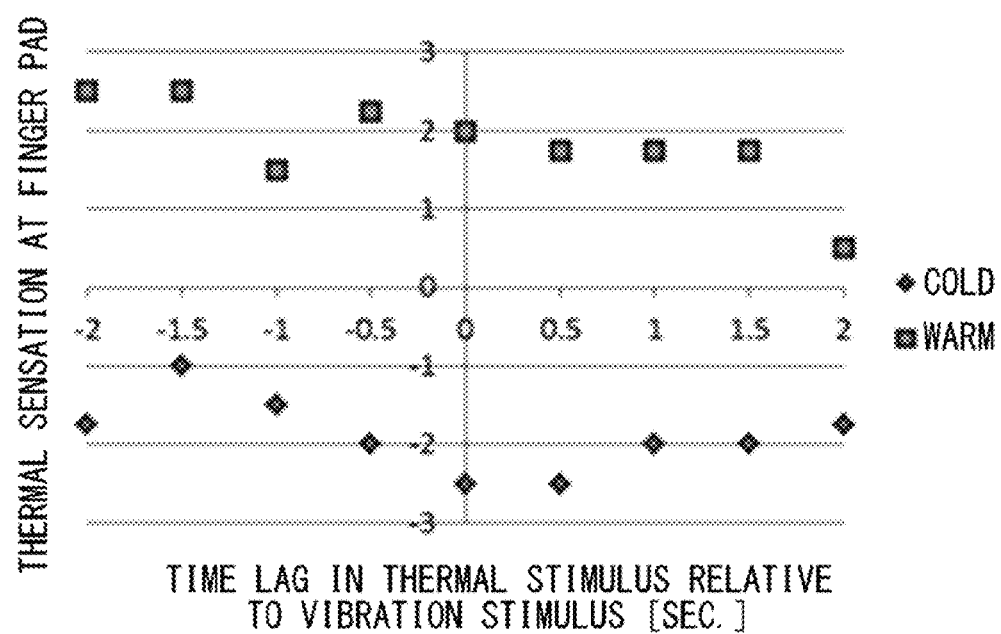
FIG. 36 is a diagram showing a time lag in thermal sensation relative to vibration according to Experiment 3 (b. presence or absence of vibration stimulus+thermal stimulus).

FIG. 36 is a diagram showing a time lag in thermal sensation relative to vibration according to Experiment 3 (b. presence or absence of vibration stimulus+thermal stimulus). As a result of the experiment, the change in thermal sensation due to time differences was small compared with Experiment a. Due to the influence of the contact pressure with the vibrator, there was a possibility that a certain degree of thermal sensation would be generated regardless of the presence or absence of a vibration stimulus. Strong sensation was able to be obtained when presenting a warm stimulus earlier and presenting a cold stimulus simultaneously as in the same way as in Experiment a.

Subsequently, a time lag in thermal perception due to the combination of a pressure stimulus and a vibration stimulus was examined through Experiment 3 (pressure stimulus+vibration stimulus+thermal stimulus). As the experimental method, the subjects touched a plastic resin with a force of about 20 g weight, about 100 g weight, or about 250 g weight, and a stimulus was presented by vibrating the plastic. A thermal stimulus was started at a specific time before and after the vibration stimulus (−2 seconds to +2 seconds, 9 types in increments of 0.5 seconds). Then, the subjects were asked to answer the thermal sensation felt at the finger pad using a numerical value (cold: −3 points to +3 points: warm). One trial was conducted for each condition.

TABLE 6

PRESSURE STIMULUS + VIBRATION STIMULUS + THERMAL STIMULUS (MEDIAN, COLD STIMULUS)

| TIME DIFFERENCE [SEC.] | ABOUT 20 G WEIGHT | ABOUT 100 G WEIGHT | ABOUT 250 G WEIGHT |
|---|---|---|---|
| −2 | −0.5 | −0.75 | −0.75 |
| 0 | −2.25 | −1.75 | −1.5 |
| 2 | −1.25 | −0.5 | −1.25 |

Table 6 is a table showing the time lag in thermal perception due to the combination of the pressure stimulus and the vibration stimulus in the case of the cold stimulus. Table 7 is a table showing the time lag in thermal perception due to the combination of the pressure stimulus and the vibration stimulus in the case of a warm stimulus. The influence of the contact pressure was a little, and there was a possibility that the weaker the contact pressure, the easier it was to obtain the thermal sensation. In the same way as in Experiments a and b, it was considered that the sensation did not become so weak even if the warm stimulus was presented earlier.

TABLE 7 pressure stimulus + vibration stimulus + thermal stimulus (median, warm stimulus)

| TIME DIFFERENCE [SEC.] | ABOUT 20 G WEIGHT | ABOUT 100 G WEIGHT | ABOUT 250 G WEIGHT |
|---|---|---|---|
| −2 | 1.75 | 2 | 1.5 |
| 0 | 2 | 2.25 | 2 |
| 2 | 1.5 | 1.25 | 1.25 |

Based on the second exemplary embodiment above, the following knowledge was obtained. Based on the second exemplary embodiment, it was found that the sensation obtained by shifting the timing for the cold stimulus relative to a tactile stimulus became weakened. Further, it was found that the sensation was difficult to obtain when the timing was shifted by around ±2 seconds. It was found that the timing for a heat stimulus relative to a tactile stimulus might depend on the time it takes to perceive the heat stimulus, and in the case of a warm stimulus, the sensation that could be obtained became stronger when the timing was advanced compared to when the timing was the same. However, when applying a vibration stimulus in a state where the finger is always in contact with the vibrator, not a little sensation will be generated. The need for providing a context indicating that the finger came into contact with the object when vibration started was considered. The strength of a pressure stimulus did not affect the sensation obtained.

Next, an experiment regarding "Experiment 4: effect of spatial displacement" and an experiment regarding "Experiment 5: effect of time lag" in the case of presenting a tactile stimulus to a finger pad and a thermal stimulus to a finger side portion were conducted.

Experiment 4

As experimental conditions, there were seven or more subjects for each experiment, and the skin temperature of the finger pad was adjusted to 32 degrees. In the above-described experimental device, a Peltier element was attached to the side surface of the finger, and the skin temperature was adjusted using a hot plate. On the hot plate, a Peltier element to be touched and an aluminum plate for rest were placed (see FIG. 28).

As an experiment method, procedures: 1) change the position of the device on the finger side portion (at intervals of 30 seconds); 2) touch an object to be touched; 3) feel a randomly selected stimulus for 2 seconds; 4) answer the stimulus strength felt at the finger pad in a numerical number while setting the perceived strength with respect to a standard stimulus as 100, were performed in the said order, and four trials were conducted for each condition, and the average value was adopted as the perceived strength of the subject.

Figure 37:
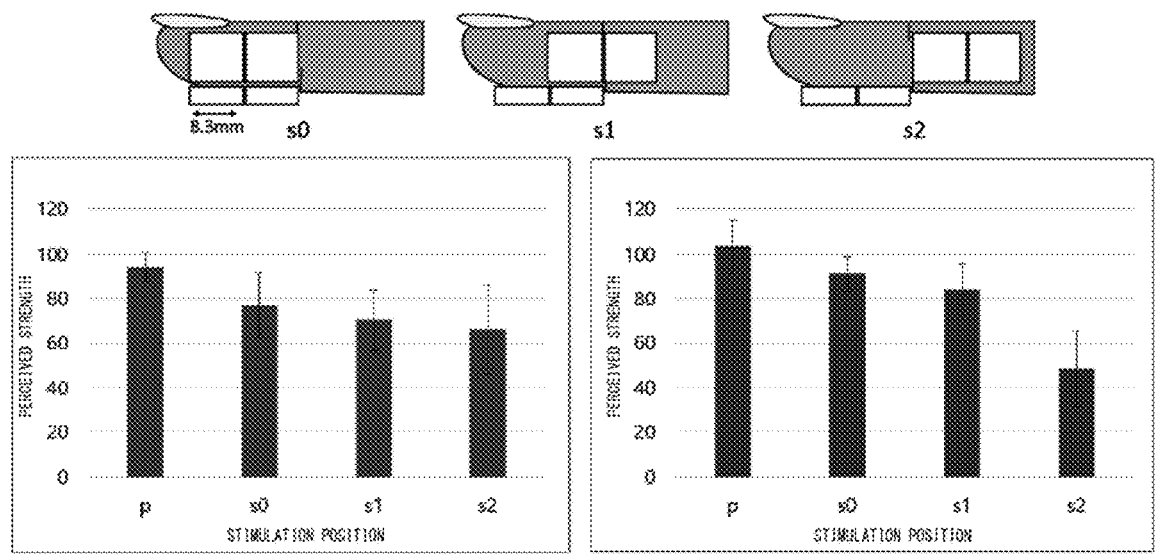
FIG. 37 is a diagram showing the result of an experiment performed using two kinds of stimuli (warm and cold) and four kinds of stimulus presentation sites.

As an experimental condition, the experiments were performed using two kinds of stimuli (warm and cold), four kinds of stimulus presentation sites (p (pad only), s0 (side surface only and arranged parallel to the pad), s1 (side surface only and arranged being displaced by one Peltier element), and s1 (side surface only and arranged being displaced by two Peltier elements)) (see FIG. 37 top diagram). While using two Peltier elements of 8.3 mm on all sides were used for each of the pad and the side surface, a stimulus to Pad was used as the standard stimulus, and the strength of the standard stimulus was checked for every eight trials.

As a result, as shown in FIG. 37, there was a tendency particularly in the case of a cold stimulus that the perceived strength became weaker as the position of a thermal stimulus became farther away from a tactile stimulus (same as the conventional knowledge regarding the thermal referral phenomenon), and, when the position was displaced by two Peltier elements, the perceived strength became about half. Further, a significant difference ($p<0.10$) was observed in the main effect of the stimulation position as a result of analysis of variance caused by the warm/cold type and the stimulation position. In addition, as a result of multiple comparison by the Ryan's method, a significant difference ($p<0.10$) was observed in the p condition and the s2 condition. In other words, it was found that the perceived strength decreased as the stimulation distance became farther away, and the perceived strength decreased significantly when the perception error range did not overlap (being outside the range of the spatial discrimination threshold).

As the consideration of Experiment 4, it is considered that, in the case where a warm/cold feeling is presented to the finger pad by a thermal stimulus to the finger side surface portion, the presentation site of the side surface portion is desirably close to the pad. In particular, in the case of a cold stimulus, it is considered that the gap between the presentation part for a tactile stimulus and the presentation part for a warm/cold stimulus is desirably about half a stimulation area at the smallest.

Experiment 5

Subsequently, in order to investigate the influence of a tactile stimulus to the finger pad on the perception time for a warm/cold feeling, Experiment 5 was performed. In Experiment 5, in the technology for presenting a warm/cold feeling to the finger pad by a warm/cold stimulus to the finger side surface portion, the purpose was to evaluate the time lag in the perception relative to a case where a warm/cold stimulus was actually applied to the finger pad. In the technology for presenting a warm/cold feeling to the finger pad by a warm/cold stimulus to the finger pad or the finger side surface portion, the influence of the timing for a tactile stimulus on the perception timing for the warm/cold feeling at the finger pad was investigated. There were eight female student subjects aged from 18 to 19 years old. The skin temperature of the finger pad was adjusted to 32 degrees.

As an experiment method, in procedures: 1) touch an object to be touched (at intervals of 30 seconds); 2) press a button of a mouse with a left hand such that, after about two seconds, a vibration stimulus is started and a warm/cold stimulus is presented at a randomly-selected timing; and 4) the subject releases the button of the mouse once a warm/cold feeling is felt at the finger pad, two trials were conducted for each condition, and the average value was adopted as the perception time of the subject.

As an experimental condition, the experiment was performed using two kinds of warm/cold stimuli (warm and cold), two kinds of stimulus presentation sites (pad and side surface portion), and three kinds of stimulation time (0.2 sec. before the vibration stimulus, at the same time as the vibration stimulus, and 0.2 sec. after the vibration stimulus). The experiment was conducted using two types (presence or absence) of the vibration stimulus. Two Peltier elements were used for each of the pad and the side surface. Further, the vibration stimulus was presented to the finger pad under a condition of 200 Hz for 0.1 second.

Figure 38:
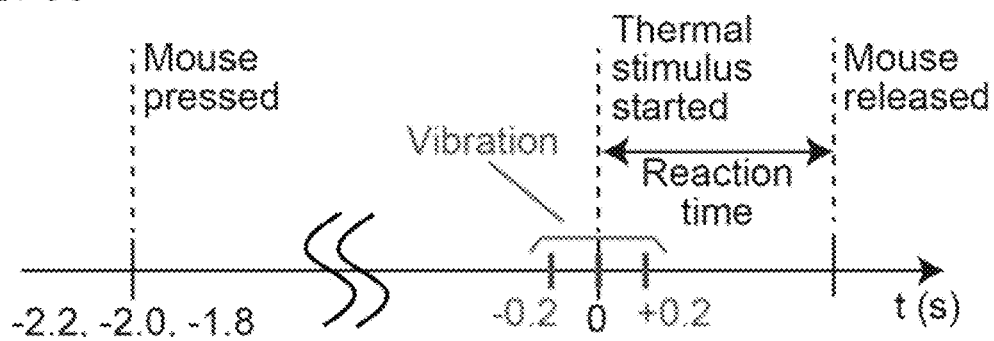
FIG. 38 is a diagram showing the result of comparison between the presence and absence of the vibration in the case of a warm stimulus (left figure) and a cold stimulus (right figure) and in the case where a thermal stimulus is for the pad and the side portion (side)
Figure 38:
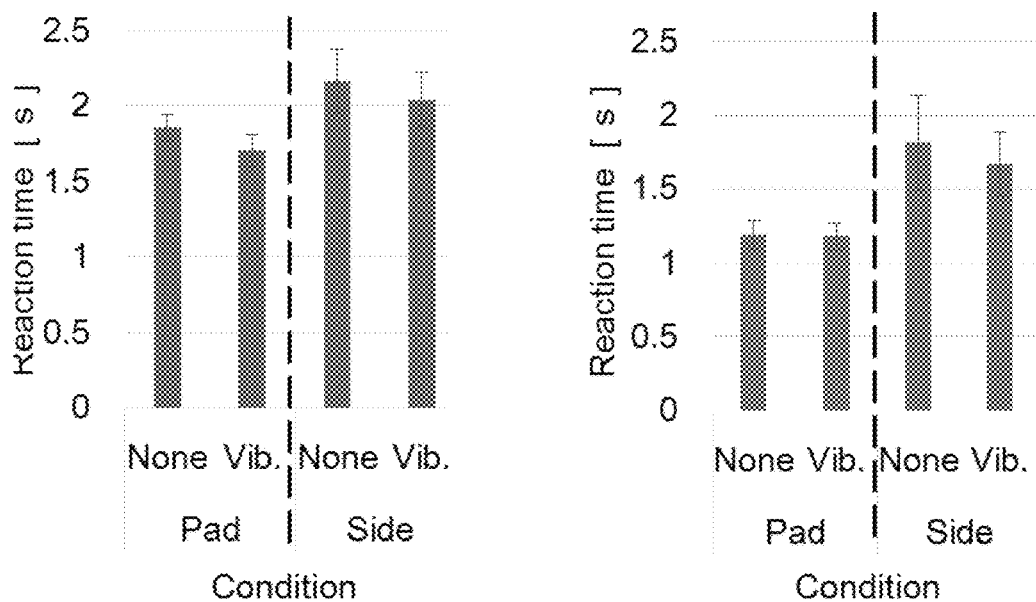

As a result, as shown in FIG. 38, in the case of a warm stimulus (left figure) and a cold stimulus (right figure) and in the case where a thermal stimulus is for the pad and the side portion (side), under all conditions, there was a tendency that the perception timing became earlier due to the application of the vibration stimulus when the comparison was made between the presence and absence of the vibration. The perception timing when stimulating the pad with the thermal stimulus was earlier than that in the case of the side portion. As a result of analysis of variance caused by the warm/cold type, the position of the thermal stimulus, and the presence or absence of vibration, there was no significant difference in the interaction, and a significant difference was observed for the respective main effects ($p<0.10$ for the presence/absence of vibration, and $P<0.05$ for the rest).

As a consideration of Experiment 5, when a warm/cold stimulus was presented to the finger side surface portion, there was a property that the warm/cold feeling at the finger pad was delayed compared to when the warm/cold stimulus was actually presented to the finger pad. However, it was possible to advance the perception timing for the warm/cold feeling by applying a vibration stimulus onto the finger pad. Particularly in the case of a thermal stimulus, advancing the perception timing for a warm/cold feeling using the timing of the vibration stimulus resulted in the same result even when a warm/cold stimulus was presented to the finger pad.
Experiment 6

Figure 39:
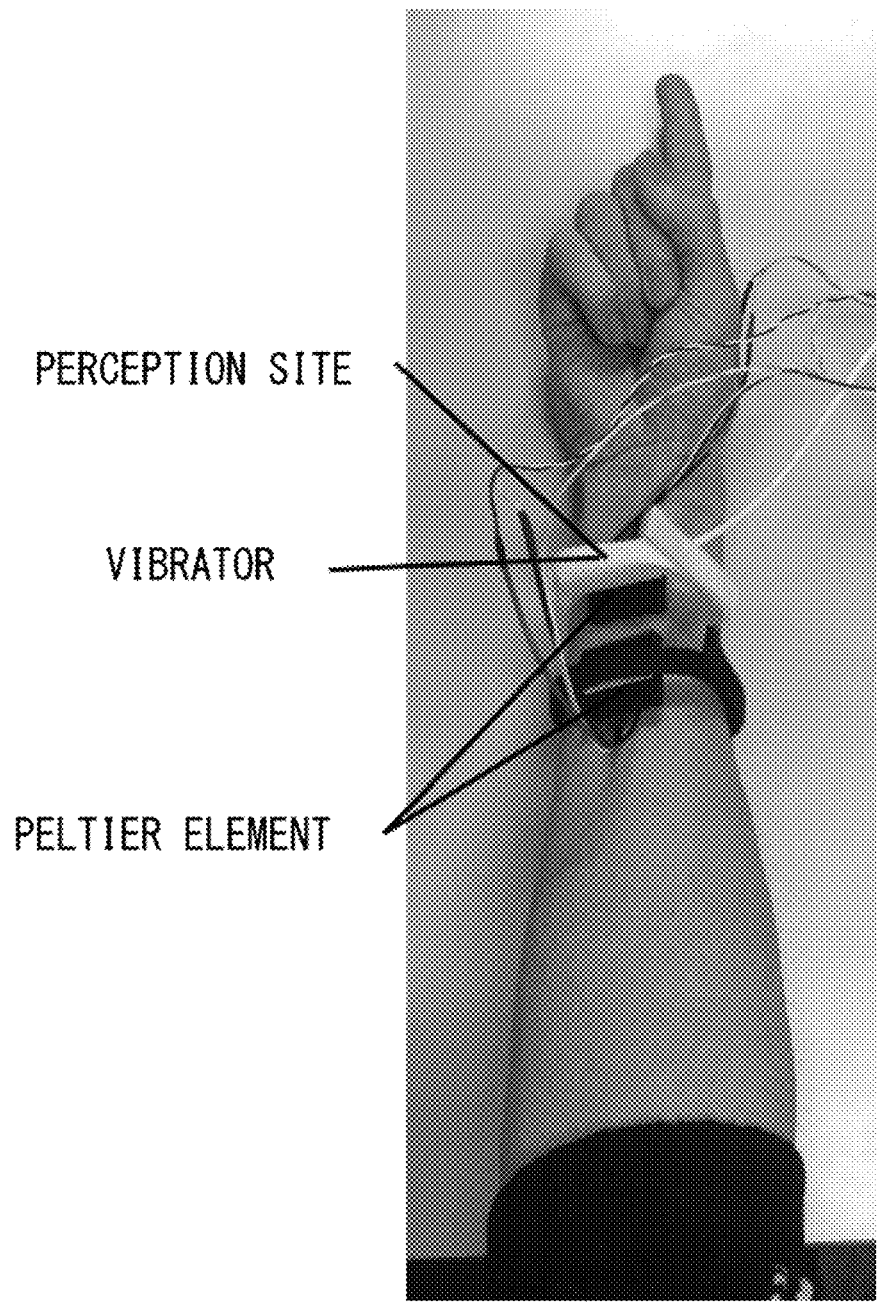
FIG. 39 is a diagram showing the arrangement of devices for Experiments 5 and 6.

The above is an experiment concerning a stimulus to a finger. Experiment 6 was conducted to see whether similar results could be obtained also at other sites of the body. FIG. 39 is a diagram showing the arrangement of the device for Experiment 5. In Experiment 6, time at which a temperature sensation occurred in the device part on the peripheral side of the arm was evaluated.

Conventionally, it is known that, when there is a stimulus within the error range of a forearm (wrist, elbow), the localization error for temperature is 15 to 20 mm for a warm stimulus and 10 to 15 mm for a cold stimulus [Hashiguchi et al., 2016], and the localization error for vibration is 200 Hz: 5 to 10 mm [Niijima et al., 2012]. However, it was not known what kind of result could be obtained depending on the way the respective error ranges (discrimination thresholds) of a plurality of types of stimuli were overlapped.

Figure 40:
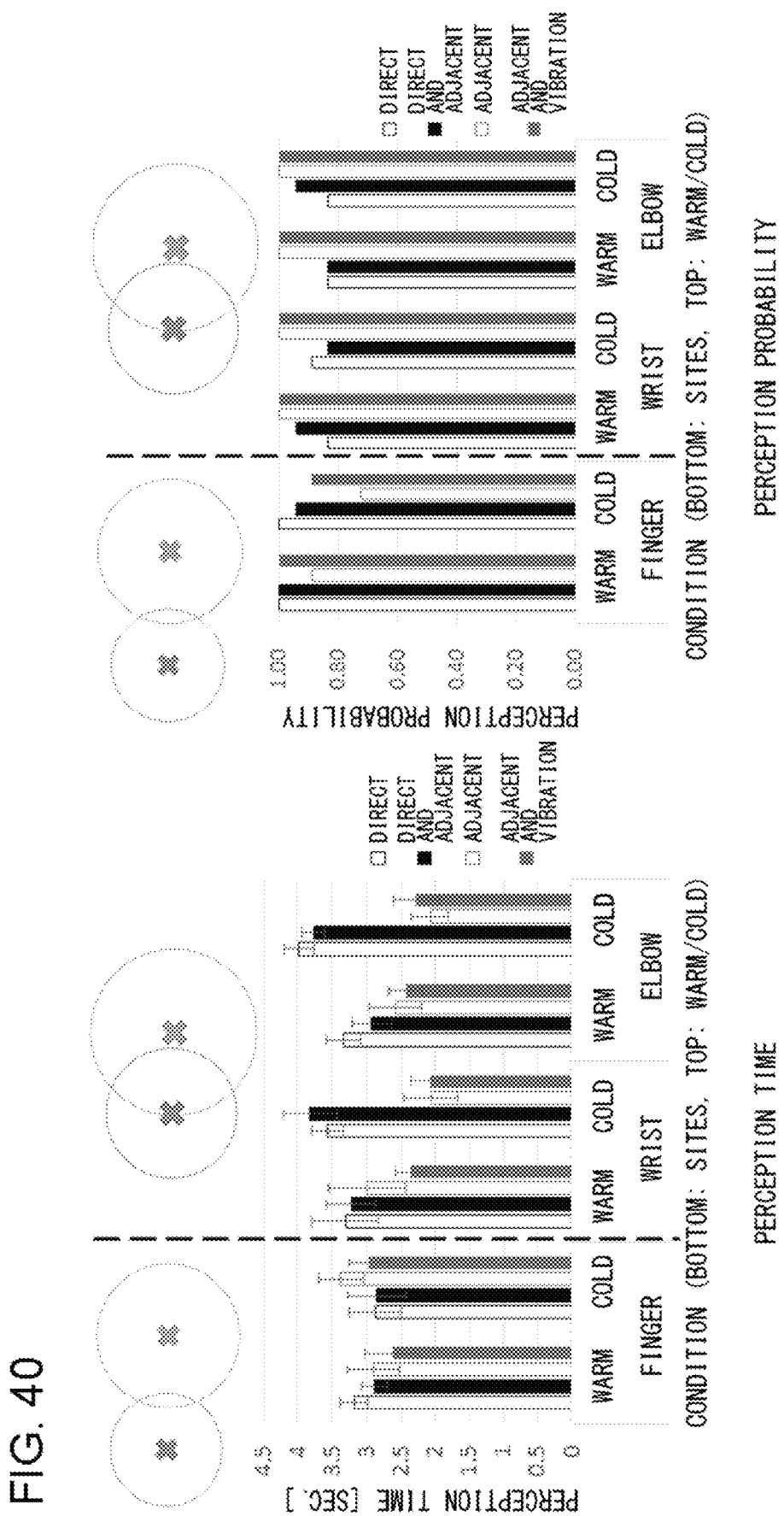
FIG. 40 is a diagram showing the relationship between how the error ranges for the respective stimuli are overlapped and the perception time/perception result in each body site.

FIG. 40 is a diagram showing the relationship between how the error ranges for the respective stimuli are overlapped and the perception time/perception result in each body site. The term "direct" means a direction stimulus, and the term "adjacent" means an adjacent stimulus in the figure. The expression "direct and vibration" means a case where a direct vibration stimulus was applied at the same place as that of a cold/warm stimulus, and the expression "adjacent and vibration" means a case where a vibration stimulus was applied at a place adjacent to a cold/warm stimulus (the graph bars are lined up in the order of "direct", "direct and adjacent", "adjacent", and "adjacent and vibration").

As shown in the left diagram of FIG. 40, there was a tendency that the perception time was shorter for the adjacent stimulus than for the direct stimulus in the case of the finger, and there was a tendency that the perception time was shorter for the direct stimulus than for the adjacent stimulus in the case of the forearm. Also, as shown in the right diagram of FIG. 40, there was a tendency that, while stimulation sites were able to be distinguished in the case of the finger, stimulation sites for direct and adjacent stimuli were mixed up in the case of the forearm. This is considered due to the mixing up of the stimulation sites since the forearm has a larger temporal or spatial physiological discrimination threshold than the finger. However, it is suggested that the purpose of the present invention can be achieved at any body site by adjusting the spatial position and time lag in accordance with the magnitude of the physiological discrimination threshold unique to each body site.

Summarizing the results of Experiments 1 to 6 according to the second exemplary embodiment above, it was found that the effects shown in FIG. 46 was able to be obtained depending on the way the respective error ranges (discrimination threshold) two types of stimuli were overlapped. In FIG. 46, indicates experiments that are related.

Figure 41:
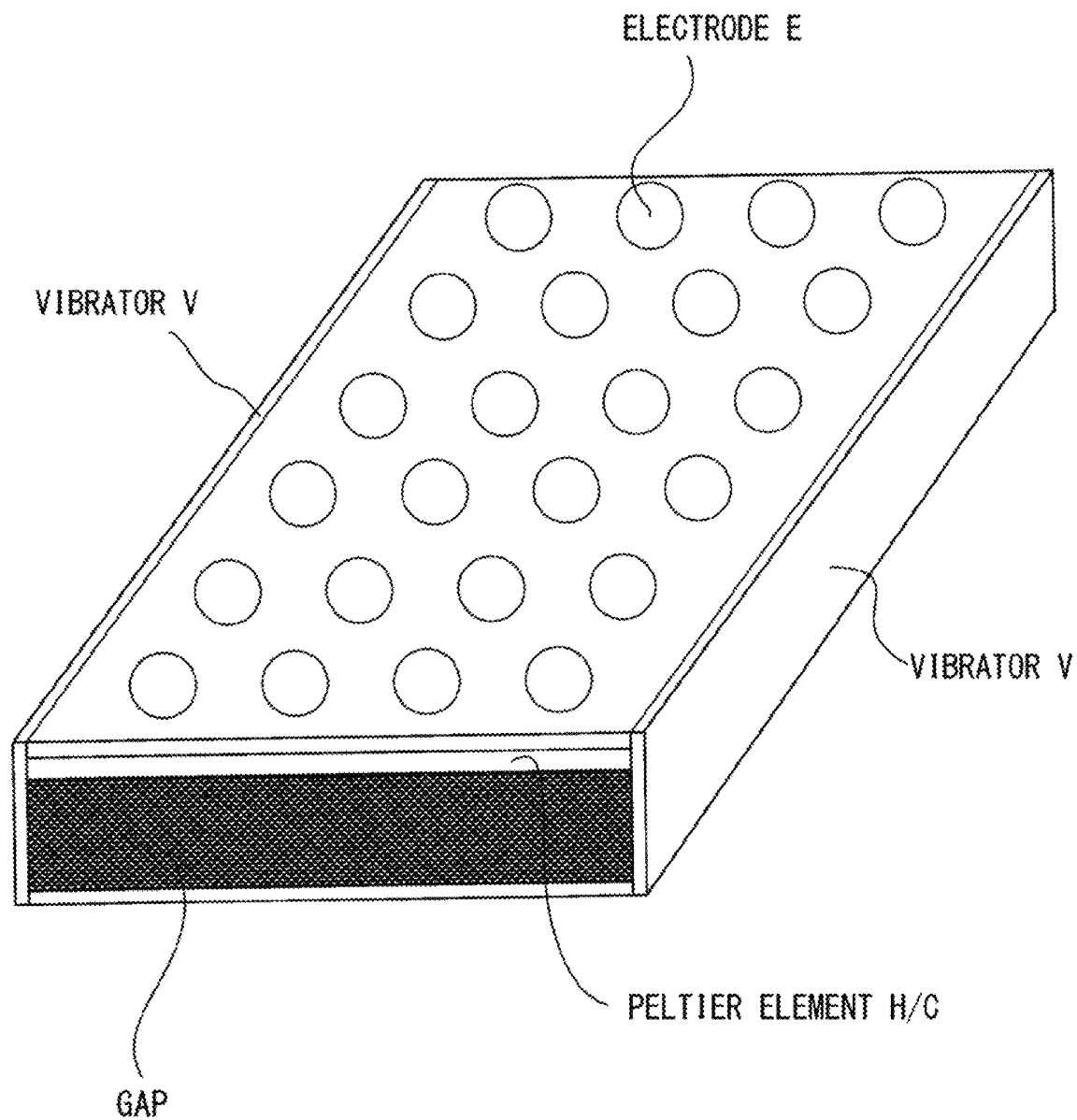
FIG. 41 is a diagram showing an exemplary embodiment of an element arrangement structure having a vibration resonance box.

As described above, according to the present embodiments including the second exemplary embodiment, while arranging the presentation elements of all of electricity, force, temperature, vibration, or any combination thereof in different parts on the human skin, it is possible to constitute a tactile sensation presentation device designed to feel a stimulus at one place or at the same time, as an effect.
Element Arrangement Example Next, an example of an element arrangement structure for use in the external output device 140 and the like will be explained with reference to FIGS. 41 to 45. FIG. 41 is a diagram showing an exemplary embodiment of an element arrangement structure having a vibration resonance box. In the figure, E represents an electrode for an electrical stimulus, V represents a vibrator such as a piezo element, and H/C represents a Peltier element for a warm or cold stimulus. The element arrangement structure is worn such that electrode E is on the skin side.

As shown in FIG. 41, a gap is provided in the element arrangement structure of the present exemplary embodiment, and, as the vibrator vibrates, the air inside the gap serves as a spring and amplifies sound by resonance or amplifies the vibration by resonance. Further, a psychological effect where the sense of reality is increased due to sound and vibration being output from the same place in an amplified manner.

Further, as shown in the figure, positioning the gap on the back surface of the Peltier element allows for a heat radiating effect and can thus play a role as a heat sink. In other words, when the Peltier element presents a warm stimulus to the body, extra cooling occurs on the back side due to heat transfer, whereas, when the Peltier element presents a cold stimulus to the body, extra heating occurs on the back side due to heat transfer. If the extra cold temperature on the back side of the Peltier element is left, the efficiency for heat transfer of the Peltier element decreases, and it becomes impossible to present a sufficient cold/warm stimulus to the body side. By providing a gap on the back side of the Peltier element as in the present exemplary embodiment, this problem can be solved, and the normal function of the Peltier element can be maintained.

Figure 42:
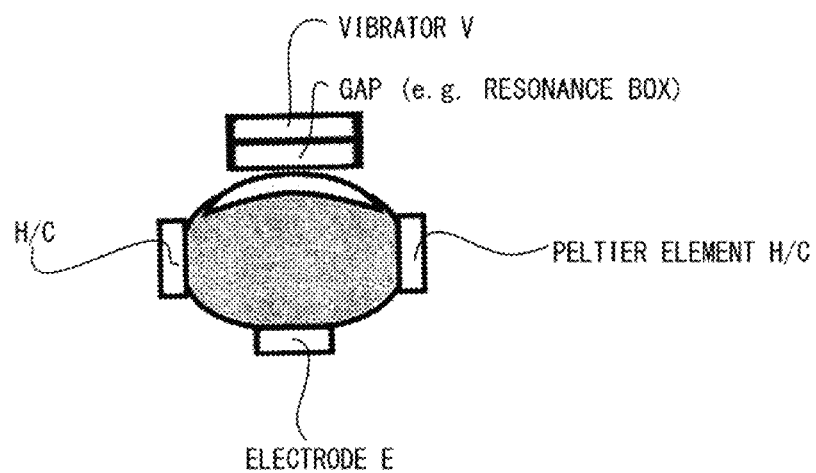
FIG. 42 is a diagram showing an example of a finger sack shaped element arrangement structure in which elements are arranged around a finger.

In the example of FIG. 41, element arrangement structures seem to be line up in a planar manner so as to be arranged on the body; however, the present embodiment is not limited thereto, and this element arrangement structure may be arranged sterically so as to fit the shape of the body. FIG. 42 is a diagram showing an example of a finger sack shaped element arrangement structure in which elements are arranged around a finger. The figure is a view seen from the fingertip side, and elements are gathered in a finger sack shape as in a dotted line portion.

As shown in FIG. 42, in an electrical stimulus, a cold/warm stimulus, and a vibration stimulus, the electrical stimulus exhibits the best sensory resolution, the cold/warm temperature stimulus exhibits the next best sensory resolution, and the vibration stimulus exhibits the worst sensory resolution; thus, the elements are arranged according to this physiological function. In other words, the electrode E is arranged on the finger pad, the Peltier element H/C is arranged on both side surfaces of the finger, and the vibrator V is arranged on the back of the finger together with the resonance box.

By arranging the elements in this manner, it is possible to present a plurality of types of tactile stimuli to the same finger pad. A case is now taken into consideration where an electrical stimulus is presented as a first type of tactile stimulus and vibration and/or temperature is presented as a second type of tactile stimulus. In this case, the vibration and/or temperature stimulus can be perceived while being positioned at the stimulation point (i.e., finger pad) for the electricity presentation. As described above, even in a case where it is difficult to arrange a plurality of types of elements densely at the same place, by arranging the elements in accordance with the sensory resolution as in the present exemplary embodiment, a plurality of types of tactile stimuli can be localized and perceived at the same place.

Figure 43:
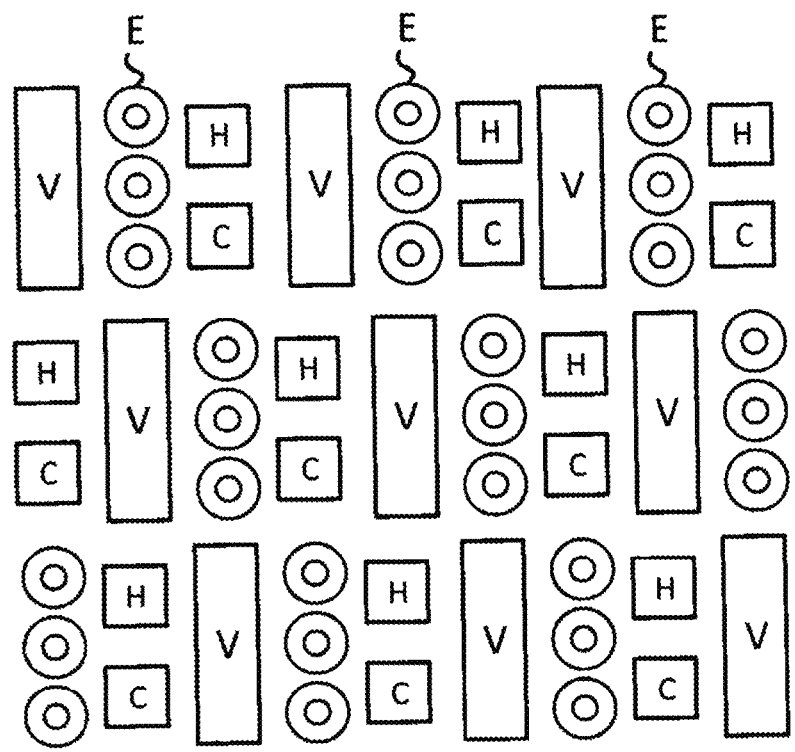
FIG. 43 is a diagram showing a continuously horizontal arrangement pattern of the various elements V, E, H, C according to the present exemplary embodiment.
Figure 44:
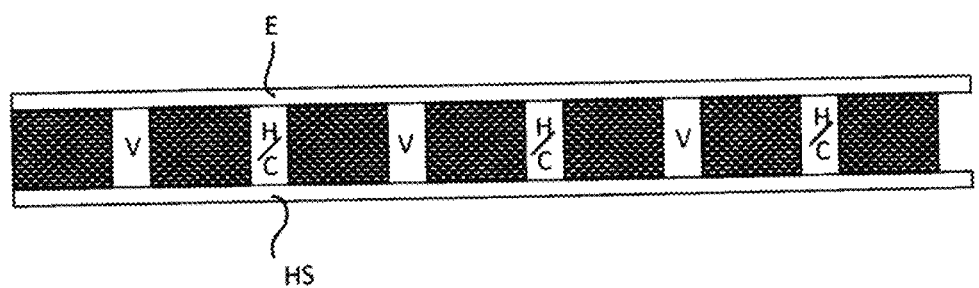
FIG. 44 is a cross-sectional view of a structure in a continuously horizontal arrangement pattern of the various elements V, E, H, C according to the present exemplary embodiment viewed in a cross section.

In the above example, the electrode E for an electrical stimulus is arranged on the finger pad; however, the invention is not limited thereto, and the same effect can be obtained by arranging an element for force presentation. In the above example, an example of an element arrangement structure in which a small number of elements of a plurality of types are arranged is shown; however, the element arrangement structure is not limited thereto, and a large number of elements may be continuously arranged as in a color mask of a TV set. FIG. 43 is a diagram showing a continuously horizontal arrangement pattern of the various elements V, E, H, C according to the present exemplary embodiment, and FIG. 44 is a cross-sectional view of a structure in a continuously horizontal arrangement pattern of the various elements V, E, H, C according to the present exemplary embodiment viewed in a cross section. In FIG. 44, the structure is used so as to make contact with the body on the upper side in the figure, that is, the electrode E side.

As shown in FIG. 43, in the element arrangement structure according to the present exemplary embodiment, various elements V, E, H, C are arranged continuously on a plane or a curved surface. Many electrodes E, other than those used for an electrical stimulus, can be also used as earth (ground). For this element arrangement structure, a flexible material such as silicone rubber may be used as the substrate so as to easily conform to the shape of the body. Such a flexible sheet-like element arrangement structure is suitable for stimulating a wide surface such as the palm of a hand (palm), an arm, a back, an abdomen, and the like.

Figure 45:
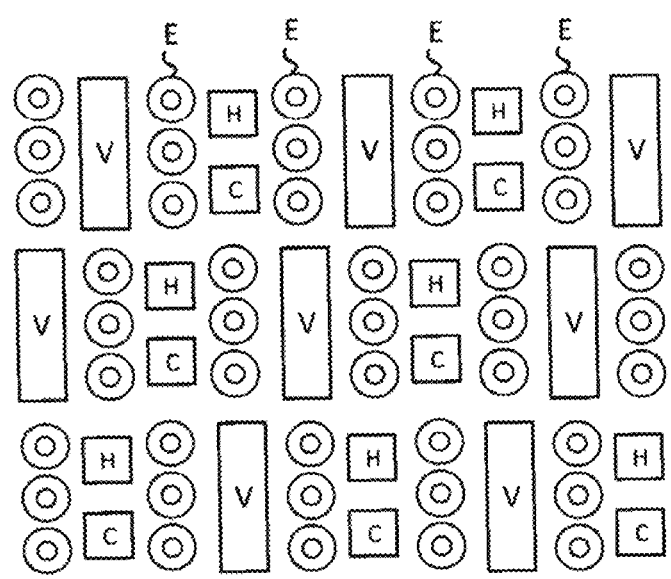
FIG. 45 is a diagram showing an example of the element arrangement structure according to the present exemplary embodiment having another repeating pattern.

As the cross-sectional view is shown in FIG. 44, the element arrangement structure according to the present exemplary embodiment may also be provided with a gap serving as a resonator or a heat sink. For the user, since a vibration stimulus and a sound stimulus are transmitted through a single point on a large surface such as a palm or an arm, a more realistic sensation can be generated. In the example of the horizontal arrangement pattern of FIG. 43, a unit of a repeating pattern, in which an electrode E is arranged next to a vibrator V and Peltier elements H and C are arranged next to the electrode E, is used. However, the unit is not limited to this example, and, for example, the constituent unit of a repeating pattern may be changed as appropriate according to the sensory resolution of the body. FIG. 45 is a diagram showing an example of the element arrangement structure according to the present exemplary embodiment having another repeating pattern.

As described above, an electrical stimulus is superior to a cold/warm stimulus or a vibration stimulus in terms of sensory resolution. Therefore, as shown in FIG. 45, by arranging the electrodes E densely and arranging the vibrator V and the Peltier elements H, C sparsely, high definition output can be achieved for a tactile sensation (electricity sensation, force sensation, etc.) that can be discriminated in more detail, and a high-definition element arrangement structure can be produced while reducing costs and the like by reducing the number of elements for a tactile sensation (vibration sensation, temperature sensation, etc.) that is discriminated relatively in less detail. For example, a case is now taken into consideration where an electrical stimulus is presented as a first type of tactile stimulus and vibration and/or temperature is presented as a second type of tactile stimulus. By outputting the first type of electrical stimulus to one point of an electrode E and outputting the second type of cold/warm stimulus or vibration stimulus from the vicinity or one or a plurality of surrounding elements H, C, and V, vibration and/or temperature stimuli can be localized and perceived at the stimulation point of the electrode E for electricity presentation. As described above, even in an element arrangement structure in which elements for a stimulus with low sensory resolution are sparsely arranged, by using a plurality of types of tactile stimuli, presentation is possible with an increased sensory definition.

Described above is the explanation of the present embodiments including the exemplary embodiment.

According to the above present embodiments, by arranging force presentation at the point of application of a stimulus and arranging an stimulator for any one of vibration, temperature, and an electrical stimulus or an arbitrary combination thereof at a place that is physically apart, the sensation for the stimulus can be localized at the point of application of force by a phenomenon such as phantom sensation. Further, clarification of an image localized by phantom sensation or the like through the presentation of force allows the presentation sites for the haptic primary colors of force, electricity, vibration, and temperature to coincide with one another.

Further, according to the present embodiments, by arranging force presentation at the point of application of a stimulus and arranging a stimulator for either one of vibration and temperature or both at a place that is physically apart, the sensation for the stimulus can be localized at the point of application of force by phantom sensation or the like. Further, clarification of an image localized by phantom sensation or the like through the presentation of force allows the presentation sites for the haptic primary colors of force, vibration, and temperature to coincide with one another.

Further, according to the present embodiments, by arranging electrical stimulus presentation at the point of application of a stimulus and arranging either one of vibration and temperature or both at a place that is physically apart, the sensation for the stimulus can be localized at the point of application of force by phantom sensation or the like. Further, clarification of an image localized by phantom sensation or the like through the presentation of an electrical stimulus allows the presentation sites for the haptic primary colors of electricity, vibration, and temperature to coincide with one another.

Further, according to the present embodiments, by arranging vibration presentation at the point of application of a stimulus and arranging temperature at a place that is physically apart, the sensation for the stimulus can be localized at the point of application of vibration by phantom sensation or the like. Further, clarification of an image localized by phantom sensation or the like through the presentation of vibration allows the presentation sites for the haptic primary colors of vibration and temperature to coincide with one another.

Described above is the explanation of the present embodiments including the first and second exemplary embodiments.

Another Embodiment

The embodiments of the present invention have been described thus far. However, the present invention may be realized in various different embodiments other than the above-described embodiments within the scope of the technical idea described in the scope of the claims.

For example, an example has been explained where the tactile information conversion device 100 includes the input unit 112 and the output unit 114. However, the present invention is not limited to this example, and the tactile information conversion device 100, without including the input unit 112 or the output unit 114, may be formed as an independent housing. In that case, the tactile information conversion device 100 may perform processing in response to a request from a client terminal such as the external device 200 and return the processing result to the client terminal.

Of all the processes explained in the embodiments, all or some of the processes explained as processes that are performed automatically can be also performed manually; alternatively, all or some of the processes explained as processes that are performed manually can be also performed automatically using a publicly-known method.

In addition to this, the processing procedures, control procedures, specific names, information including parameters such as registration data and search conditions of each processing, screen examples, and database configuration shown in the above documents and the figures can be changed arbitrarily unless otherwise specified.

With respect to the tactile feeling presentation system, the respective constituent elements shown in the figures are functionally conceptual and do not necessarily need to be physically configured as shown in the figures.

For example, all or some of the processing function of each device of the tactile information conversion device 100, particularly each processing function performed by the control unit 102, may be realized by a processor such as a CPU (Central Processing Unit) and a program interpreted and executed by the processor or may be realized as a hardware processor using wired logics. The program is recorded in a non-transitory computer readable recording medium including a programmed instruction for causing a computer to execute the method according to the present invention, which will be described later, and is mechanically read by the tactile information conversion device 100 and the external device 200, if necessary. In other words, in the storage unit 106 such as ROM or HDD (Hard Disk Drive), etc., a computer program for giving instructions to the CPU in cooperation with the OS (Operating System) and performing various processes is recorded. This computer program is executed by being loaded into the RAM and cooperates with the CPU so as to constitute a control unit.

Furthermore, this computer program may be stored in an application program server connected to the tactile information conversion device 100, the external device 200, the external input device 120, and the external output device 140 via an arbitrary network 300, and all or a part of the computer program can be downloaded, if necessary.

Furthermore, the program according to the present invention may be stored in a computer-readable recording medium and can be configured as a program product. This "recording medium" includes an arbitrary "portable physical medium" such as a memory card, a USB memory, an SD card, a flexible disk, a magneto-optical disk, a ROM, an EPROM, an EEPROM, a CD-ROM, an MO, a DVD, and a Blu-ray (registered trademark) Disc, etc.

Also, the "program" is a data processing method described in an arbitrary language and by a description method, regardless of the form of the source code, the binary code, etc. The "program" is not necessarily limited to those constituted in a single manner and may include those constituted in a distributed manner as a plurality of modules or libraries and those that achieve the functions thereof in cooperation with a separate program represented by an OS (Operating System). For a specific configuration for reading the recording medium in each of the devices shown in the embodiments, the procedure for the reading, an installation procedure after the reading, and the like, well-known configuration and procedures can be used. The present invention may be configured as a program product in which the program is recorded in a non-transitory computer-readable recording medium.

Various databases and the like (the tactile sensation definition file 106a, the object tactile feeling database 106b, etc.) stored in the storage unit 106 are memory devices such as RAM or ROM, fixed disk devices such as hard disks, flexible disks, and storage means such as optical disks and store various programs, tables, databases, files for web pages, etc., used for various processes and for providing websites.

Further, the tactile information conversion device 100, the external device 200, the external input device 120, and the external output device 140 may be configured as information processing devices such as known personal computers, workstations, etc., and may be configured by connecting an arbitrary peripheral device to the information processing devices. Further, the tactile information conversion device 100, the external device 200, the external input device 120, and the external output device 140 may be realized by mounting software (including programs, data, and the like) for realizing the method according to the present invention in the information processing devices.

Furthermore, specific forms of device distribution and integration are not limited to those shown in the figures, and all or a part thereof may be configured in a functionally or physically distributed and integrated manner in arbitrary units in accordance with the function load. In other words, the above-described embodiments may be arbitrarily combined for implementation, or the embodiments may be selectively implemented.

As explained above in detail, the present invention is capable of providing a tactile information conversion device, a tactile information conversion method, a tactile information conversion program, a recording medium, and an element arrangement structure for presenting a plurality of types of stimuli that are capable of presenting a plurality of types of stimuli at one point in a concentrated manner from different points and is thus industrially useful.

For example, by using the present invention, for example, by moving a robot in a remote place as the own body so as to obtain experience, the present invention can be used in industrial fields such as remote operation and remote work fields, nursing care and health fields, communication and learning fields for skillful technology, media and broadcast technology, virtual sports, entertainment fields, mobile, wearable fields, etc.

What is claimed is:
1. A device worn on a human body of a subject person allowed to perceive tactile information, comprising:
a first stimulation unit and a second stimulation unit, wherein
the first stimulation unit generates a first type of tactile stimulus at a first stimulation point on the human body,
the second stimulation unit generates a second type of tactile stimulus at a second stimulation point on the human body,
the first stimulation point and the second stimulation point are spatially and/or temporally separated within a predetermined threshold value,
the second type of tactile stimulus is a type of tactile stimulus with a temporal or spatial physiological discrimination threshold that is larger than that of the first type of tactile stimulus, to cause the subject person to perceive the first type of tactile stimulus and the second type of tactile stimulus at the first stimulation point on the human body.
2. The device according to claim 1, wherein
the first type of tactile stimulus and/or the second type of tactile stimulus is one of force, vibration, temperature, and electricity.

3. The device according to claim 1, wherein
the first stimulation point and/or the second stimulation point is a perceptual point which is generated by phantom sensation illusion.

4. The device according to claim 1, wherein
the first type of tactile stimulus and/or the second type of tactile stimulus is detected by an input unit including a multipoint distribution type pressure sensation measurement sensor on a surface layer, a warm/cold feeling measurement sensor in an intermediate layer; and a vibration feeling measurement sensor in a lower layer and is generated based on information transmitted through communication.

5. The device according to claim 1, wherein
the first type of tactile stimulus and/or the second type of tactile stimulus is presented by an output unit including a distribution-type pressure presentation unit using an electrical tactile sensation stimulus on a surface layer, a high-speed driving type warm/cold feeling presentation unit using a Peltier element in an intermediate layer, and a vibration presentation unit of a wide frequency range in a lower layer.

6. A structure adapted to be provided on a human body of a subject person allowed to perceive tactile information, comprising:
one or a plurality of first elements and a one or a plurality of second elements, wherein
the first element generates a first type of tactile stimulus at a first stimulation point on the human body in the vicinity of the first element,
the second element generates a second type of tactile stimulus at a second stimulation point on the human body in the vicinity of the second element,
the first stimulation point and the second stimulation point are spatially and/or temporally separated within a predetermined threshold value,
the second type of tactile stimulus is a type of tactile stimulus with a temporal or spatial physiological discrimination threshold that is larger than that of the first type of tactile stimulus, to cause the subject person to perceive the first type of tactile stimulus and the second type of tactile stimulus at the first stimulation point on the human body.

7. The structure according to claim 6, wherein
the first element and the second element are laminated on each other, and
the second element is arranged more toward the body than the first element.

8. The structure according to claim 6, wherein
the first type of tactile stimulus or the second type of tactile stimulus includes at least vibration,
when the first elements or the second elements include a plurality of elements that generate vibration as tactile stimulus,
the elements that generate vibration are arranged horizontally across gaps therebetween.

9. The structure according to claim 6, wherein
the first elements include elements that generate temperature or vibration as tactile stimulus,
the second elements include elements that generate electricity as tactile stimulus, wherein
the element that generates temperature or vibration and the element that generates electricity are arranged horizontally relative to each other, and
the elements that generate temperature or vibration are arranged more sparsely than the elements that generate electricity.

10. The structure according to claim 6, wherein
the first stimulation point and the second stimulation point are perceptual points which are generated by phantom sensation illusion.

11. A method of causing a body of a subject person to perceive tactile information, comprising:
generating a first type of tactile stimulus at a first stimulation point on the human body, and
generating a second type of tactile stimulus at a second stimulation point on the human body, wherein
the first stimulation point and the second stimulation point are spatially and/or temporally separated within a predetermined threshold value,
the second type of tactile stimulus is a type of tactile stimulus with a temporal or spatial physiological discrimination threshold that is larger than that of the first type of tactile stimulus, to cause the subject person to perceive the first type of tactile stimulus and the second type of tactile stimulus at the first stimulation point on the human.

12. A computer-readable recording medium encoded with a computer program adapted to cause a body of a subject person to perceive tactile information, the program comprising:
a module that generates a first type of tactile stimulus at a first stimulation point on the human body, and
a module that generates a second type of tactile stimulus at a second stimulation point on the human body, wherein
the first stimulation point and the second stimulation point are spatially and/or temporally separated within a predetermined threshold value,
the second type of tactile stimulus is a type of tactile stimulus with a temporal or spatial physiological discrimination threshold that is larger than that of the first type of tactile stimulus, to cause the subject person to perceive the first type of tactile stimulus and the second type of tactile stimulus at the first stimulation point on the human body;
wherein the program stored in the computer-readable recording medium is executed on a computer or a processor, the computer-readable recording medium is non-transitory.

* * * * *